(12) United States Patent
Krcmaricic-Barackov et al.

(10) Patent No.: US 12,021,988 B2
(45) Date of Patent: Jun. 25, 2024

(54) AD-HOC NETWORK

(71) Applicant: Electric Society SA, Hergiswil (CH)

(72) Inventors: Peter Krcmaricic-Barackov, Le Mont-sur-Lausanne (CH); Bogdan Ilicin, Belgrade (RS); Karim Idalene, Hergiswil (CH); David Llobet-Calaf, Le Mont-sur-Lausanne (CH); Nikola Raskovic, Belgrade (RS)

(73) Assignee: ELECTRIC SOCIETY SA, Hergiswil (CH)

( * ) Notice: Subject to any disclaimer, the term of this patent is extended or adjusted under 35 U.S.C. 154(b) by 352 days.

(21) Appl. No.: 16/762,832

(22) PCT Filed: Nov. 9, 2018

(86) PCT No.: PCT/IB2018/058828
§ 371 (c)(1),
(2) Date: May 8, 2020

(87) PCT Pub. No.: WO2019/092650
PCT Pub. Date: May 16, 2019

(65) Prior Publication Data
US 2020/0266989 A1 Aug. 20, 2020

(30) Foreign Application Priority Data
Nov. 9, 2017 (CH) ..................... 01351/17

(51) Int. Cl.
*G06F 16/28* (2019.01)
*H04L 9/00* (2022.01)
(Continued)

(52) U.S. Cl.
CPC ............ *H04L 9/3213* (2013.01); *G06F 16/28* (2019.01); *H04L 9/30* (2013.01); *H04L 9/3239* (2013.01);
(Continued)

(58) Field of Classification Search
CPC ....... H04L 9/3213; H04L 9/30; H04L 9/3239; H04L 2209/38; G06F 16/28; H04W 12/033; H04W 12/06; H04W 60/00; H04W 84/18
See application file for complete search history.

(56) References Cited

U.S. PATENT DOCUMENTS 4,309,569 A 1/1982 Merkle
10,664,574 B1 * 5/2020 Powers ............... G06F 21/6218
(Continued)

OTHER PUBLICATIONS

International Search Report & Written Opinion for PCT/IB2018/058828, dated Jan. 3, 2019, 13 pages.
(Continued)

*Primary Examiner* — Carl G Colin
*Assistant Examiner* — Andrew Suh
(74) *Attorney, Agent, or Firm* — Ferguson Case Orr Paterson

(57) ABSTRACT

Ad-hoc network comprising a configurator device and a plurality of nodes, wherein each node is an electronic device, wherein each node is connected by a communication connection with at least one of the other nodes and/or with the configurator device, wherein each node can be in different states comprising at least a non-commissioned state (NC), a commissioned state and a trust ring member state (TR) wherein a first node of the plurality of nodes being in the non-commissioned state (NC) is configured to send an non-commissioned advertisement message to the configurator device comprising an identifier of the first node, wherein the configurator device is configured to send an automated commissioning initialization (ACI) message to the first node containing a token, wherein the token is encrypted by a symmetric network key, wherein the first node is configured to send out a commissioning request message containing the received encrypted token, wherein
(Continued)

the first node is configured to change its state, when it receives an authorisation message from another node or from the configurator device.

19 Claims, 30 Drawing Sheets

(51) Int. Cl.
| | |
|---|---|
| *H04L 9/30* | (2006.01) |
| *H04L 9/32* | (2006.01) |
| *H04W 12/033* | (2021.01) |
| *H04W 12/06* | (2021.01) |
| *H04W 60/00* | (2009.01) |
| *H04W 84/18* | (2009.01) |

(52) U.S. Cl.
CPC ......... *H04W 12/033* (2021.01); *H04W 12/06* (2013.01); *H04W 60/00* (2013.01); *H04L 9/50* (2022.05); *H04W 84/18* (2013.01)

(56) References Cited

U.S. PATENT DOCUMENTS

| | | | | |
|---|---|---|---|---|
| 11,206,533 | B2* | 12/2021 | Savolainen | H04W 12/06 |
| 2005/0273852 | A1* | 12/2005 | Ferlitsch | G06F 21/608 |
| | | | | 726/17 |
| 2007/0253376 | A1* | 11/2007 | Bonta | H04L 9/0822 |
| | | | | 370/338 |
| 2011/0023097 | A1* | 1/2011 | McDiarmid | H04L 63/08 |
| | | | | 726/5 |
| 2016/0057117 | A1* | 2/2016 | Balasingh | H04L 63/061 |
| | | | | 713/171 |
| 2017/0300627 | A1* | 10/2017 | Giordano | G06F 21/6245 |
| 2018/0324184 | A1* | 11/2018 | Kaja | H04L 63/0428 |
| 2019/0036887 | A1* | 1/2019 | Miller | G06F 21/62 |
| 2019/0069177 | A1* | 2/2019 | Engan | G06F 21/42 |
| 2019/0387458 | A1* | 12/2019 | Li | H04W 48/16 |
| 2021/0037013 | A1* | 2/2021 | Salkintzis | H04L 63/06 |

OTHER PUBLICATIONS

N. Bozic, et al., "A Tutorial on Blockchain and Applications to Secure Network Control-Planes", $3^{rd}$ Smart Cloud Networks & Systems (SCNS), IEEE, Dec. 19, 2016, 8 pgs.

M. S. Zefreh, et al., "A Distributed Certificate Authority and Key Establishment Protocol for Mobile Ad Hoc Networks", Advanced Communication Technology, ICACT $10^{th}$ International Conference, IEEE, Feb. 17, 2008, 6 pgs.

S. Yin, et al., "M2M Security Technology of CPS Based on Blockchains", Symmetry, www.mdgi.com/journal/symmetry; 2017, vol. 9, No, 9, 16 pgs.

Jun-Young Bae, et al., "Distributed Key Certification Using Accumulators for Wireless Sensor Networks", "Lecture Notes of the Institute for Computer Sciences, Social informatics and Telecommunications Engineering", Sep. 28, 2014, vol. 131, pp. 500-511.

* cited by examiner

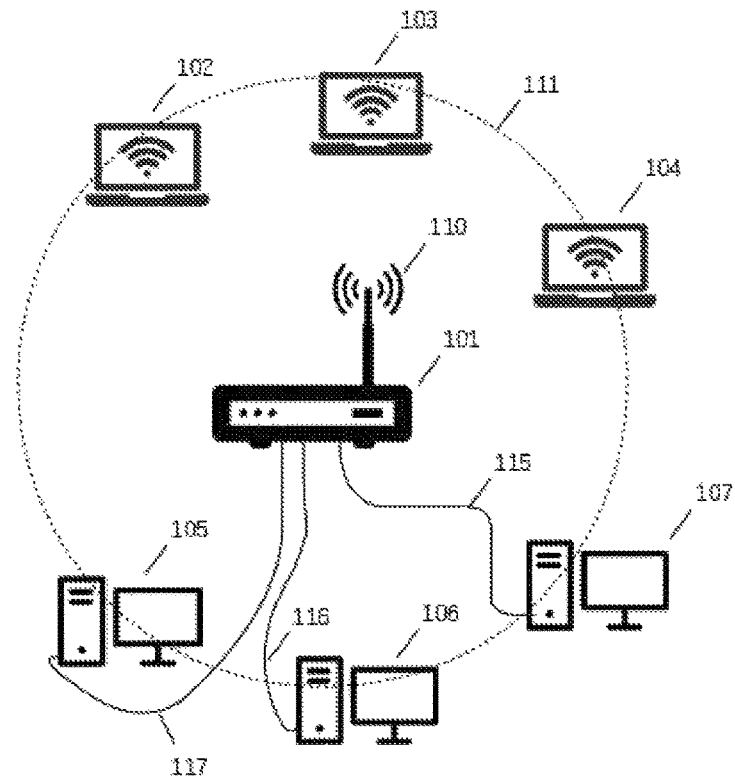
Fig. 1
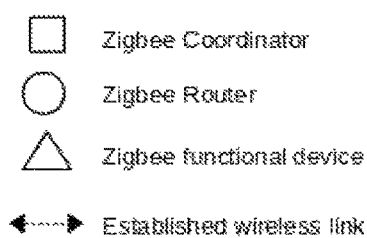
□ Zigbee Coordinator
○ Zigbee Router
△ Zigbee functional device
◄┄► Established wireless link
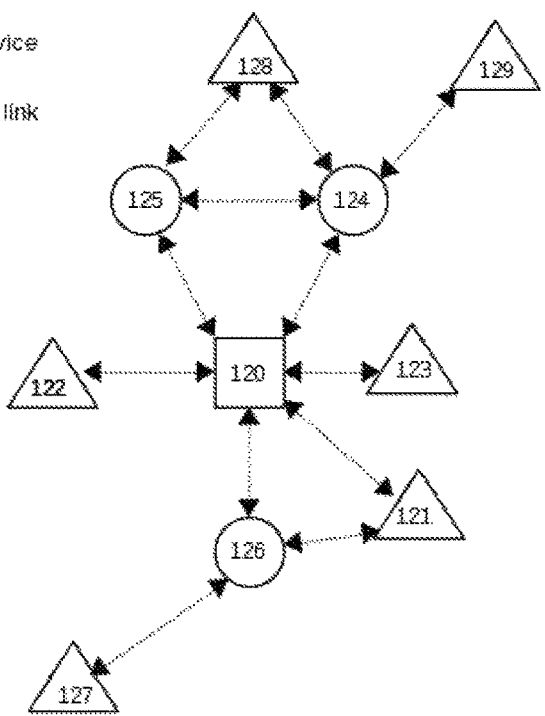
Fig. 2

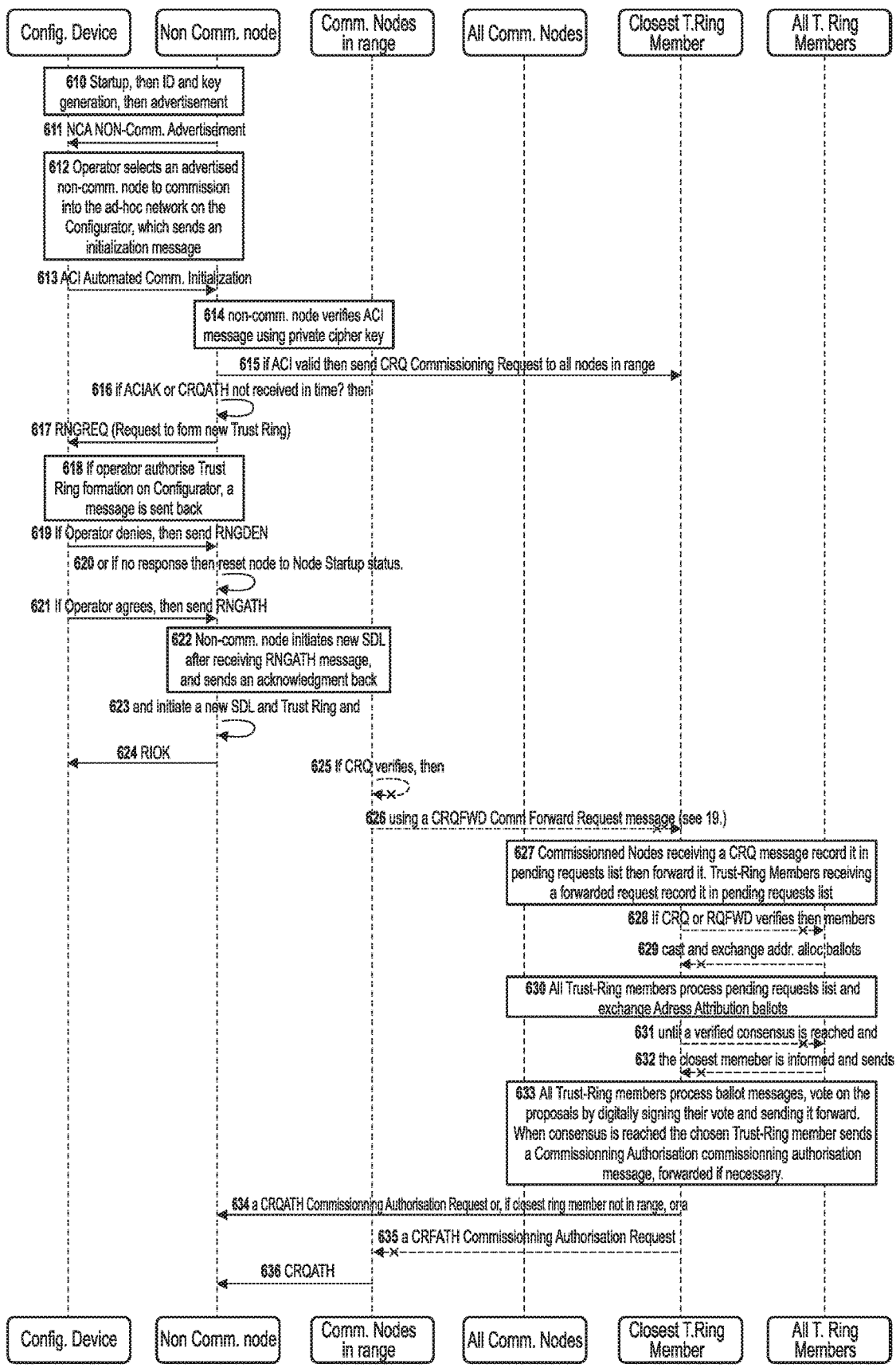
Fig. 7.1

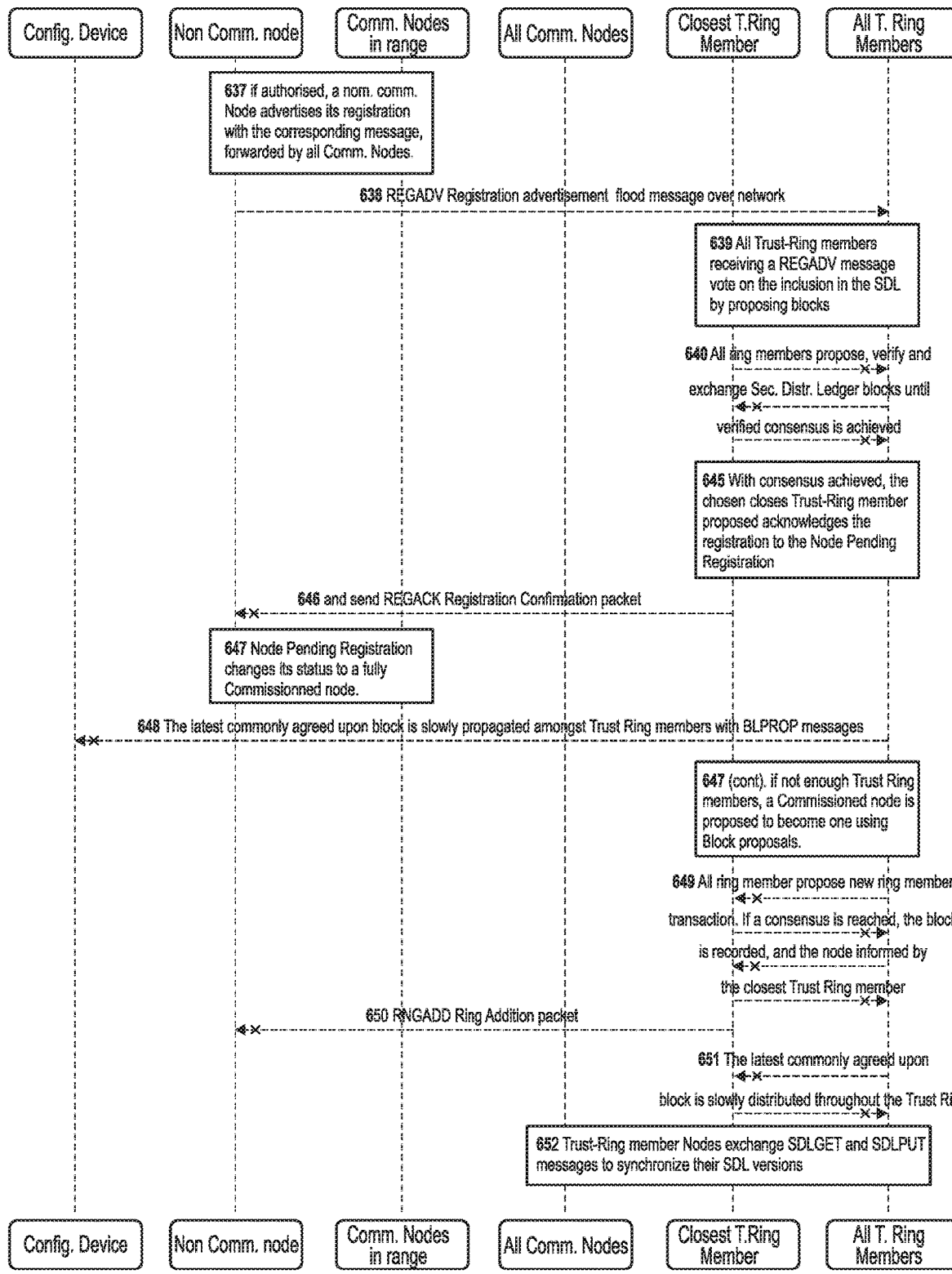
Fig. 7.2

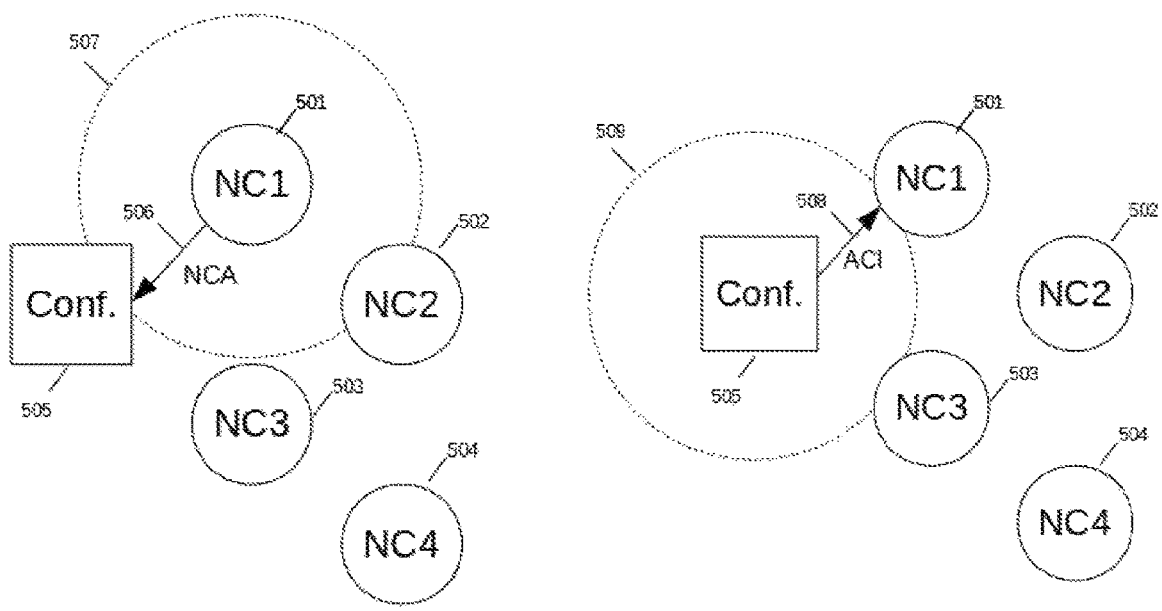
Fig. 11
Fig. 13
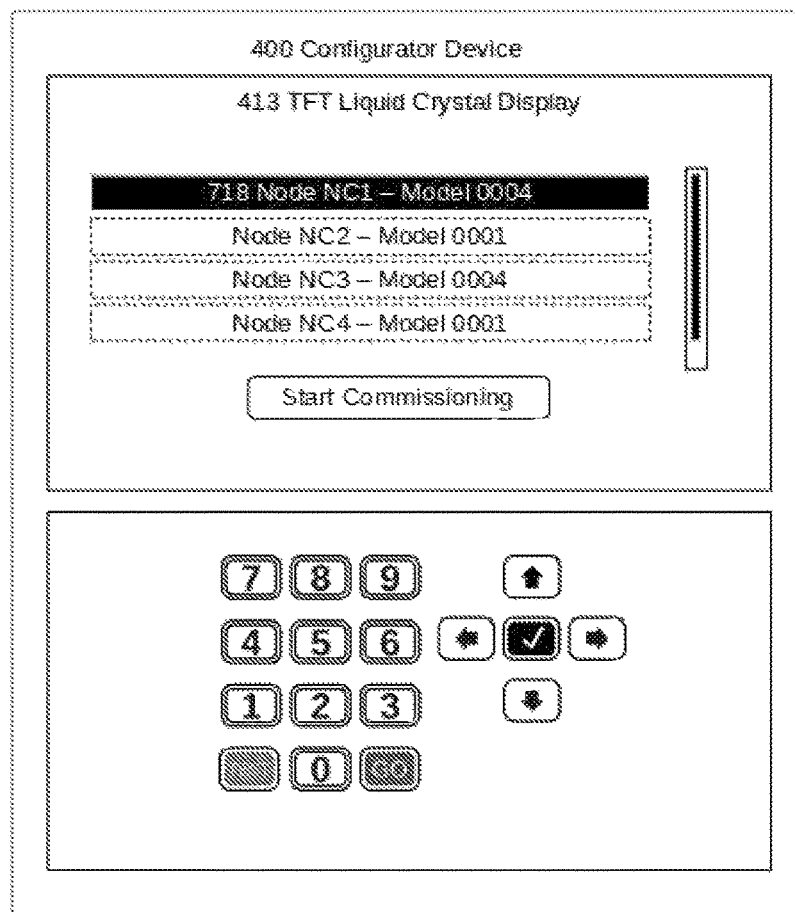
Fig. 12

Fig. 39.1
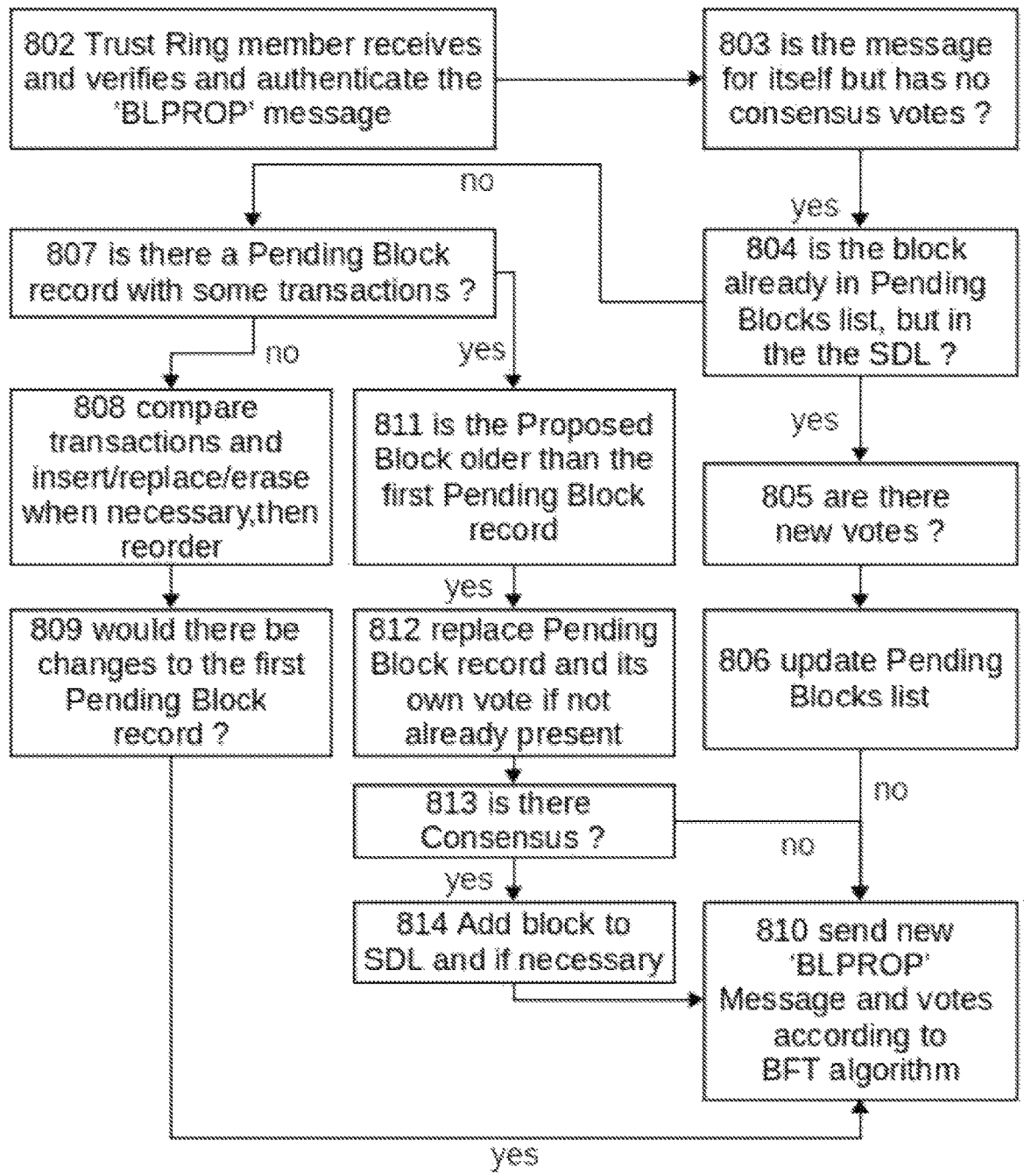

Fig. 39.2
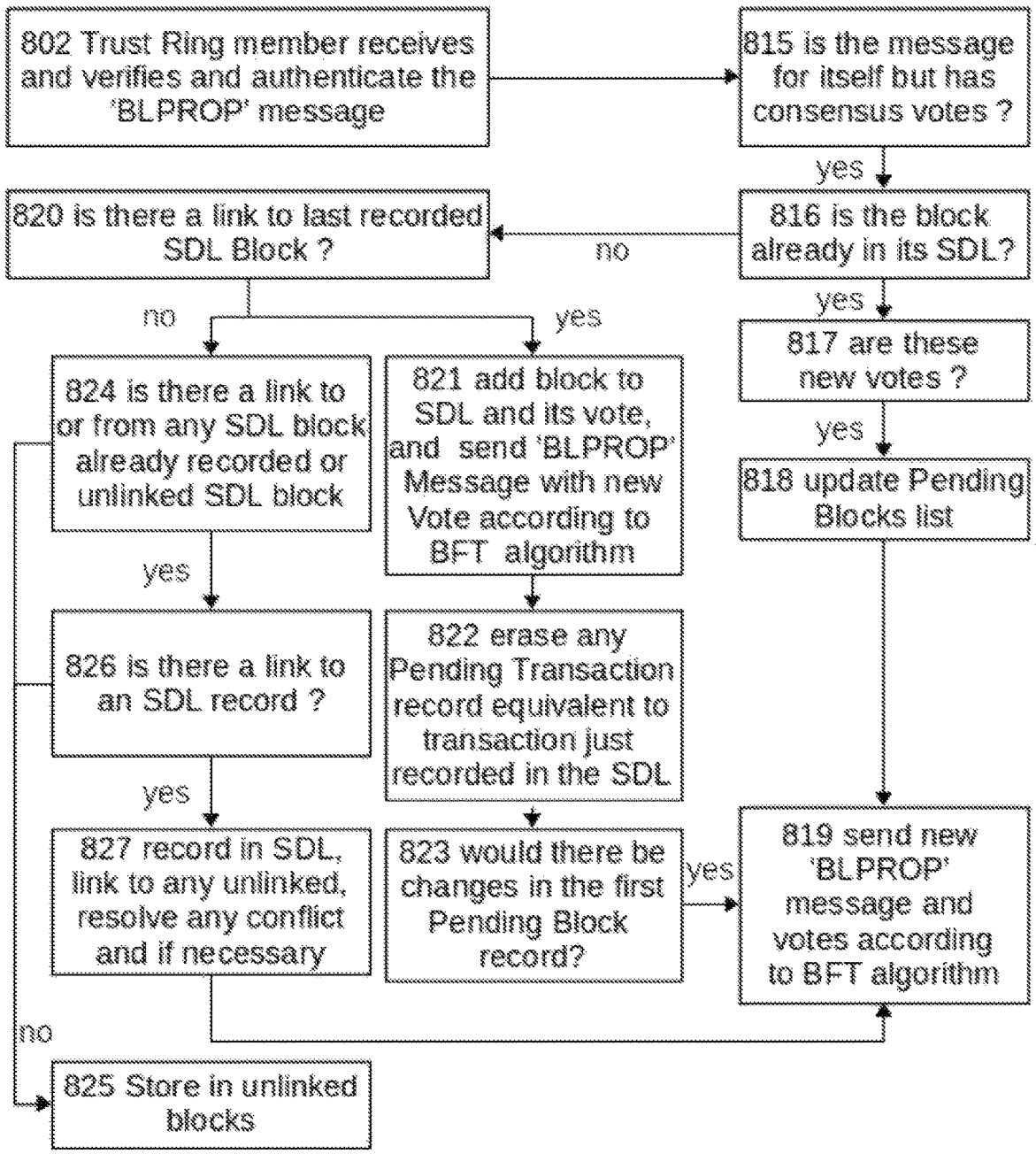

AD-HOC NETWORK

RELATED APPLICATIONS

This application is a national phase of PCT/IB2018/058828, filed on Nov. 9, 2018, which claims the benefit of Swiss Application No. CH01351/17, filed on Nov. 9, 2017. The entire contents of these applications are hereby incorporated by reference.

FIELD OF THE INVENTION

The present invention is related to digital communication systems operating as so-called "ad-hoc" networks, such as, but not limited to wired or wireless ad-hoc multi-hop "mesh"-type and other types of ed-centralized networks.

More particularly, the present invention is related to systems for automatically or semi-automatically deploying such ad-networks accepting new network elements in a manner which ensures confidentiality of communications, as well as engaging all available and possible peers in said network to collaborate in said process, while all operations and digital records on peers can be mathematical verified as authentic and not to have been tampered with, and which simultaneously attributes a unique numerical address for each element in said network, with or without human intervention, and which records all such operations in a distributed and decentralized ledger whose consistency and authenticity is mathematically verifiable.

BACKGROUND

The Internet is a world-wide decentralized network of interconnected local networks. Most of those networks are however centrally and hierarchically managed by local state, private, corporate or academic authorities. The immense majority of computer or other equipment is located in networks which are closed or semi-open to the rest of the Internet, in the sense that peers inside those networks can freely initiate connections to other publicly reachable peers over the Internet, while the opposite is not true for peer outside those networks.

Meanwhile, wireless local networks are becoming more and more popular. One such technology commercially distributed and available worldwide are on-premises private, public or corporate IEEE 802.11 Wi-Fi wireless networks, which allow access to both local networked resources and the Internet. Most importantly, the current mobile communication industry provides vocal and digital access to telephony networks worldwide as well as to the Internet using 2G, 3G, 4G GSM as well as CDMA IS-95 and CDMA2000 standards. Another technology which has seen wide adoption in for Smart-Building and Smart-Home applications are wireless technologies derived from the IEEE 802.15.4 standard such as the ZigBee, EnOcean or Z-Wave ecosystems. Yet another set of low-power long-range "Wide Area Networking" (WAN) wireless standards are used for the wireless connectivity of metering equipment and other Smart Grid applications, such as the SigFox or LoraWAN systems.

Most of those wireless networks are said to be "wireless ad-hoc networks", because, as defined in Wikipedia, they do "not rely on a pre-existing infrastructure, such as routers in wired networks or access points in managed (infrastructure) wireless networks. Instead, each node participates in routing by forwarding data for other nodes, so the determination of which nodes forward data is made dynamically on the basis of network connectivity and the routing algorithm in use. Wireless networks lack the complexities of infrastructure setup and administration, enabling devices to create and join networks" on the fly"—anywhere, anytime.".

The applications for wireless ad-hoc networks are numerous. A non-exhaustive list of applications from Wikipedia includes vehicle positioning ad hoc networks (VANETs), smart phone ad hoc networks (SPANs), Military Tactical ad-hoc networks (MANETs), a wide variety of wireless sensor networks, Ad Hoc Home Smart Lighting, Ad Hoc Street Light Networks, Disaster Rescue ad hoc network, Hospital ad hoc network.

Typically, such networking systems include at least one base station and a plurality of network peers. In the case of regular Wi-Fi networks, or WAN systems such as SigFox or LoRAWAN, all of the peers must absolutely be within physical detection range of the signal from the base station, and conversely, the base station must be able to detect the signal for all of the peers. Other such networking systems such as ZigBee, Z-Wave or EnOcean require only that some of the network peers be within communication range of the base station.

Most of the above-mentioned networking standards define for example the characteristics through time of the physical wireless radio link between two peers within physical radio range of each other, or the link between a peer and a base station, and how to manage transmissions through time so that two peers within a single network do not interfere with each other when transmitting, or yet even how a peer discriminates between transmission from peers from its own network, and peers from other networks. Only some of the more recent standards address network security issues by adding communication confidentiality capabilities with the addition of optional signal encryption.

In order to make connectivity possible between peers within a network which are not within radio range of each other, or peers which are in two different adjoining networks, or between a peer inside a network and a peer over the Internet, a variety of network additional coordination facilities are required. Such facilities are used for example to allow peers to be uniquely identified numerically, or to discover what the other peers in the network are, or to discover routes within the ad-hoc network between two peers which are not in range, or to securely exchange authentication credentials, or to provide a central index of resources.

Such systems, which have gradually been developed for general use since the invention of the Internet protocol include for example the Dynamic Host Configuration Protocol (DHCP) and services used to manage and distributed configuration settings as well as allocate unique numeric addresses for connected device in Internet Protocol (IP) based and networks, or the Domains Name System (DNS), protocol and services used to provide and translate numeric addresses in human readable names, or the Lightweight Directory Access Protocol (LDAP) and services which map names to specific network resources and their numeric addresses, or the Kerberos network identity secure authentication protocol.

Protocols and services such as those mentioned above generally function in a client-server model and architecture, which signifies, as per Wikipedia, that "tasks or workloads" are partitioned "between the providers of a resource or service, called servers, and service requesters, called clients". Additionally, each of those network services is typically run as a separate computer program, often on separate computers. Each of these services often have a very different architecture and mode of interaction. Some record configuration and data in text files, others in binary files and some even require a database program. Some depend on the underlying operating system for their security and access credentials, some manage their own, separately. Some can only be interacted through a command line, and others offer web-based or more recently "app"-based interfaces.

Most wireless ad-hoc networks standards give the capability to all network peers to route communication signals to the base station from other nodes that are outside the direct communication range of the base station, as well as the other way round. A functionality similar to a Wi-Fi or Ethernet router—which controls the topology of the network—is generally not necessary. However, mostly inspired by IP network architectures, all other network management functionality is typically performed by the ad-hoc network base station itself, or one or more a network-accessible computer in continuous communication with the base station. Some architectures even necessitate the maintenance of the network's topology by said base station—by definition a centralized system.

Wireless ad-hoc network systems, where topology control is typically fully automated, are often commercially promoted with under the "mesh" moniker. This is in our opinion somewhat misleading. Indeed, for those skilled in the art, a true "mesh" network's mathematical model can be constructed as a random geometric graph. This is not strictly true of all offerings, as some even necessitate the maintenance of the network's topology by said base station—by definition a centralized system. Still, Wi-Fi networks for example, when configured in the 802.11s mode, can for example also act as ad-hoc wireless networks. While only few commercial Wi-Fi "mesh" offerings have existed since the early 2010s for large installations such as airports or hotels, several consumer-grade products have become available worldwide since 2015.

It is consequently due to the multiplicity of services which need to be set-up and configured that it is generally accepted by those skilled in the art that setting up and configuring computer networks is not a simple task for a novice. Commercial efforts have been made for example to enable "plug-in" setup of small home and business networks. Vendors have packaged the necessary programs and sold them built-in home Wi-Fi routers, and adding a simplified configuration web-based user interface. Those offerings however only allow for simple scenarios, and do not scale beyond small networks. Planning and specialized knowledge are generally necessary to set-up any larger or more complex systems.

Similarly to Wi-Fi routers, some commercial wireless ad-hoc network offerings have packaged the relevant technology as "hubs" for specific applications, such as the Philips Hue Smart Lighting products—derived from Zig-Bee. Such solutions, in our opinion, suffer from the same aforementioned issues of scalability. Any more complex scenarios necessitate a manual peer-by-peer pairing of new devices. A variety of commercial Smart Building solutions exist example based on the ZigBee technology and ecosystem, but none is plug and play. Similarly, as the underlying technologies most often do not mandate any security feature, the proper set-up of a secure ad-hoc network is left to be manually performed by the network technician or engineer configuring the devices.

As such, each of these separate network services has generally its own separate security concepts and architecture. In the case of ad-hoc networks employing IP network technologies, a secure DNS system does not signify that an accompanying LDAP system for the same network is also secure. While for example the presence of a DHCP server in an IP based network eases the burden of configuring a new computer to function inside said network, providing a limited "plug-and-play" functionality, it is by no means secure itself and will usually requires a separate manual configuration of said LDAP service or communication confidentiality capabilities, such as encryption and authentication. Moreover, most ad-hoc networking standards do not mandate or even specify any communication encryption facilities or protocols whatsoever. The burden of implementing any security is left to the engineer developing application products using said technology. To mandate the authorization of peer to communicate with other peer in the network is possible, but generally not dependent on any particular rules set by a specific standard, instead being fully dependent on the creator of a particular implementation of said technology or standard. The fragmented state of security design in ad-hoc networks has led to widespread security engineering malpractice present in most commercially available solutions. Massive worldwide simultaneous hacks of hundreds of thousands of devices in ad-hoc networks have been documented from 2015 to 2017.

An additional concern is safety and reliability of operations. Indeed, if most of the necessary network services are all performed or transit through a single network peer, that same network peer constitutes a single point of failure. It is of course possible to set-up a network with automated backups servers and other fail-over systems and equipment, but that requires expert knowledge and skills. No commercial solution fully automates the setup and implementation of such reliability and fail-over systems, particularly when said network services are distributed across several separate servers.

In parallel, the developments of modern digital currencies called "crypto-currencies" has been made possible by the conceptualization of a database architecture called the "block chain" or "blockchain". As per Wikipedia, a blockchain is "is used to maintain a continuously growing list of records, called blocks. Each block contains a timestamp and a link to a previous block, and a mathematical hash of its own content and the previous block's content. A blockchain is typically managed by a peer-to-peer network collectively adhering to a protocol for validating new blocks. By design, blockchains are inherently resistant to modification of the data. Once recorded, the data in any given block cannot be altered retroactively without the alteration of all subsequent blocks and the collusion of the network.

A variation of the blockchain concept are "Distributed Ledgers", which are, as per Wikipedia "a consensus of replicated, shared, and synchronized digital data geographically spread across multiple sites, countries, or institutions. There is no central administrator or centralised data storage.", and "peer-to-peer network that uses a defined consensus mechanism to prevent modification of an ordered series of time-stamped records.", and "a peer-to-peer network is required as well as consensus algorithms to ensure replication across nodes is undertaken. One distributed ledger design is through implementation of a public or private blockchain system. But all distributed ledgers do not have to necessarily employ a chain of blocks to successfully provide secure and valid achievement of distributed consensus", and finally, "all blockchains are distributed ledgers, but not all distributed ledgers are blockchains.". In both architectures, each record can be mathematically cryptographically linked, signed and authenticated by an entity requesting the inclusion whose identity can be verified, of said record in the chain, in which case said blockchain can be described as a "secure distributed ledger".

Research in the practical applications of Blockchains have seen the appearance of the uses of blockchains as digital notaries, outside of digital currency systems, such as smart-contract management, digital voting, or art authentication. Research in Internet-of-Things applications include for example shipping container tracking. Most of those application are set-up using physical or virtual private peer-to-peer networks in which the network peers performing the verification and authentication of entities and records must be specifically authorized and accepted into said network and system. Such systems are called "permissioned" or "private" distributed ledgers. No solution currently on the market allows for the automated set-up and configuration of said verification peers for private distributed ledgers.

Private Distributed Ledgers thus represent a very good example of a fully trusted system for durably, reliably and securely recording authenticated information of all kinds. More specifically, backup, fail-over and replication are inherently managed by the core algorithms of the block-chain-based systems. The set-up of either "mining" nodes in crypto-currency systems, or of permission-based blockchain verification nodes is currently however still dependent on a manual configuration process.

Accordingly, those skilled in the art will thus recognize the need for a technology for ad-hoc networks which offers the simplest possible way to set-up said network services to manage and distributed the network's configuration settings. Similarly, those skilled in the art will also recognize the need for a technology to dynamically and automatically allocate and configure unique numeric addresses for each connected devices in the ad-hoc network, provide a way to translate numeric addresses in human readable names, and map names to specific network resources and their numeric addresses, while simultaneously securely distributing any cryptography related identifiers such as encryption keys.

Moreover, those skilled in the art will recognize the need for new devices to be simply, quickly, securely configured to function and be accepted by peers already configured for said network. Said new peers must also be able to confi-dentially communicate with other peers in the network, with no opportunity offered for communication interception or hijacking by third parties.

Those skilled in the art will further recognize the need for a technology for ad-hoc networks which allows for a secure, trusted, verifiable and reliable storage of network configu-ration and peer identity data. Such characteristics are offered by fully distributed database systems such as private dis-tributed ledgers.

Those skilled in the art will finally recognize the need for a technology which allows a simple, secure and automated deployment and configuration of voting, verification and authentication peers in private distributed ledgers.

In consequence, we propose a system and method which unifies and automates most of the deployment, configuration maintenance of the ad-hoc network management functions, and has one or more of the following characteristics:

it is fully distributed and homogeneous, in that all peers in a network deployed using this system would function with the exact same system and method, with no client-server distinction.

where the authorization of new nodes can function both in a semi-automated manner with minimal intervention by a human operator or in fully automated manner with no intervention by a human operator, and which requires only minimal knowledge of or skill in the art.

in which network configuration, as well as peer identity, and other data related to peers is recorded in a private distributed ledger maintained by peers in the network.

in which peers can be automatically attributed the role of data verification, with no intervention by a human operator.

DESCRIPTION OF THE RELATED ART

A. Ad-Hoc Networking Systems Following a Centralized Model

FIG. 1 provides an example of a centralized ad-hoc network in which peer 101, which is an IEEE 802.11 WiFi and IEEE 802.1 ethernet router, and which provides all its peers within its direct communications range (peers 102, 103, 104) or connected to it by an Ethernet cable (peers 105, 106, 107) all the coordination services necessary for the network to function, such as but not limited to network configuration data distribution (for example as a DHCP server), network peer authorization (for example by black-listing MAC addresses), routing data packets (TCP/IP and UDP routing), encrypting of wireless transmissions (for example using the WPA2 standard).

Commercial vendors usually provide WiFi routers with a modicum of "plug-and-play" capability with the "Wi-Fi Protected Setup" (WPS) as well as web-based configuration "wizards" programs. However, such an ad-hoc network setup has several disadvantages in all other regard in relation to the desired characteristics outlined earlier. The most notable shortcoming is that without adding equipment, the network is limited to the 110 router antenna's 111 range, or to the length of the Ethernet cables (115, 116, 117). WPS pairing of devices is notably insecure, and forbidding its use signifies that each particular device usually needs to have the network's configuration parameters to be manually input. "Headless" device designs are not possible in such cases, which makes setup and configuration more difficult. More-over, if router peer 101 ceases to function for any reason whatsoever, the network ceases in effect to function. Simi-larly, if network peer 101 is compromised by hostile third-party attackers, IEEE 802.11 and classical IP technologies provides no network-wide capability which would ensure the security and confidentiality of any information transmit-ted over the network—additional specially configured soft-ware is necessary.

Ad-hoc network model which rely on such centralized, brokered communication model similar conceptually to a pure server/client paradigm do not fulfil the desired charac-teristics outlined earlier.

B. Ad-Hoc Networking Systems Following a Hub-Focused Decentralized Model

FIG. 2 provides an example of a partly decentralized ad-hoc network in which peer 120, which is a IEEE 802.15.4 Zigbee Coordinator device, as well as functional device peers 121, 122 and 123 within its direct wireless commu-nications range, or further using Zigbee Router peers 124, 125 and 126 to communicate with functional device peers 127, 128 and 129, and which Zigbee Coordinator 120 usually provides the services necessary for its ad-hoc net-work to function, such as but not limited to network address attribution, topology control, network cipher keys reposi-tory. The Zigbee technology does not limit the topology of the network to a "star" model. By using its Zigbee Routers, in this instance peers 124, 125 and 126, the range of the network by several "hops" up to a certain degree. Zigbee routers are used to forward packets to and from the Zigbee coordinator 120, to and from each other, and to and from Zigbee endpoints, in this case peers 127, 128 and 129. The topology of the network may also be much more arbitrary, as is shown on FIG. 2.

The shortcomings of Zigbee installation are similar to a WiFi installation. While data routing is decentralized and partially distributed across network peers, all other functions are centralized on the Zigbee coordinator 120. Additionally, Zigbee networks have only recently been allowed.

C. Ad-Hoc Networking Systems Following a Decentralized Model

FIG. 3 provides an example of a decentralized networking system using the Thread technology, in which all peers (200, 201, 202, 203, 204, 205, 206, 207, 208, 209, 210, 211, 212) are potentially capable of forwarding data. Thread is a recent development promoted by an industry group and is typically aimed for smart home applications. There is no form of central network coordinating authority in a Thread installation. Peers which are, as defined by the Thread specification, "Router-eligible End Devices" (REED), are used to in the routing of data across the network, in which they collaborate. In our example, such REED devices are peers 202, 204, 208, 212.

The Thread technology advertises it can have an automated allocation of 16-bit addresses for ad-hoc networks as large as 65535 nodes. However, closer analysis of the protocol specifications reveals that there is a maximum of 32 active REED peers for each ad-hoc network, which limits the range of the network to small and mid-size installations. Similarly, while Thread uses "IPv6 Stateless Address Autoconfiguration" (see IETF RFC 4862) to attribute addresses; this system however is only usable for peers which are not active REED peers. While RFC 4862 defines a duplicate address detection mechanism, there is no support for case of network partitions, or to merge partitions. Additionally, said mechanism requires each address to be tested, which can cause prohibitive network-wide traffic for larger installations. Strangely, REED peers do not use that mechanism but necessitate to have a DHCP server within the network.

D. Ad-Hoc Networking Systems Following a Distributed Model

FIG. 4 provides an example of a distributed networking system using the CSRmesh technology, in which all peers (220, 221, 222, 223, 224, 225, 226, 227, 228, 229, 230, 231, 232), whose modules use Bluetooth BLE radio modules. In such an installation, each peer is capable of forwarding data to other peers, and contact any other peer without any need for any central authority.

There is no central topology control, such as is the case for Thread-based installations, and there is no single point of failure, which are both desirable characteristics. Moreover, the system uses a network-wide encryption key, which prevents "man-in-the middle" attack. However, message transmission is done using a primitive "flood" based mechanism. The problem with such a conception is that as the network grows, so does the number of messages transmitted, exponentially. This can cause a crippling congestion of communications within an ad-hoc network very quickly. Large installations of several hundreds or thousands of peers become extremely difficult in practice, in particular if such an installation has numerous sensors attached to a lot of peers. While there is no built-in limit as for the preceding technologies, the limit for CSRmesh is mathematical and algorithmic.

SUMMARY OF THE INVENTION

We describe here a system, method, and computer-readable medium are disclosed for providing ad-hoc networks with a completely secure and fully distributed network and network peer configuration functionality in which:

the method and computer-readable medium described herein are the same on all peers; the ad-hoc network implementing this Invention are a homogeneous self-contained fully distributed systems, with no client-server distinction; and all peers in ad-hoc networks implementing this Invention, hereafter "Node" or "Nodes", have the capability to maintain in cooperation with other such Nodes a data structure, hereafter "Secure Distributed Ledger" or "SDL", which can be mathematically verified in a distributed manner to have not been tampered with, and for which the initiator for the inscription of a new record, as well as each record, can be mathematically authenticated; and all Nodes have the potential capability described in this invention to vote on new record inscriptions in said distributed ledger, as well as mathematically verify and authenticate said records, votes and inscriptions; and a system, which is also a Node, which has a display and interaction device, hereafter a "Configurator Device", is used to input any necessary data or instruction, by a human operator, where needed as prescribed by the methods of the Invention; and new Nodes can be securely authorized by a number of other Nodes to communicate with nodes in the network, and then be provided the necessary network configuration information, a process of this invention which is hereafter called "to be commissioned". A Node which has successfully undergone the process is called a "Commissioned Node"; and the ad-hoc network is deployed by commissioning new Nodes; and new Nodes can have themselves attributed collaboratively by a number of other Nodes, during the commissioning process, a unique sequential congruent numeric network address, with complete avoidance of collisions, while simultaneously with being provided the necessary identifiers to encrypt any communication and digitally sign any message; and where the commissioning of new nodes can functions both in a semi-automated manner, with minimal intervention by a human operator, through a Configurator Devices, or in fully automated manner with no intervention and only minimal knowledge of or skill in the art from the human operator; and Nodes commissioned in an ad-hoc network implementing this Invention can request to be attributed the role of "Trust Ring Member", which entails but is not limited authorizing new Nodes, voting during the commissioning process of new Nodes, authenticate Nodes and messages, verifying new SDL records, maintaining said SDL, distributing the SDL to other Nodes, which role is said to be a; All Trust Ring Members are collectively hereafter called the "Trust Ring" for said ad-hoc network; if no Trust Ring exists in a particular ad-hoc network or partition of an ad-hoc network, any Node detecting such fact can initialize a new Trust Ring and SDL, with minimal intervention by a human operator, through a Configurator device; and A Node or several Nodes which are already Trust Ring members for an ad-hoc network can cooperate and vote to cause an already commissioned Node to be authorized to become a new Trust Ring member for said network, and thus perform the same functions with no intervention by a human operator; and optionally, meta-data concerning each Node, such as but not limited to its capabilities, characteristics, its name or names of resources available on said Node for any already commissioned Node can be recorded in the Secure Distributed Ledger along with its unique numeric address and other identifying parameters; and the entirety of the processes described herein use where possible asymmetric public/private key cipher systems to encrypt any messages and data, sign any and information whenever possible, only to progressively exchange information necessary for commissioning to prospective new Nodes, never disclosing or transmitting in clear text any information, encrypt all communications, and thus create an cryptographically unbroken and mathematically verifiable chain of events from the powering up of a new Node to the full end of the commissioning process as described in the Invention; and

BRIEF DESCRIPTION OF DRAWINGS

FIG. 1 shows a schema of a number of digital communicating devices connected in a so-called where both the communication as well as the command and control infrastructure are connected using a "Centralized" topology.

FIG. 2 shows a schema of a number of digital communicating devices connected in which the communication infrastructure is "De-Centralized" but the command and control infrastructure is "Centralized" at a hub device.

FIGS. 7.1 and 7.2 show a general protocol diagram of the methods from the invention.

FIG. 9 shows a schema of several Non-Commissioned Nodes and a Configurator Node before being powered on.

FIG. 10 shows a diagram of the method from the invention which Nodes follow when being first powered on.

FIG. 11 shows a schema of a Non-Commissioned Nodes sending Non-Commissioned Advertisement "NCA" message to all Configurator Devices within range.

FIG. 12 shows a schematic example of a display connected to a Configurator Device showing a choice for a human operator as to which Nodes within range for which an "NCA" message was received shall be added to the network.

FIG. 13 shows a schema of a Configurator Node sending an Automated Commissioning Initialization "ACI" for the first Non-Commissioned node.

FIGS. 39.1 and 39.2 show a diagram of the method from the invention which Trust Ring member follow when receiving a registration advertisement message, and then exchanging Block Proposals "BLPROP" messages.

DETAILED DESCRIPTION OF POSSIBLE EMBODIMENTS OF THE INVENTION

Figure 3:
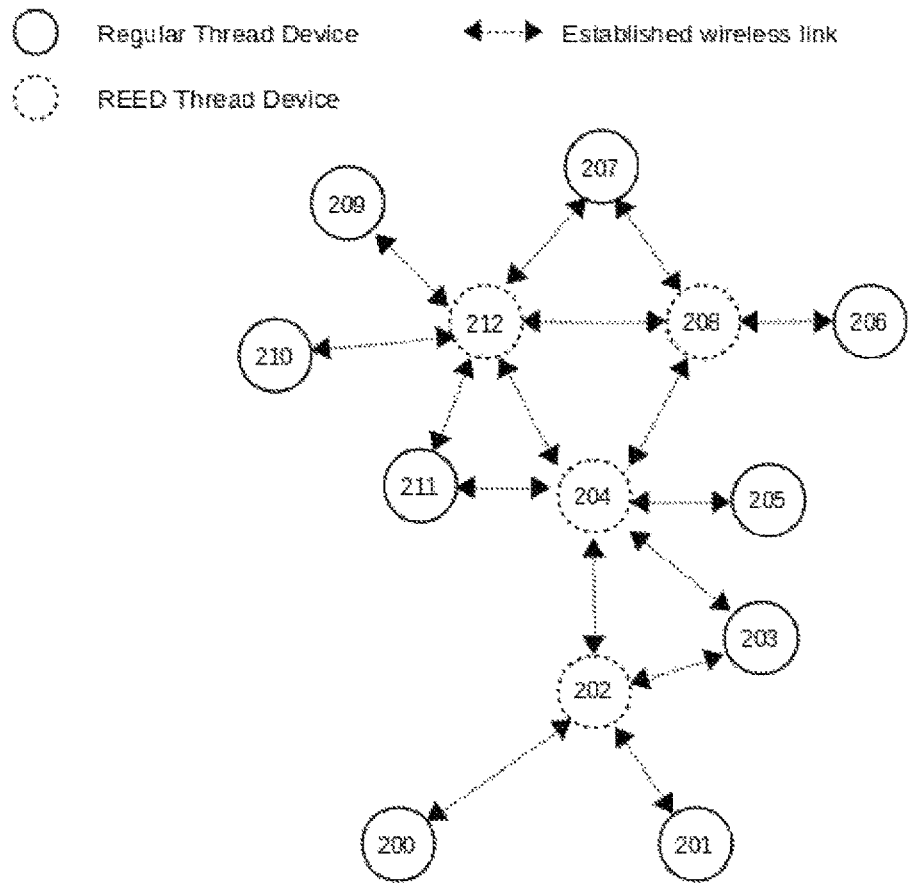
FIG. 3 shows a schema of a number of digital communicating devices connected in a so-called where both the communication as well as the command and control infrastructure are connected using a "De-Centralized" topology.
Figure 4:
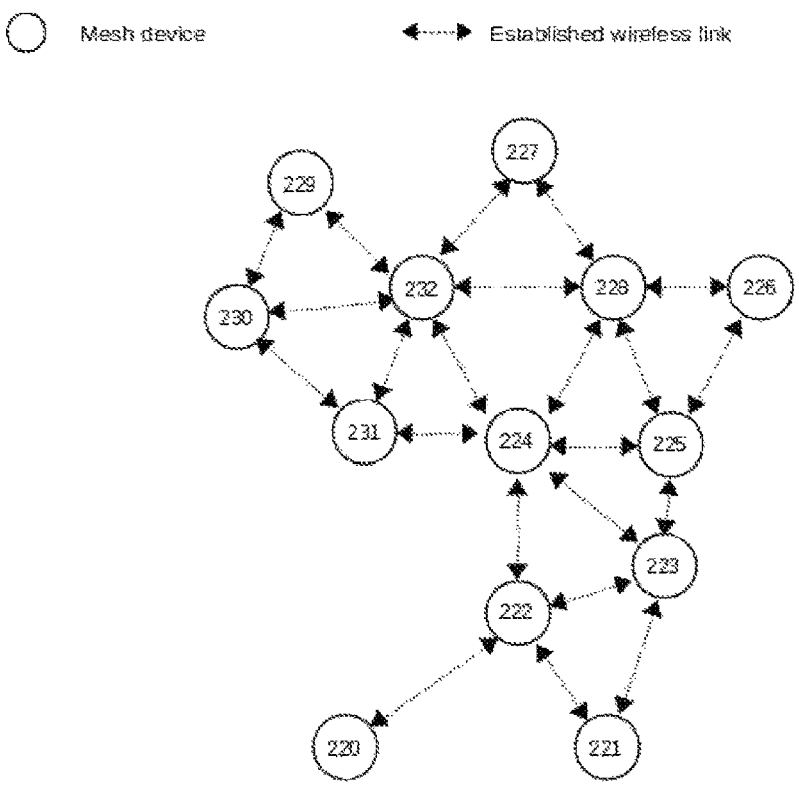
FIG. 4 shows a schema of a number of digital communicating devices connected in a so-called where both the communication as well as the command and control infrastructure are connected using a fully "Distributed" and topology where all nodes are homogeneous in capability.

A. Automated and Semi-Automated Secure Ad-Hoc Network Deployment

The present Invention provides for a secure system and methods which facilitate for someone not skilled in the art to effect the deployment of a ad-hoc network with little or no knowledge of digital communications, networking or computers, quickly, and with a minimum of interaction with the equipment. Ideally, in preferred embodiments of the Invention, the operator in charge of setting up said network will only be required to have in hand a device with an attached display and interaction device and which embodies the invention. Such a device (hereafter called a "Configurator Device") shall be sufficient to initiate the configuration of the ad-hoc network itself as a whole, and detect any peer embodying this Invention and which is not already accepted by and able to communicate with other peers of said ad-hoc network (hereafter said to be "non-commissioned").

In preferred embodiments of the Invention, Non-Commissioned peers announce their presence by periodically sending messages over the chosen communication for said network. The Configurator Device detects all the Non-Commissioned peers it detects and displays a list of such peers for its operator. The operator may then initiate, with a simple interaction such as a key press or a touch on the display of the Configurator Device, a fully automated and fully distributed process of inclusion of said peer into the ad-hoc network being deployed. The Configurator Device sends an encrypted information token specifically tailored for the Non-Commissioned peer chosen by the operator. The token contains sufficient information about the ad-network so that other peers already deployed within may recognise it as a future prospective ad-hoc network peer, but not enough to allow access to secure communications within the ad-hoc network. The Non-Commissioned peer then forms a request with the information token with which is request acceptance from peers which are accepted in and able to communicate within said ad-hoc network (hereafter said to be "Commissioned").

In preferred embodiments of the Invention, Commissioned peers which receives such a request transport it across the network to other Commissioned peers which are mandated by the methods of this Invention to collaborate to verify whether the potential new peer may or may not be accepted in the network. Peers mandated to collaborate on verification are part of the ad-hoc network's "Trust Ring". All Trust Ring peers then vote on various parameters of its acceptance, such as but not limited to the next available sequential unique network-wide numeric address, as evidenced by the Distributed Ledger each maintains, as well as to the Trust Ring peer elected to communicate with the new peer during the rest of the Commissioning process. If said prospective new peer is deemed acceptable by a sufficient number of Trust Ring peers, as mandated by the methods of this Invention (i.e. if "consensus is achieved", and if consensus is also achieved on the acceptance parameters, the potential new ad-hoc network peer is automatically provided by Trust Ring peers with another tailored encrypted information token, transported back across the ad-hoc network by already Commissioned peers. This new token contains all the necessary information which allow the new peer to communicate securely within the ad-hoc network, and request to be registered durably as part of the ad-hoc network (i.e. to become "commissioned").

In preferred embodiments of the Invention, after receiving and processing the new token, the Non-Commissioned peer will now said to be "Pending Registration", and will automatically broadcast a request across the entire network for its durable registration (or multi-cast, depending on the characteristics of the network). Trust Ring peer will then automatically vote on its final registration in the a shared, secured Distributed Ledger, which Trust Ring peers are mandated to maintain by the methods of this Invention. Once that voting process is complete, the Trust Ring peer chosen to communicate with the peer Pending Registration will inform said peer that its Commissioning is complete and that it may now communicate freely with other already Commissioned peers of the ad-hoc network. Once it receives and processes the information, the peer Pending Registration will now be said to be Commissioned, and will start behaving as such, as described above and in the methods of this Invention.

In preferred embodiments of the Invention, if, however, at the beginning of the process, after receiving information about the network from the Configurator Device the prospective new peer detects no answers to its request for commissioning, it may request from the human operator, with a message tailored for, processed by and displayed on the Configurator Device, whether to initiate the formation of a new network/network partition by transforming itself into a Trust Ring peer, and creating a new Distributed Ledger for said network/network partition. If the operator accepts, the Configurator Device sends a specially encrypted authorisation token, which, when received and processed by the Non-Commissioned peer, causes the latter to initiate the formation of said new Trust Ring and secured Distributed Ledger, as mandated by the methods of this Invention.

In preferred embodiments of the Invention, similarly, later on, if one or more Trust Ring peers in a network/network partition detect that, as mandated by that network's parameters, their number is insufficient to provide the desired level of security, verification and trust for their ad-hoc network, an already Commissioned may be elected to become a Trust Ring peer. The newly elected peer will be sent the instruction, by a chosen Trust Ring peer, to transform itself into a Trust Ring peer. It may request and get a copy of the Distributed Ledger from other Trust Ring peers. The Trust Ring, which serves as the foundation for the security infrastructure of ad-hoc networks implementing this Invention, expands itself automatically as needed, with no intervention by a human operator.

B. Chronological Example of a Secure Ad-Hoc Network Deployment

Figure 9:
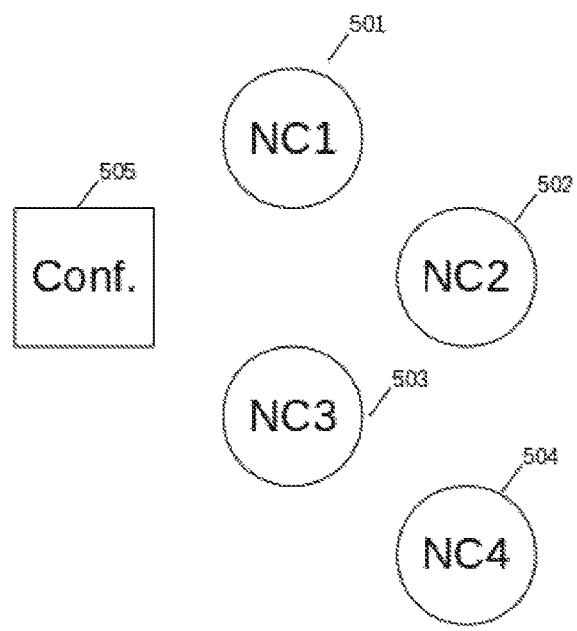
Figure 15:
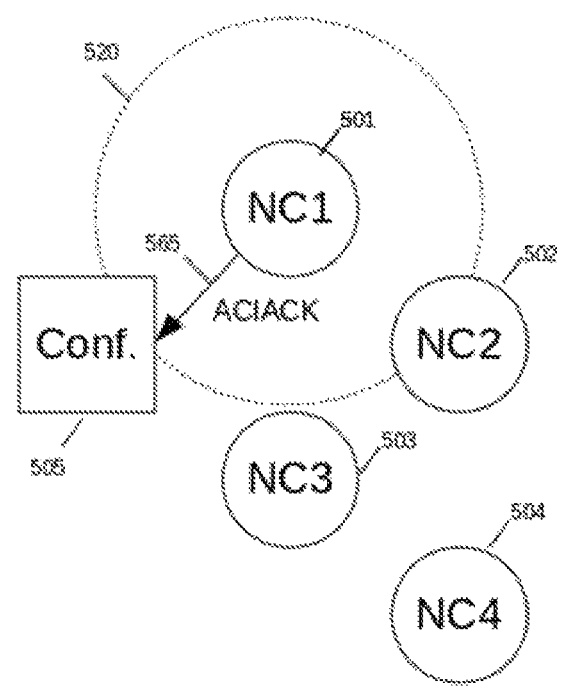
FIG. 15 shows a schema of a Non-Commissioned Node sending a Automated Commissioning Initialization Acknowledgment "ACIACK" message for the Configurator Device.
Figure 16:
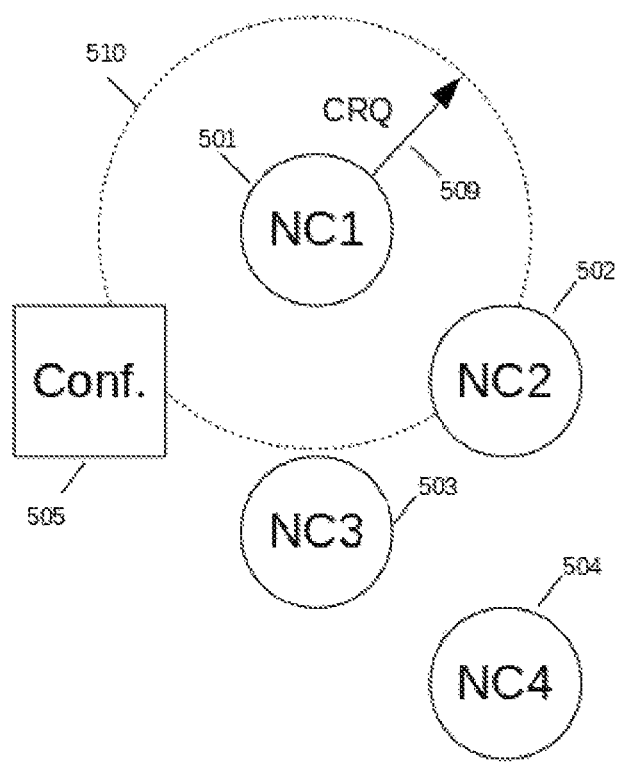
FIG. 16 shows a schema of a Non-Commissioned Node sending a Commissioning Request "CRQ" message to all Commissioned Nodes or Trust-Ring Member Nodes within range.

As a starting situation, FIG. 9 shows four Non-Commissioned peers 501 NC1, 502 NC2, 503 NC3 and 504 NC4 as well as 505 Configurator Device before being powered on. After being powered-on, Non-Commissioned peers advertise their presence to any Configurator Device. FIG. 11 shows 501 NC1, one of the Non-Commissioned peers sending a Non-Commissioned Advertisement "NCA" message to all Configurator Devices within range, and 506 the NCA message being received by the 505 Configurator Device. FIG. 12 then shows a schematic example of the 505 Configurator Device showing 501 NC1 being 718 selected by the operator. The Configurator then sends back a specially tailored Automated Commissioning Initialization "ACI" message for 501 NC1, as shown on FIG. 13, which contain the token mentioned above, encapsulating sufficient information about the ad-network so that other peers already deployed within may recognise it as a future prospective ad-hoc network peer, but no security-related information. 501 NC1 then acknowledges reception of said ACI message, as shown in FIG. 15, by sending a 565 Automated Commissioning Initialization Acknowledgment "ACIACK" message for the 505 Configurator Device, before forming and sending, as shown in FIG. 16 a 509 Commissioning Request "CRQ" message to all Commissioned Nodes or Trust-Ring Member Nodes within range.

Figure 18:
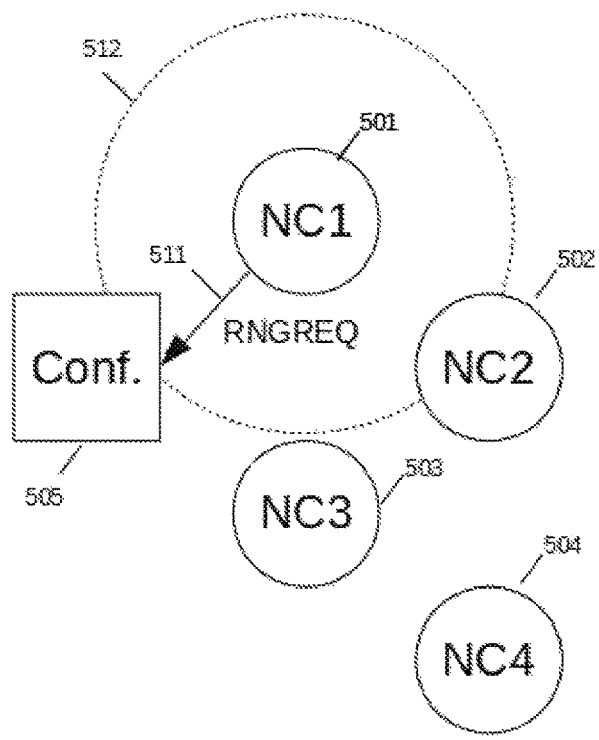
FIG. 18 shows a schema of a Non-Commissioned Node sending a Trust Ring Formation Request "RNGREQ" message.
Figure 19:
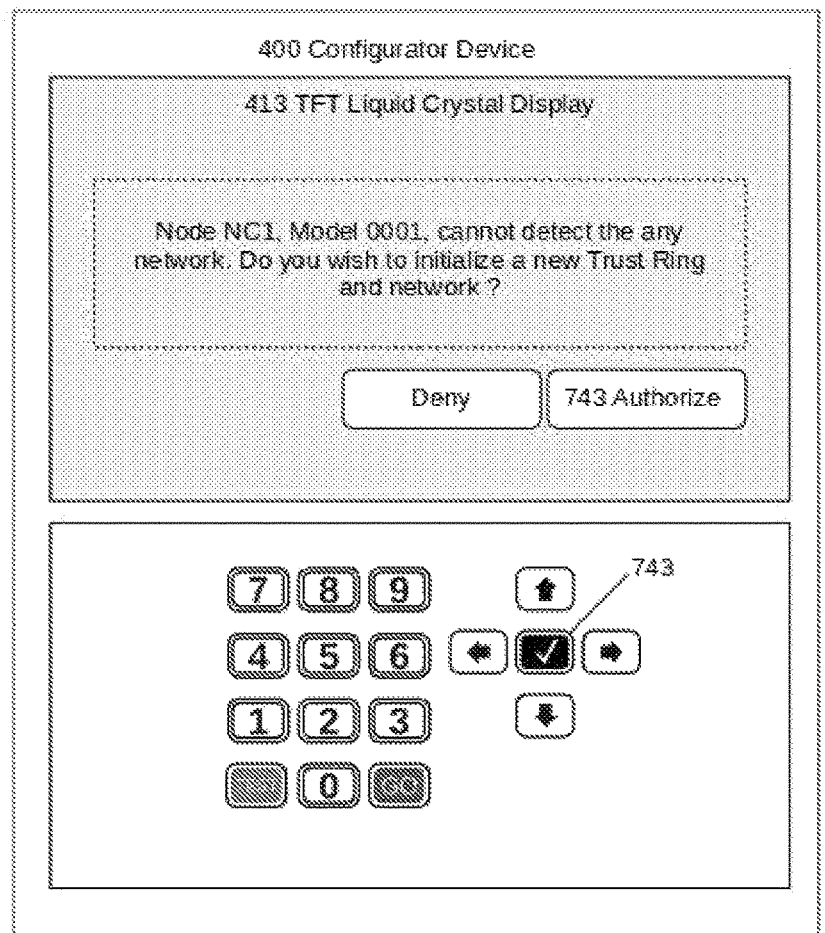
FIG. 19 shows a schematic example of a display connected to a Configurator Device showing a choice for a human operator as to whether a given Nodes which request the formation of a new Trust Ring shall be authorized to, by said operator.
Figure 22:
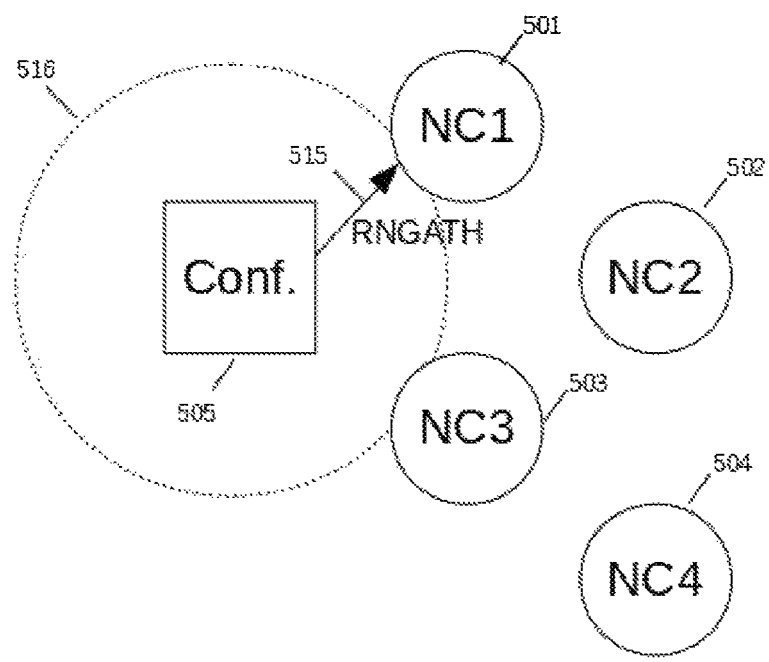
FIG. 22 shows a schema of a Configurator Device sending a Trust Ring Formation Authorization "RNGATH" message.
Figure 24:
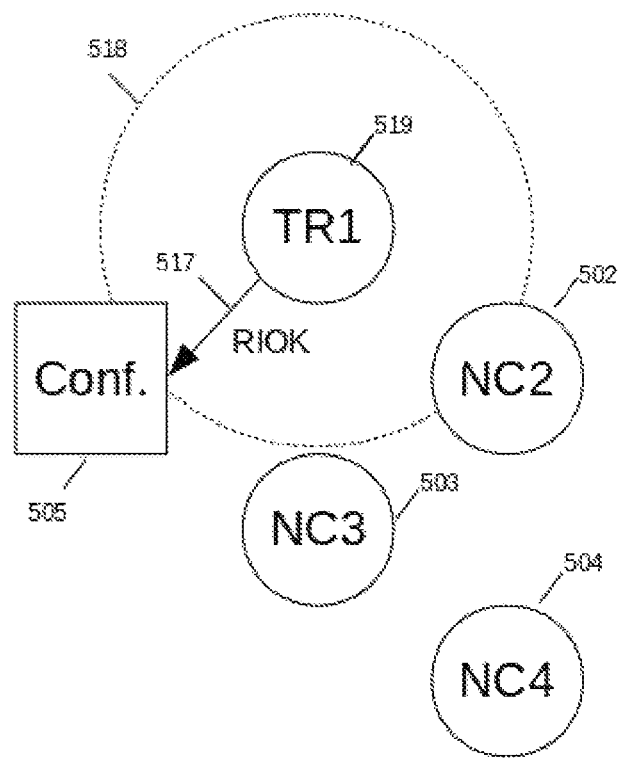
FIG. 24 shows a schema of a newly transformed Trust Ring Member Node sending a Trust Ring Formation Finished "RNGIOK" message.

As 501 NC1 has no already accepted network peers, it concludes after several CRQ emissions and some time has passed, that it is either the first node in said ad-hoc network, or that it is the first in a physically separate network partition of the same network. 501 NC1 then sends, as shown in FIG. 18, 511 a Trust Ring Formation Request "RNGREQ" message, which is detected and processed by 505 the Configurator Device. FIG. 19 shows an example of the authorization request for the operator displayed on 400 a Configurator Device, which said operator can accept by pressing the 743 button. If the operator accepts, as FIG. 22 shows, the Configurator Device sends 515 a Trust Ring Formation Authorization "RNGATH" message, with all the necessary information to create a new network/network partition and initiate a new Distributed Ledger. 501 NC1 processes said message, performs the actions mandates by this Invention, and becomes, as FIG. 24 shows, a newly transformed 519 TR1 Trust Ring network peer, before sending 517 a Trust Ring Formation Finished "RNGIOK" message, which 505 the Configurator Device receives and processes.

Figure 25:
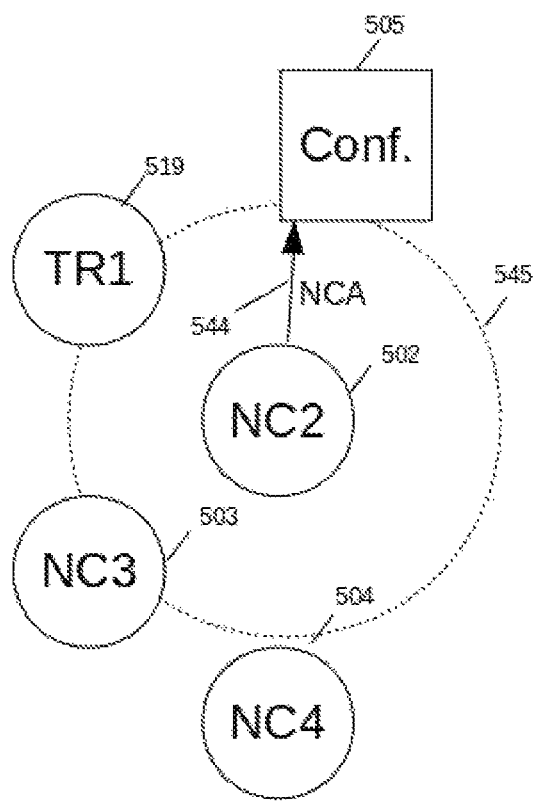
FIG. 25 shows a schema of a second Non-Commissioned Node sending an Non-Commissioned Advertisement "NCA" message.
Figure 27:
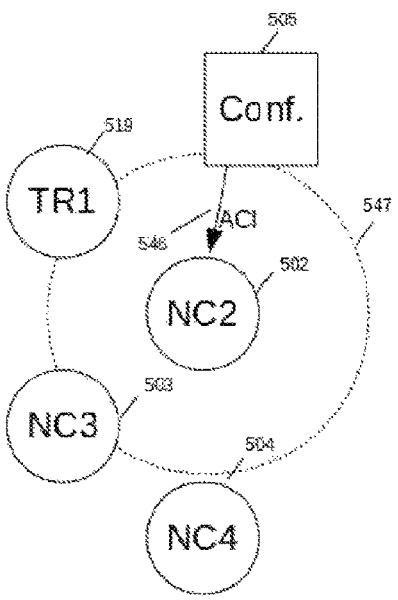
FIG. 27 shows a schema of a Configurator Node sending an Automated Commissioning Initialization "ACI" for the second Non-Commissioned node.
Figure 28:
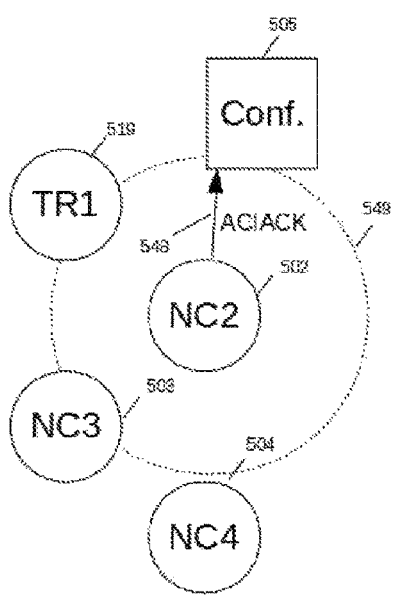
FIG. 28 shows a schema of a second Non-Commissioned Node sending a Automated Commissioning Initialization Acknowledgment "ACIACK" message for the Configurator Device.
Figure 29:
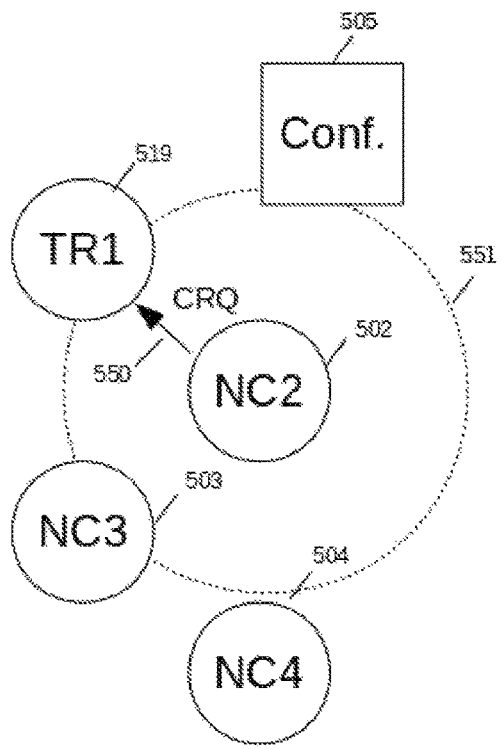
FIG. 29 shows a schema of a second Non-Commissioned Node sending a Commissioning Request "CRQ" message.
Figure 31:
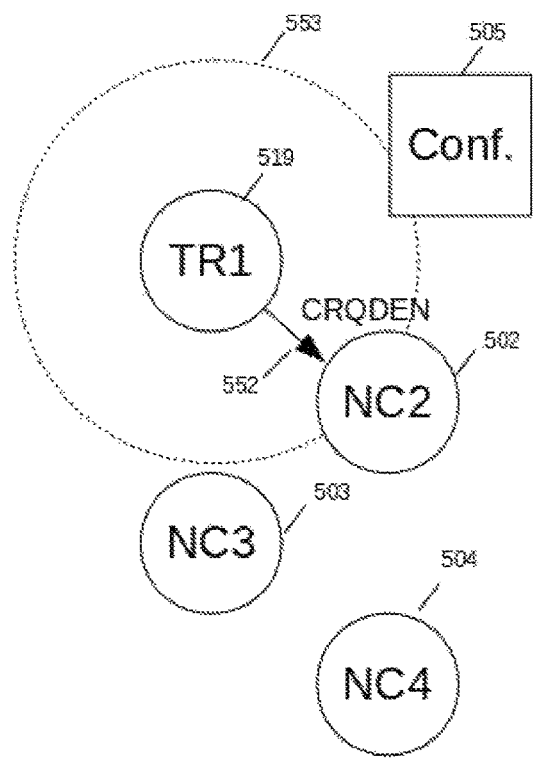
FIG. 31 shows a schema of a Trust Ring Member sending a Commissioning Request Denial "CRQDEN" message.
Figure 33:
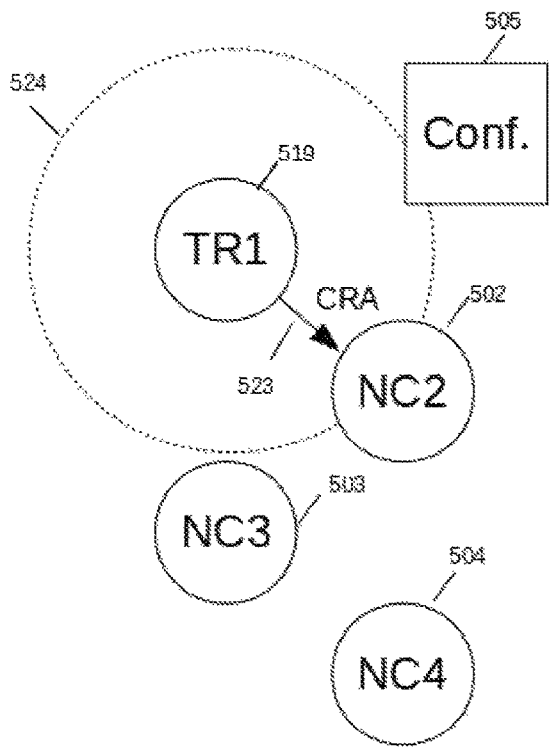
FIG. 33 shows a schema of a Trust Ring Member sending a Commissioning Request Authorization "CRA" message to a second Non-Commissioned Node.
Figure 35:
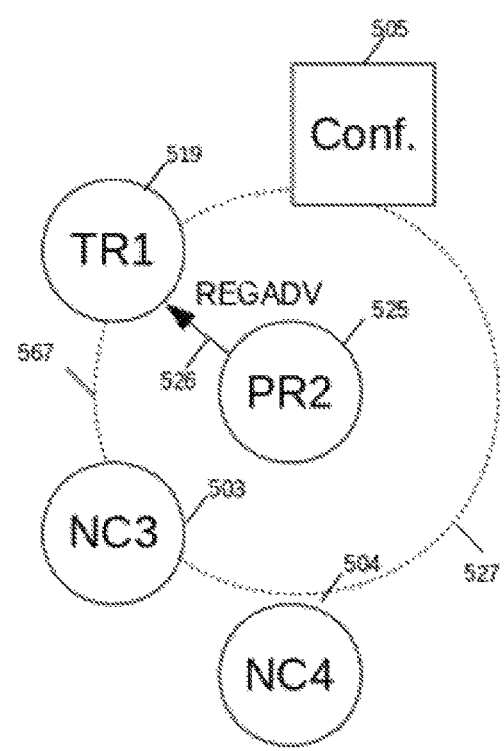
FIG. 35 shows a schema of a Node which is Pending Registration sending a Registration Advertisement "REGADV" message.
Figure 37:
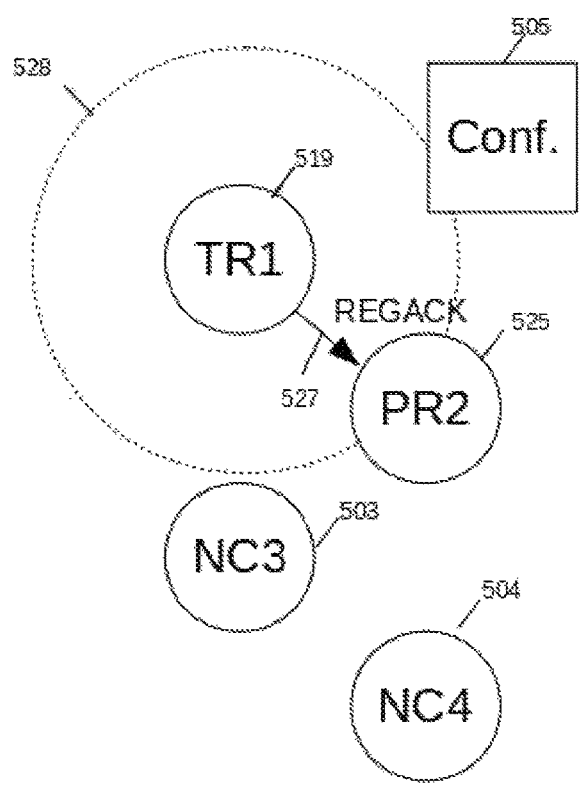
FIG. 37 shows a schema of a Trust Ring Member sending a Registration Acknowledgment "RNGACK" message.

With a new network thus created with its first node, the operator can now physically move around the installation, and select 502 NC2, the next node to be commissioned into the network, as FIG. 25 shows, after receiving and processing its 544 "NCA" message. 505 The Configurator Device now sends another 546 ACI message, as FIG. 27 shows, this time tailored to 502 NC1. As NC1 earlier, 502 NC2, following the methods of this Invention, also sends, as FIG. 28 shows, 548 an "ACIACK" message for 505 the Configurator Device, before sending, as FIG. 29 shows, its own 550 "CRQ" message. Said 550 CRQ message is then received and processed by 519 TR1, which is both the first peer commissioned into the network as well as its first Trust Ring Member peer. 519 TR1 verifies the information contained in 550 CRQ message, which 502 NC2 formed using the token received in 546 the ACI message sent by 505 the Configurator device. As it is deemed valid, 519 TR1, as FIG. 33 shows, then consults its Distributed Ledger, "votes" with itself, and attributes a unique numeric network address to 502 NC2, as well as decides it is itself the best Trust Ring member peer to communicate with 502 NC2. It then sends to 502 NC2 a 523 Commissioning Request Authorization "CRA" message using the results of its vote and decision. 502 NC2 receives and processes said message, performs the actions mandates by the methods of this Invention, and transforms itself, as FIG. 35 shows, 525 PR2, a commissioned network peer which is Pending Registration. 525 PR2 then broadcasts 526 a Registration Advertisement "REGADV" message which contains its identity related information, unique address and unique encryption key. FIG. 37 shows 519 TR1 after having processed said 526 REGADV message and recorded the information contained therein in its Distributed Ledger, sending an 527 Registration Acknowledgment "RNGACK" message. 525 PR2 processes said 527 messages and transforms itself in 568 C2, a validly commissioned peer in the ad-hoc network being deployed, as shown in FIG. 38.

Figure 38:
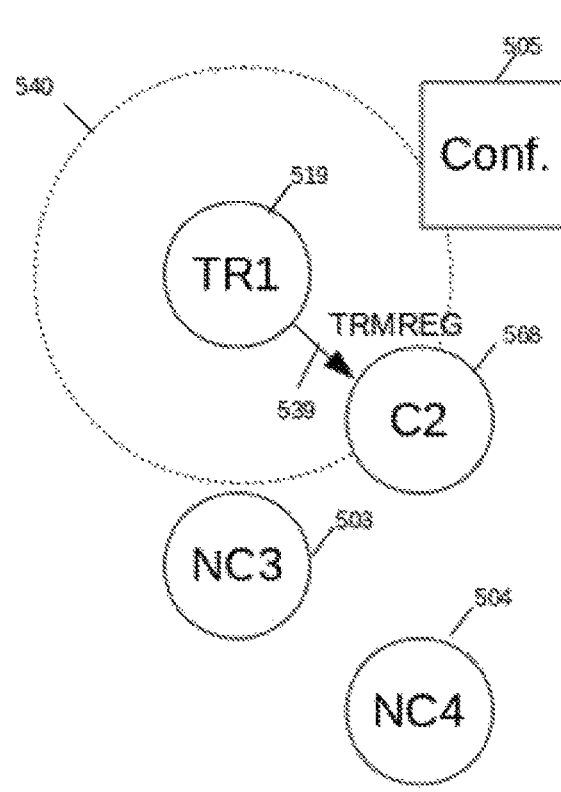
FIG. 38 shows a schema of a Trust Ring Member sending a Trust-Ring Member Addition "RNGADD" message.
Figure 40:
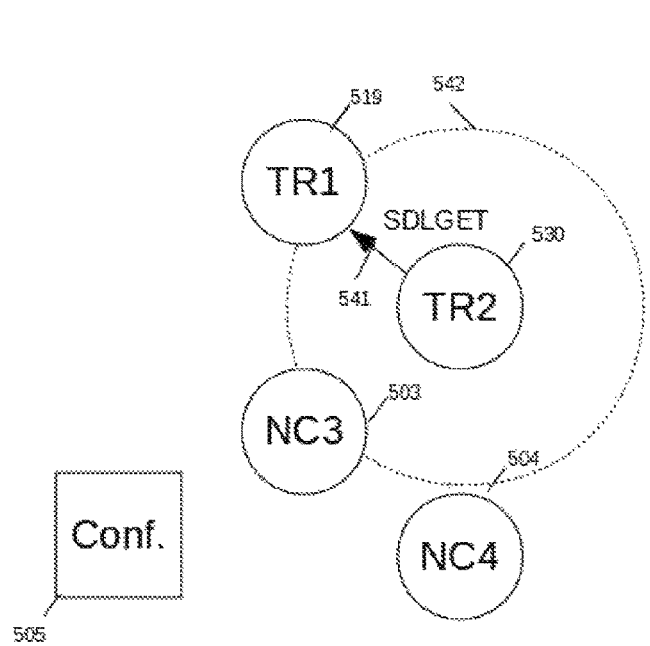
FIG. 40 shows a schema of a Trust Ring Member sending a Shared Distributed Ledger Get "SDLGET" message.
Figure 41:
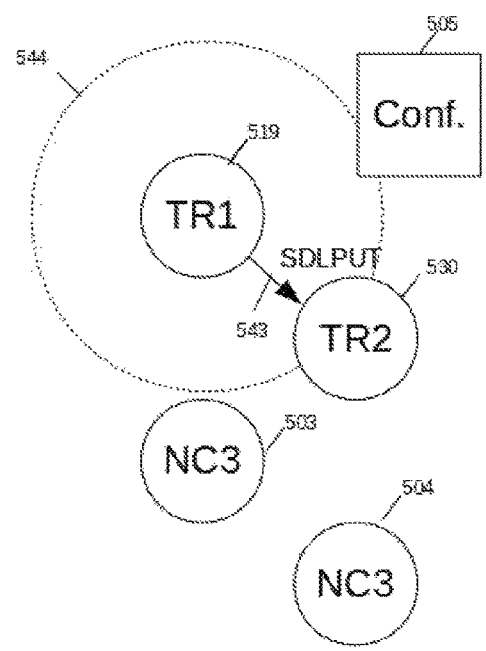
FIG. 41 shows a schema of a Trust Ring Member sending a Shared Distributed Ledger Put "SDLPUT" message.

519 TR1 detects there is not enough Trust Ring peers, then votes and decides to transform the only other commissioned peer 568 C2 into a new Trust Ring member, as mandated by the methods of this Invention. 519 TR1, as FIG. 38 also shows, sends 539 a Trust-Ring Member Registration "TRM-REG" message, which is received and processed by 568 C2, which, as FIG. 40 shows, transforms itself into 530 TR2, another Trust Ring member peer. 530 TR2 then requests from 519 TR1 a copy of the Distributed ledger with 541 SDLGET message for 519 TR1, as FIG. 40 shows, which sends it back with 543 an SDLPUT message, as FIG. 41 shows.

Figure 42:
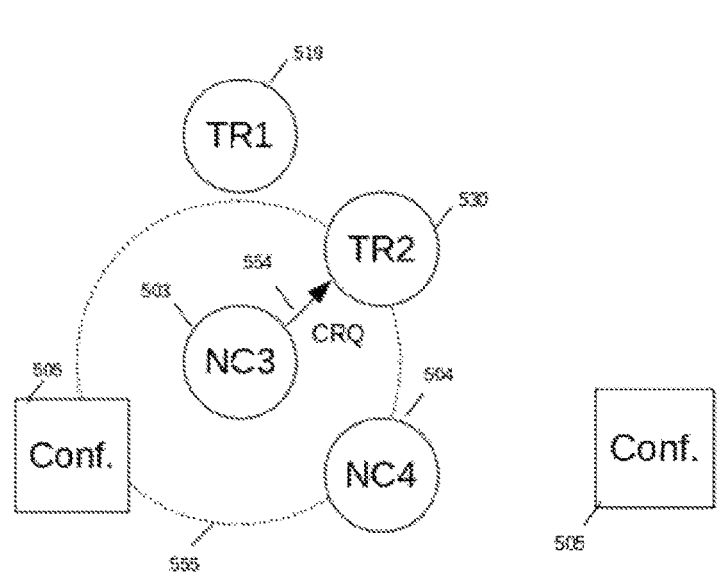
FIG. 42 shows a schema of a third Non-Commissioned Node sending a Commissioning Request "CRQ" message to all Commissioned Nodes or Trust-Ring Member Nodes within range.
Figure 43:
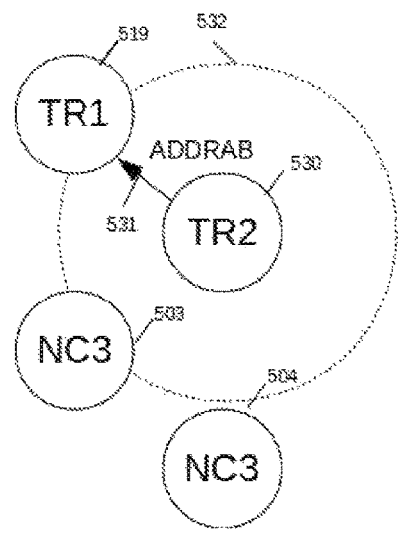
FIG. 43 shows a schema of a first Trust Ring Member sending a Address Attribution Ballot message "ADDRAB" message containing its own signature to a second Trust Ring member.
Figure 44:
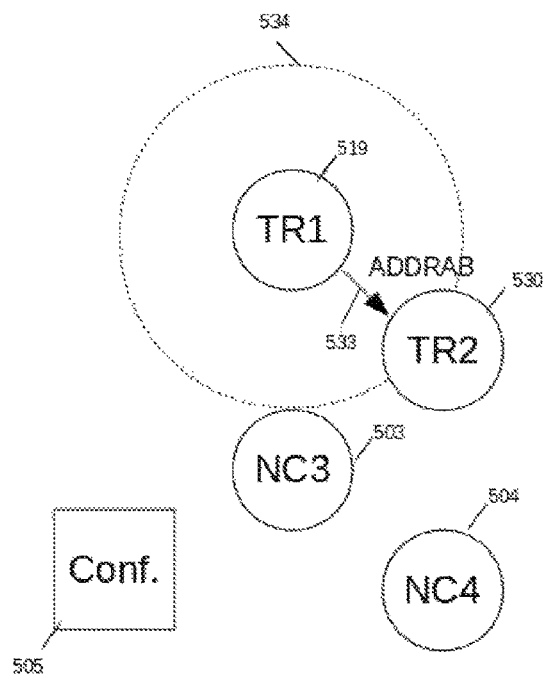
FIG. 44 shows a schema of a second Trust Ring Member sending a Address Attribution Ballot message "ADDRAB" message containing its own signature in addition to the first members, to the first Trust Ring member.

FIG. 42 shows 503 NC3, in turn sending 554 a "CRQ" message, after having received it from 505 the Configurator Device. Said message is received and processed by 530 TR2, which proposes, as FIG. 43 shows, 531 an Address Attribution Ballot "ADDRAB" message to 519 TR1, containing its own signature to a second Trust Ring member. FIG. 44 shows 519 TR1, having the same copy of the Distributed Ledger, analysing the proposal, accepting it and sending 533 its own Address Attribution Ballot message "ADDRAB" message back to 530 TR2, with its own signature in addition the signature of 530 TR2 sent in the initial ADDRAB message shown in FIG. 43.

Figure 45:
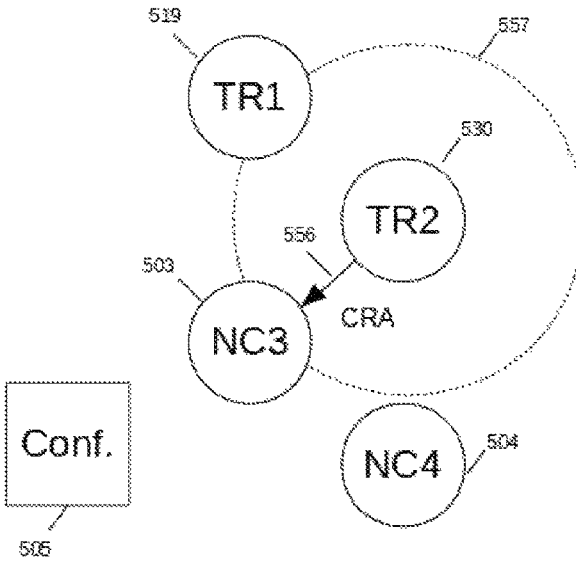
FIG. 45 shows a schema of a Trust Ring Member sending a Commissioning Request Authorisation "CRA" message to a third Non-Commissioned Node.
Figure 46:
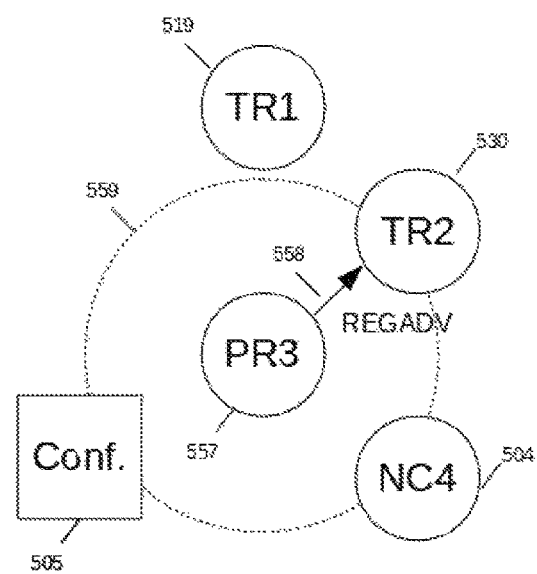
FIG. 46 shows a schema of a third Node now Pending Commissioning sending a Registration Advertisement "REGADV" message.
Figure 47:
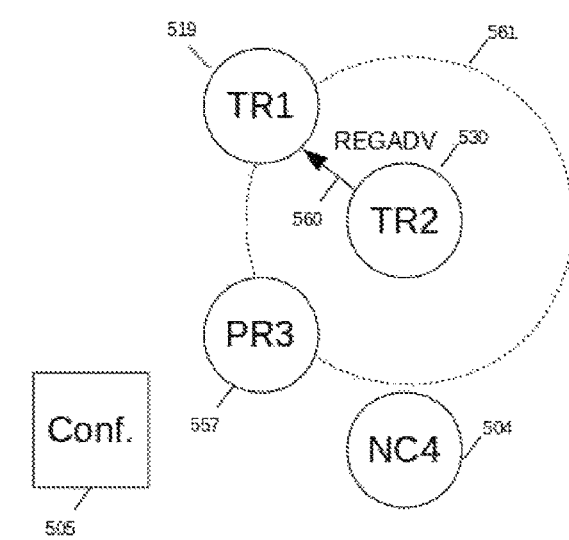
FIG. 47 shows a schema of a second Trust-Ring Member Node now forwarding a Registration Advertisement "REGADV" message to another already Commissioned Node and Trust Ring Member.
Figure 49:
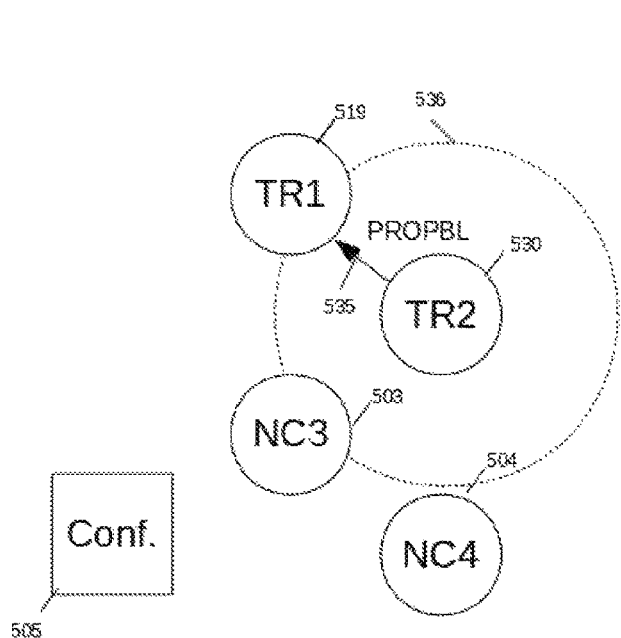
FIG. 49 shows a schema of a second Trust Ring Member Node sending a Block Proposal "BLPROP" message with its digital signature.
Figure 50:
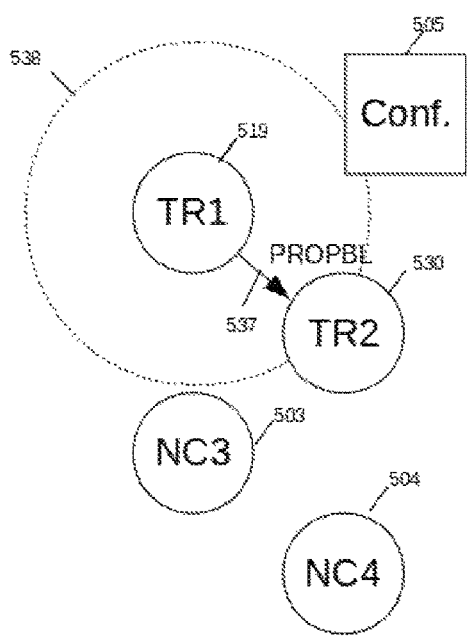
FIG. 50 shows a schema of a second Trust Ring Member Node sending the Block Proposal "BLPROP" message received as indicated by FIG. 50, back to the second Trust Ring Member Node, with its own digital signature added to it.
Figure 51:
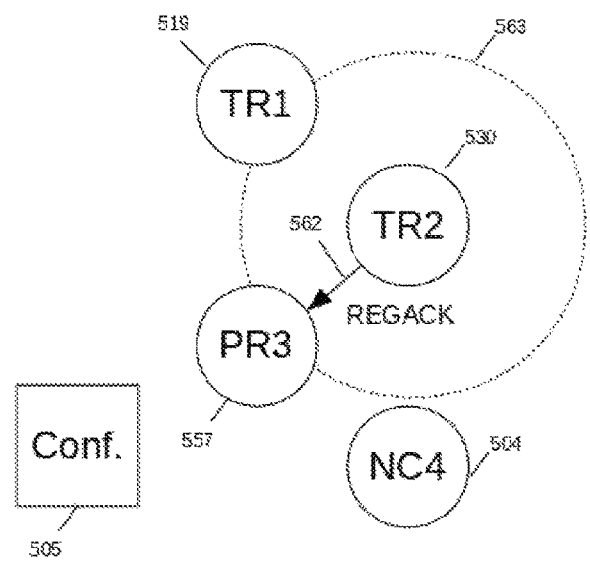
FIG. 51 shows a schema of a second Trust Ring Member Node sending a Registration Acknowledgment "REGACK" message.
Figure 52:
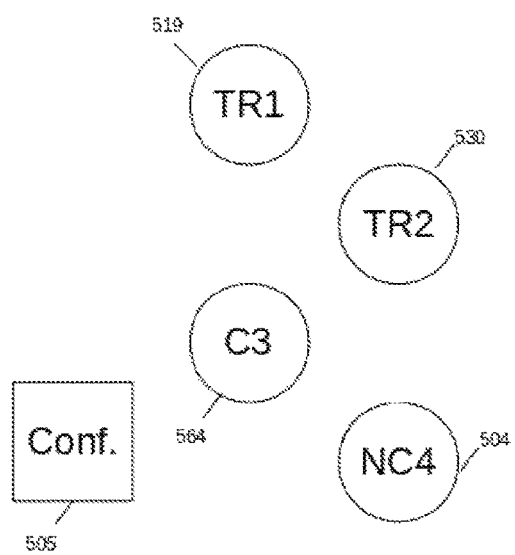
FIG. 52 shows a schema of the first and second originally Non-Commissioned Nodes which have now become Trust Ring Members, and a third Non-Commissioned Node which has now become a regular Node Commissioned into the Network.

As all the Trust Ring members have voted favourably, as shown in FIG. 45, 530 TR2 sends 556 a "CRA" message for 503 NC3, which, as shown in FIG. 46, is now 557 PR3 a peer Pending Registration, which advertises itself to the network with a multi-cast message, which is, as FIG. 47 shows, 560 forwarded to all commissioned nodes. All Trust Ring member peers exchange respectively 535 and 537 Block Proposal messages, containing the registration, as FIG. 49 and FIG. 50 show. As consensus is achieved, the registration is inscribed in the Distributed Ledger copies of both Trust Ring Member peers, and, as FIG. 51 shows, 530 TR2 sends the relevant 562 REGACK message for 557 PR3, which finally becomes, as FIG. 52 shows, 564 C3, a validly commissioned peer in the ad-hoc network.

Further non-commissioned nodes such as 504 NC4 and others can be added in the same manner. After each addition of commissioned peers, all Trust Ring members will always assess whether another peer needs to be transformed into a Trust Ring peer, according to the network parameters, until a sufficient proportion is reach. As seen above, the Invention provides both for an automated, and distributed commissioning process as well as for a process to automatically deploy a distributed Trust Ring of peers managing the commissioning process in addition to a distributed ledger.

In the descriptions of the preferred embodiments below, a possible physical implementation, apparatus, system or device of the system and possible different software implementation of the methods and process is proposed here to provide a better comprehension of the Invention. It will be obvious to one skilled in the art that the Invention described here can be implemented as a different physical embodiment and different software implementation or as a different list of instructions recorded on a computer-readable medium. Various components or parts or functional units or functional sub-units described here or shown in the accompanying figures show possible implementation of the Invention and may themselves be further separated.

System Embodiment

A. Homogeneous Peers

In a preferred embodiment, the system and methods and processes of this Invention described herein shall all be executed by peers which are communicating computing devices, defined as being constructed of or embodying a minimal set of components and parts as described hereunder, and which are functionally equivalent, and which are all capable of executing the sequence of actions set forth in the invention described hereunder in the exact same manner. All such communicating computing devices may have the exact same complete set of methods described in the invention and recorded in their permanent or non-volatile memory subsystems during manufacturing. All such communicating devices must be also capable of executing and performing all of the actions, computations, and calculations prescribed by the computer implemented methods described hereunder in the sequence prescribed in said methods.

A.1) Communicating Computing System

Those skilled in the art will recognize that this invention and its system and methods may in its preferred embodiments be implemented as an analog or digital circuits, or part thereof, which may be integrated or not, and which may contain any number of relays, diodes and transistors, signal converters and amplifiers, oscillators, antennas, electronic gates and other standard discrete electronic components. Those skilled in the art will also recognize that specific implementations of the methods of the invention may be embodied in said circuit of the system as an Application Specific Integrated Circuit (ASIC) chip, or as a Field-Programmable Gate Array (FPGA) chip, or as a list of instructions recorded on an attached computer-readable medium which are to be read, interpreted and executed by a central processing unit incorporated in said circuit of the system such as a general purpose Microcontroller, or Microprocessor or System-on-a-chip. While the preferred embodiments of the Invention as described herein are constructed with digital transistor semiconductor electronics technology, the Invention may also be embodied with any other existing or future communication and computing technology, such as but not limited to fibre-optics and lasers combined with photonic integrated circuits. Any of the embodiments described above may so be implemented as a list of computer instructions, or software program, or hardware, or combination thereof, or software simulation thereof.

In preferred embodiments, the connections between elements of the Invention may be physical and direct, or not. If a particular embodiment of the Invention may have one or more elements placed in between, which themselves communicate directly or indirectly, with physical wires or through a wireless transmission of information.

In preferred embodiments, the peers Communicating Computing Devices may also integrate one or more forms of computer readable media (or medium). It may integrate a form of permanent or non-volatile memory subsystem, such as but not limited to a Read-Only Memory (ROM), or a Flash-ROM chip, or a hard disk drive, or a solid state drive, or a rewriteable optical disk, or any other kind of component which permit any kind of digital information to be recorded, stored, reproduced in a durable fashion. Said peers may also integrate some form of non-permanent or volatile memory subsystem, such as but not limited to a Random Access Memory (RAM) chip. Any of these computer readable media may be directly integrated as part of a circuit or element of circuit as described, be directly connected to any such component, or may be indirectly connected to such component through an intermediary component.

Figure 5:
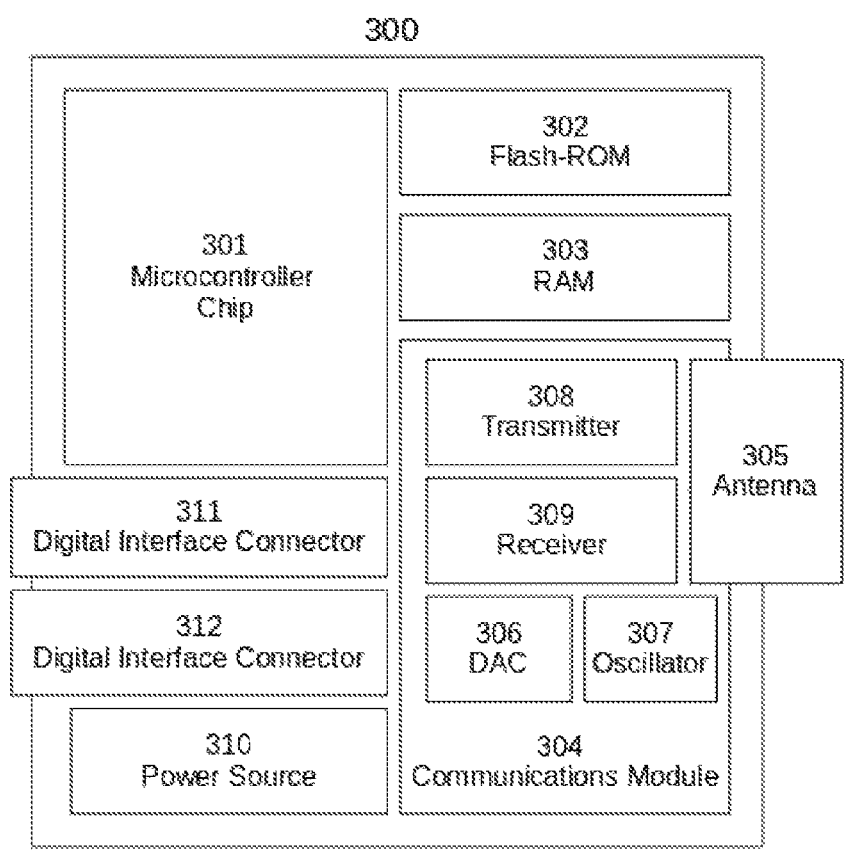
FIG. 5 shows a block schema of a system which has all the hardware elements required of all Nodes which perform the specific methods from the invention.

FIG. 5 shows a block diagram of an example of the 300 preferred embodiment of the system which all Non-Commissioned Communicating Computing Devices used in purely wireless installations of ad-hoc networks shall integrate to be able to execute the methods of this Invention. The physical hardware elements can for example include 301 a general purpose microcontroller chip serving as a central processing unit which itself integrates a 302 Flash-ROM subsystem and a 303 RAM subsystem; 304 a communications module which itself integrates 305 an antenna, and a 306 a digital-to-analog (DAC) signal converter, and a 307 oscillator, and a 308 transmitter circuit, and a 309 receiver circuit; a 310 power source; 311 and 312 two digital interface connectors.

Figure 6:
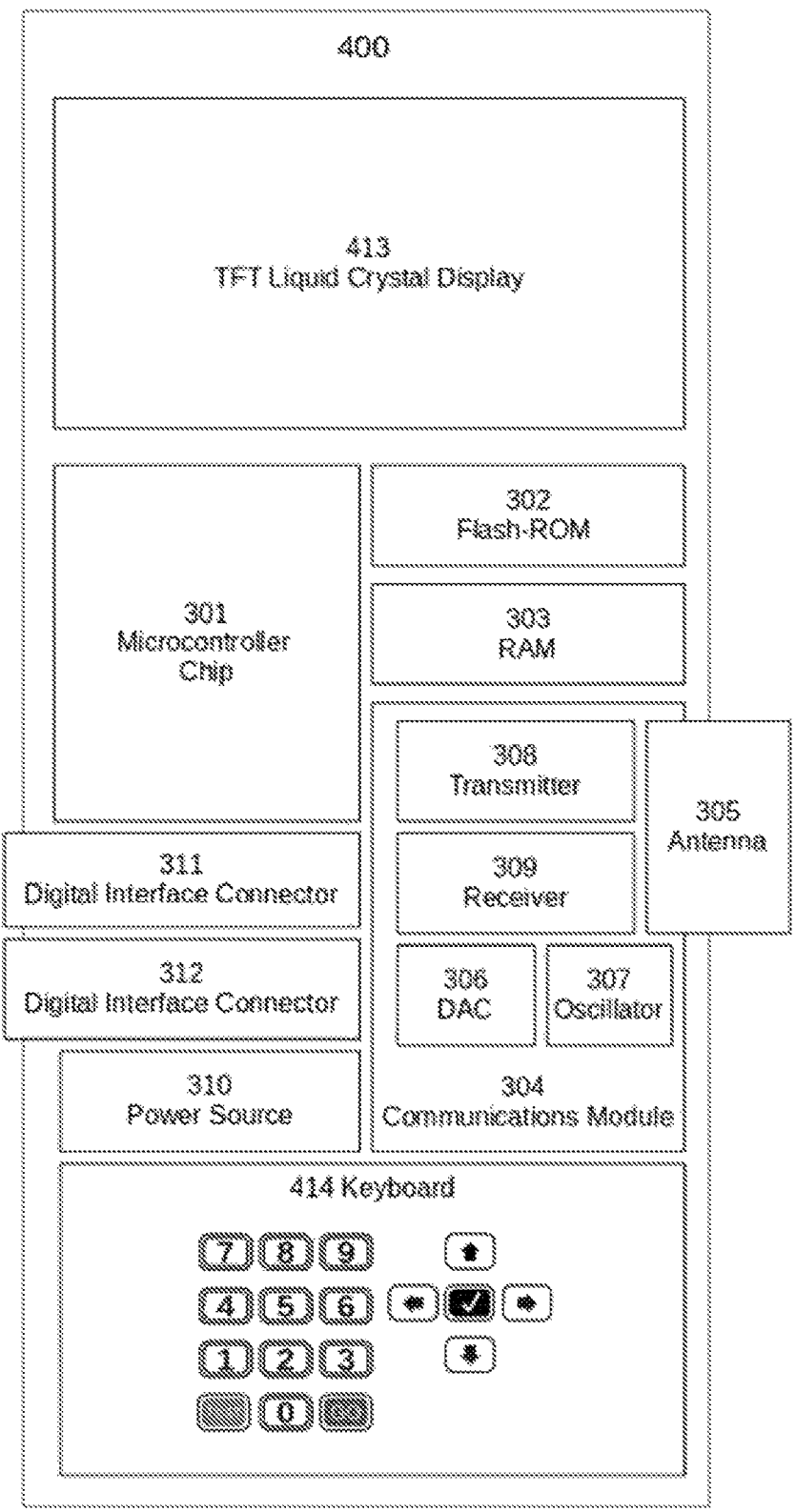
FIG. 6 shows a block schema of a system with an attached display and interaction device which has all the hardware elements required of all Configurator Device which perform the specific methods from the invention.

FIG. 6 shows a block diagram of an example of the 400 preferred embodiment of the system as a "Configurator Devices". The physical hardware elements can for example include 401 a general purpose microcontroller chip which itself integrates a 402 Flash-ROM subsystem and a 403 RAM subsystem; 404 a communications module which itself integrates 405 an antenna, and a 406 a digital-to-analog (DAC) signal converter, and a 407 oscillator, and a 408 transmitter circuit, and a 409 receiver circuit; a 410 power source; 411 and 412 two digital interface connectors; 413 an attached display; 414 an interaction device such as a keyboard.

All such Communicating Computing Devices are for the purposes of this invention hereafter called "Node" or its plural "Nodes". The functionality and capabilities of all such Nodes are understood within the scope of this Invention to be equivalent. The behaviour within the scope of this Invention at any given point in time depends on the state of several variable records present in its volatile or non-volatile memory subsystems, or present on an attached computer-readable medium; the value of said records at a given point in time indicates what particular method of this Invention shall be read, interpreted and executed by the system of this Invention.

A.2) Minimal Required Capabilities

Any such node executing the sequence of actions set forth in the computer implemented methods as recorded in its permanent or non-volatile memory and described here, must be able to copy any such digital information from one memory subsystem to another, or to transform any such digital information using its on-board computing unit or units, or to perform computations and calculation using said digital information using its on-board computing unit or units, or to create new digital information as a result of said computation and calculation using its on-board computing unit or units, as prescribed by said methods.

Any such node must able to record the results of aforementioned copy process, or transformation, or computation, or calculation, or creation of digital information, in its volatile or non-volatile memory subsystem in the sequence, form and structure prescribed by the computer implemented methods described hereunder.

Any such node must be able, as a result of any of the above-mentioned copy process, or transformation, or computation, or calculation or creation or digital information, by executing the sequence of actions prescribed by the computer implemented methods described hereunder, to form a message conforming the particular sequence, form, structure and content prescribed by said methods, and emit such digital information over the shared communication medium.

Any such node must be able, to receive from shared communication medium any digital information or message which conforms to sequences, forms, structures or contents prescribed by the computer implemented methods describes hereunder, and then record said digital information in the node's volatile or non-volatile memory subsystem, using the sequence of actions and in the particular ordering prescribed by the aforementioned methods.

A.3) Startup Procedure

Regardless of any other capability of any particular Node, all Nodes must have the possibility to automatically initiate the methods of this Invention, using its on-board computing unit or the first one if several exist, after electric power is provided to said Node, either the beginning of its permanent non-volatile memory subsystem or its non-volatile memory subsystem and interpret the digital information inscribed therein which constitutes the microcode of that method and which that particular computing unit can execute.

In preferred embodiments, the computer implemented methods as embodied in the Invention shall compute, create and record the necessary digital information in the node's volatile or non-volatile memory and prepare the memory spaces in the form, structure and sequence prescribed by the computer implemented methods described hereunder, and which firm the minimal environment necessary for further executing of said methods.

B. Shared Communication Medium

Although the invention described herein has been developed initially for the particular needs of wireless ad-hoc networks, any communication between any two Nodes is not required to be wireless. Any Nodes communicating in networks deployed with the invention may communicate across either wired communication or wireless radio signals, directly between nodes, or through network tunnelling across other digital computer, telephony or satellite networks, or across any other physical medium. Any particular medium, or a combination thereof, in sequence or in parallel, used in a single network is hereafter called the "Shared Communication Medium".

Terminology

A. Communications

A.1) Protocol Signature

In preferred embodiments of this Invention, a specific sequence of bits which must are placed at the beginning of all sequences of digital information transmitted over a shared medium and transmitted emitted by an information handling device, to identify said sequences being used within the rules set by this Invention. This specific sequence of bits is within embodiments hereunder called the "protocol signature".

A.2) Packets

In preferred embodiments of this Invention, if the sequence of digital information which an information handling device transmits is longer than the commonly agreed length for such a sequence as specified in any particular industrial or international standards regulating the usage of said shared communication medium, the sequence might be split by the communication subsystem in two or more segments. The discrete segments of the message, or "packets", might be transmitted sequentially or in any other order over the chosen shared communication medium, as well as with regulated or random delays between transmission of each packet, as well as with eventual with repetition of one or more packet if the intended recipient of the packet sends a packet back over the same shared communication medium indicating that a part of sequence has not received, if the rules and protocol of the specified shared communication medium's standard provides for such a capability.

In preferred embodiments of this Invention, depending upon specific industrial or international standards and regulations describing usage of chosen shared communication medium, the communication subsystem might pre-pend or append each packet with a specific protocol signature, as well as any necessary additional digital information and parameter mandated by said standard embodied as small sequences of bits, such as but not limited to a packet type identifier, packet sequence number within a message.

A.3) Messages

In preferred embodiments of this Invention, any digital information transmitted over the chosen shared communication medium must be pre-pended by the particular protocol signature identifying any digital information communicated for the purposes of the specific computer implemented methods described hereunder as part of the invention, and one or more bits indicating whether the information is in its original or if it has been transformed by a encryption function and algorithm. The complete sequence comprised of the protocol signature, encryption setting bits and the digital information itself is called a "message".

A.4) Messages "Sent" and Messages "Received"

In preferred embodiments of this Invention, a message said to be "sent" over the chosen shared communication medium once the entirety of the necessary packets have been prepared for the communication subsystems of an information handling device as described above, and the entirety of the packets have been successfully transmitted over the shared communication medium.

In preferred embodiments of this Invention, a message said to be "received" from the chosen shared communication medium once the entirety of the necessary packets have been received, the original digital information reconstituted in its proper order, the protocol signature specific to said methods recognized and the bits relative to encryption interpreted.

A.5) Network-Wide Encrypted Communications

In preferred embodiments of this Invention, and as mandated by its methods, all messages sent or received by between ad-hoc network Nodes within direct communications range of each other and which are accepted and able to communicate securely within the network shall, as mandated by the methods of this Invention, shall be encrypted using an symmetric block cipher algorithm. Such a characteristic provides a first layer of security by allowing for any and all messages to be confidentially exchanged between Nodes within a single ad-hoc network and deters direct wiretapping and eavesdropping of the ad-hoc network's communication signals. Those skilled in the art will recognise that decrypting a strong symmetric cipher by sequential brute-force trial-and-error of keys is prohibitively computationally intensive and time consuming. Those skilled in the art will recognize that such an algorithm may be of either a "stream cipher" variant, or of a "block cipher" variant.

Symmetric block ciphers usually operate, as per Wikipedia, "on fixed-length groups of bits, called a block, with an unvarying transformation that is specified by a symmetric key." and which consist of "two paired algorithms one for encryption, E, and the other for decryption, D. Both algorithms accept two inputs: an input block of size n bits and a key of size k bits; and both yield an n-bit output block. The decryption algorithm D is defined to be the inverse function of encryption, i.e., $D=E-1$. More formally, a block cipher is specified by an encryption function:

$$E_K(P):=E(K,P):\{0,1\}k \times \{0,1\}n \rightarrow \{0,1\}$$

In preferred embodiments, both the Node sending a message and all Nodes receiving the message must thus usually possess the same shared secret, the "symmetric key" mentioned above. The parameters of the algorithm, such as the length of the key, or the length of the blocks, are defined by network-wide parameters, which all Nodes in a particular ad-hoc network deployed using this Invention must follow.

The specific algorithm which should be used in preferred embodiments of the Invention for its symmetric block cipher is the Rijndael/Advanced Encryption Standard, as defined by the United States National Institute of Standards and Technology as well as the ISO/IEC 18033-3 standard, using a 256 bit key length. Those skilled in the art will recognize that various other strong and secure symmetric block cipher algorithms exist which might be used in substitution of AES-256, such but not limited to variants of the U.S. FIPS DES standards, or the Blowfish algorithm, or the Serpent algorithm, or variants of the RC5 algorithm, or the Twofish algorithm, amongst many others. Those skilled in the art will finally recognize that each such key algorithm may be further strengthened, for example by adding a factors of randomness to the timing of some operations, or to add randomness in the choice of some mathematical primitives in use by the chosen symmetric block cipher, such for example as the symmetric key.

A.6) Peer-to-Peer Encrypted Communications

In preferred embodiments of this Invention, and as mandated by its methods, all messages sent or received by between ad-hoc network Nodes, whether such Nodes are in direct communications range of each other or not, and which a first Node has specifically addressed to a second Node, and if both Nodes are accepted and able to communicate securely within the ad-hoc network shall encrypt and decrypt all such messages, using an asymmetric key cryptographic algorithm. Such a characteristic provides a second additional layer of security by allowing for any and all messages to be confidentially exchanged between two Nodes within a single ad-hoc network, and which no other nodes except the original sender and the recipient can decrypt. Additionally, as described further below, an asymmetric cipher also allows for the authentication of messages, i.e. it permits for the receiving peer to mathematically verify and assess both whether the peer which sent the message is actually really who its says it is as well as whether the message was tampered with during transit. As such, if for example an unauthorized and hostile third party compromises physically one Node, it cannot neither "read", "listen", nor successfully tamper with any packet or message traffic in transit which is being either detected by or actively forwarded by said Node. Those skilled in the art will recognise that decrypting a strong asymmetric cipher by sequential brute-force trial-and-error of keys is usually even more prohibitively computationally intensive and time consuming than symmetric block ciphers.

Asymmetric ciphers operate with a set of two keys, and each party has a public key, which may be disseminated widely, and a private key, which is known only to itself. As per Wikipedia, in asymmetric ciphers "any person can encrypt a message using the public key of the receiver, but such a message can be decrypted only with the receiver's private key". This is possible only if the two keys must thus be mathematically related. One can generate a public key from a private one a public key using a mathematical functions or algorithms which are very hard to reverse, and "often rely on algorithms based on mathematical problems which currently admit no efficient solution" [ . . . ]—for example "integer factorization, discrete logarithm, and elliptic curve relationships". The strength of an asymmetric cipher relies on "the degree of impracticality for a properly generated private key to be determined from its corresponding public key. Security then depends only on keeping the private key private, and the public key may be published without compromising security."

In preferred embodiments, a first Node which is accepted and able to communicate securely within the ad-hoc network and which addresses and sends a message to a second Node which is also accepted and able to communicate securely within the ad-hoc network will have to encrypt said message using the public asymmetric cipher key of the receiving Node. The specific algorithm which should be used in preferred embodiments of the Invention for its asymmetric cipher uses algorithms derived from ed25519 cryptosystem, using a 256 bit key variant. Those skilled in the art will recognize that various other strong and secure asymmetric cipher algorithms exist which might be used in substitution of ed25519, such as but not limited to variants of the RSA cryptosystem, or variants of the DSA and ECDSA cryptosystems, or the secp246k1 cryptosystem.

A.7) Route Discovery and Packet Forwarding

In preferred embodiments of this Invention, and as mandated by its methods, messages sent by peers already accepted and able to communicate in the ad-hoc network may be addressed to another specific peer as identified by its numeric address. A variety of techniques exist to effect the transport of said packet from its peer of origin to its destination peer. In multi-hop ad-hoc network variants, peers may need to re-transmit, or "forward" packets and messages to other peers, right up until the message is received by its destination peer. "Routing" is the process of selecting one or more paths for packets in a network. As, in ad-hoc networks deployer with this Invention, each and every peer is equal, and the ad-hoc network is said to be homogeneous. Those skilled in the art will recognise that by definition, each and every peer must thus be able to perform routing, route discovery and packet forwarding, which, also by definition, makes networks deployed using this Invention multi-hop ad-hoc networks.

In preferred embodiments, the algorithm used when emitting and receiving packets to effect routing, route discovery and packet forwarding is the Ad hoc On-Demand Distance Vector Routing, as defined by the IETF RFC 3561. Those skilled in the art will recognise that a variety of other routing algorithms and routing algorithm classes may be used, as this Invention is not dependent on any particular routing algorithm, such as but not limited to Link-state algorithms, Optimized Link State Routing algorithm, amongst a very large variety of other algorithms.

B. Node Status and Functional Modes

The node status variable record sets, within the execution scope of a certain computer implemented method, what next action the node shall perform in regard to that particular computer implemented method, such as whether to reading digital information from its permanent, volatile or non-volatile memory subsystems, or whether to write digital information, in what form to the nodes' volatile or non-volatile memory subsystems, or whether to emit a message and in what specific form over the shared communication medium, or whether to await reception of a certain type and form of messages over the shared communication medium while ignoring all other types of messages, or whether to perform a certain action in response to an timing condition set forth by a certain computer implemented method described hereunder, or triggers the execution of another step within the same computer implemented method as a result of a certain computation mandated by one method described hereunder, or trigger the execution of another computer implemented methods described hereunder as a result of a certain computation mandated by one method described hereunder.

In preferred embodiments, any node will execute only a subset of actions as prescribed in the computer implemented method described hereunder depending on the contents of the variable record present in said node's volatile or non-volatile memory subsystems at any particular moment in time. Some such methods can and will change the content of either variable record under certain operating conditions, and will thus change the subset or sequence of actions which can or shall be executed at any point in time by the node's computing unit or units. Any such specific subset of actions, sequences of actions, and computer implemented methods is henceforth for the purpose of this invention called a "mode"

The node type variable record sets which general set of computer implemented methods is used by a node exhibits at a certain moment in time, and which is externally exhibited by a certain function that particular node performs in a network—said to be in short the mode that node "is in" at that moment in time.

B.1) Nodes in "Non-Commissioned" Mode

In preferred embodiments, any node whose "node type" variable record identifier present in its volatile or non-volatile memory, as defined by the methods of this Invention, is set to the non-commissioned value, is said to be a "Non-commissioned node". As defined in the Invention, "Non-commissioned" is the default value for said node type variable record the computer implemented methods described hereunder will cause a node to hold, as stored in said node's non-volatile memory, the first time the node is powered-on, if said node's node type parameter value as recorded in its permanent memory subsystem during said node's manufacturing is empty or the parameter is non-existent in said nodes permanent memory subsystem.

In preferred embodiments, any node executing the computer implemented methods described hereunder under the Non-Commissioned mode does not, hold in any variable record present in its permanent, volatile or non-volatile memory subsystem the necessary digital information which allows it to be able to perform any function in cooperation with any other nodes executing the computer implemented methods described hereunder, by sending and receiving messages over the shared communication medium, other than the particular subset of computer implemented methods specific to the Non-commissioned mode, and which perform said node's commissioning and admittance process into a particular existing installation or ad-hoc network, and only if the messages received by said node over the shared communication medium conform to the particular sequence, form, structure and content as prescribed by the computer implemented methods described hereunder.

In preferred embodiments, any node executing the computer implemented methods described hereunder under the Non-Commissioned mode does not hold in any variable record present within its permanent, volatile or non-volatile memory subsystems which contains the necessary digital information related to security concerns which would allow it to communicate with, or act securely in cooperation with any other node which executes the computer implemented methods described hereunder, by sending and receiving messages over the shared communication medium, and which is already Commissioned and admitted in a particular installation or ad-hoc network, and which as such is deemed to possess the digital information related to security concerns relative to that particular installation or ad-hoc network.

In preferred embodiments, any node executing the computer implemented methods described hereunder under the Non-Commissioned mode does not hold in any variable record present in its permanent, volatile or non-volatile memory subsystems which contains the necessary digital information related to cryptographic functions which would allow it to communicate confidentially and verifiably with, or act confidentially and verifiably in cooperation with any other node executing the computer implemented methods described hereunder, by sending and receiving messages over the shared communication medium, and which is already Commissioned and admitted within a particular installation or ad-hoc network, and which as such is deemed to possesses the necessary digital information related to cryptographic functions.

B.2) Nodes in "Configurator Devices" Mode

In preferred embodiments, any node whose node type variable record preset in its volatile or non-volatile memory, as defined by the methods of this Invention, is set to the "conf-dev" value, is said to be a "Configurator Device". The config. device value is the value the node type variable record the computer implemented methods described hereunder will cause a node to hold if the value of the node type parameter as recorded in its permanent memory during said node's manufacture is "conf-dev".

In preferred embodiments, the Configurator Device mode shall in principle only be used for the portable battery-powered electronic device, as described and illustrated in FIG. 6, and such devices shall usually only be used by human operators to provoke the commissioning and admittance into a particular installation or ad-hoc network of nodes possessing and capable of executing the computer implemented methods described hereunder, of one or more Non-Commissioned node's.

In preferred embodiments, any such "Configurator Device" must have as manufactured the minimal capability of sending and receiving messages over the chosen shared communication medium. It is however preferable for such a Configuration Device to have a physically embedded or physically connected digital display on which it can present digital information to the human operator, as well as an electro-mechanical physical interaction subsystem, which can be used to input the human operator's instructions.

In preferred embodiments, any such Configurator Device may alternatively be capable or not of communicating over another shared communication medium, or using an existing digital network, in addition to the chosen communication medium. By sending messages over either above-mentioned network or shared medium, said Configurator Device may also be capable of causing another remote computing device not directly physically connected to itself to display digital information for the benefit of a human operator, such as a web-based interface, provided said messages are in a form and sequence understandable by said computing device. By receiving messages from either aforementioned network or shared medium, said Configuration Device may also be capable of receiving instructions input by a human operator on a remote computing device not directly physically connected to the itself, and which has an electro-mechanical physical interaction subsystem.

B.3) Nodes in "Pending Registration" Mode

In preferred embodiments, any node whose node type variable record present in its volatile or non-volatile memory, as defined by the methods of this Invention, is set to the "comm-preg" value, is said to be a Node "Pending Registration". Such a Node has received during the commissioning process the minimal necessary information to be able to communicate securely within the network, such as the network communications encryption key, a unique numeric network address, the network's shared time. However, such a Node has not yet been formally authorized to communicate with other Nodes, and its acceptation into the ad-hoc network has not yet been notarized by any Node in its Distributed Ledger.

B.4) Nodes in "Commissioned" Mode

In preferred embodiments, any node whose node type variable record present in its volatile or non-volatile memory, as defined by the methods of this Invention, is set to the "comm" value, and whose identifying parameters, address, as well as its public and private key are mathematically verifiably recorded in an absolute majority of the Trust-Ring member's SDL copies (as defined by the default parameters) is said to be a "Commissioned Node". Such a Node is now full deployed and accepted within said ad-hoc network.

B.5) Nodes in "Trust-Ring Member" Mode

In preferred embodiments, any node whose node type variable record present in its volatile or non-volatile memory, as defined by the methods of this Invention, is set to the "trngm" value, is said to be a "Trust Ring Member". The role of Trust-Ring members may be to emit various kinds of digitally signed votes, authenticate and interpret any such received vote using its copy of the Distributed Ledger, and check if there is consensus on the diverse aspects of accepting new Nodes in the network, registering new Commissioned Nodes in the Distributed Ledger, proposing for specific Commissioned Nodes to be transformed in new Trust Ring members. The role of Trust-Ring members may also be to maintain a distributed mathematically verifiable record of network parameters, all Commissioned Node registrations, and Trust Ring Member additions in a distributed ledger. Trust Ring Members may also request from and provide copies of a part or of the entirety of their Distributed Ledger to any other Commissioned Node or Trust Ring Member in the network or network partition, upon request. Additionally, a Trust-Ring member regularly checks its copy of the SDL to assess whether the number or proportion of Trust Ring Members, as set by the ad-network's parameters, is sufficient to maintain a sufficiently robust level of security and a sufficient level of mathematically verifiable consistency of the secure distributed ledger across the network. Finally, in preferred embodiments, for the purposes of the methods of the Invention, all Trust Ring Members are still deemed to be Commissioned Nodes, while Commissioned Nodes are only Trust Ring Members if explicitly registered as such in the Distributed Ledger, their node type value was change as the result of a vote by existing Trust Ring Members.

C. Unique Identifiers and Digital Signatures

C.1) Pseudorandom Number Generator

In preferred embodiments of this Invention, and as mandated by its methods, a variety of unique numeric and binary identifiers, binary encryption keys (symmetric and asymmetric), seed numbers, mathematical primitives used by the chosen ciphers will be have to be generated by Nodes. In preferred embodiments, uniqueness is achieved by randomness. Random number and bit sequences can both either be generated from external sources of entropy such as measuring physical environment variables using sensors connected to a particular Node, or computationally calculated using a cryptographically secure pseudorandom random bit generator (PRNG) algorithm.

In preferred embodiments, random bit sequences and numbers are generated computationally by the central processing unit, using an algorithm such as AES-CTR DRBG. The length or size in bits of each identifier, key, seed number, mathematical primitive to be generated is dependent upon a particular embodiment of the Invention. Those skilled in the art will recognize that a variety of other algorithm may be used, such as but not limited to the ANSI X9.17, FIPS 186-4, or NIST SP 800-90A standards or the Yarrow, CryptGenRandom, ISAAC, Dual_EC_DBRG and Fortuna algorithms.

C.2) Hash Functions

In preferred embodiments of this Invention, and as mandated by its methods, a variety of processes necessitate for data of arbitrary size to be mapped to unique numbers of fixed size, for usage in message as well record integrity checks, various authentication processes. This is achieved by so-called "hash" functions. In various cryptographic processes, cryptographic variants of hash functions are used to verify that some input data maps to a given hash value, but if the input data is unknown, it is deliberately difficult to reconstruct it (or equivalent alternatives) by knowing the stored hash value. Cryptographic hash functions are especially extensively used in by the processes and methods of this Invention which record data in the Distributed Ledger maintained by Trust Ring Members. For data structures which are more complex and structured, hashes of each particular sub-unit of said data structure can be calculated, as well as intermediary hashes at higher level of the hierarchy of said structure calculated using the hashes of all sub-units of said higher level, until a so-called top-level hash is calculated. A hierarchical tree of hashes organised as a binary tree is called a "Merkle tree" (see US4309569), and its topmost hash value is called the "Merkle root value". Merkle trees are used extensively in the variant of Distributed Ledgers and blockchains maintained by Trust Ring Members as mandated by the methods of the Invention.

In preferred embodiments, hashes and Merkle trees are calculated using the SHA-3 algorithm. Those skilled in the art will recognize that a variety of other hash functions and algorithms may be used, such as but not limited to MD5, SHA-2, BLAKE, GOST or Tiger. The length or size in bits of each hash number for each particular use is dependent upon a particular embodiment of the Invention.

C.3) Digital Signatures

In preferred embodiments of this Invention a variety of message sent and received by Nodes must be authenticated, so that it can be mathematically verified that the sender of said message cannot deny having send said message, and that said message was not altered during its transit across the ad-hoc network. For examples, the ballot messages used in methods of various voting processes of this Invention make extensive use of digital signature. Additionally, various records must be authenticated in the same fashion, so that the Node which caused a record to be inserted in for example the Distributed ledger cannot deny having initiated said insertion. The algorithms used to perform these functions are called Digital Signature algorithms.

In preferred embodiments, the digital signatures are calculated and authenticated using ed25519 cryptosystem derived algorithms. Those skilled in the art will recognize that a variety of other algorithms may be used, such as but not limited to the RSA-PSS, EdDSA, ECDSA, or ElGamal algorithms. The length or size in bits of the various digital signature for their various specific uses in this Invention is dependent upon a particular embodiment of the Invention.

D. Distributed Tamper-Proof Decision-Making and Record Keeping

D.1) Digitally Signed Byzantine Fault Tolerant Voting

In preferred embodiments of this Invention, and as mandated by its methods, a variety of votes must be exchanges during collaborative voting processes where various types of consensus decisions must be achieved by several Nodes of the ad-hoc network. Most particularly, Trust Ring Member Nodes vote on the attribution of unique numeric network addresses and also exchange proposals for blocks to be inserted in the Distributed Ledger, as well as propose and vote on which Commissioned Nodes shall be caused to transform into Trust Ring Members. These voting processes are by nature distributed, asynchronous, and subject to a variety of faults which may cause the process to fail, such a but not limited to communications breakdown, Node breakdown or a network split. Additionally, such a voting process may be subject to one or more Trust Ring Member Nodes being compromised by hostile third parties, which may wish to impose a certain decision to all other Trust Ring Member Nodes by forging votes; such voting process shall thus also tolerate a potentially complete lack of trust between Trust Ring members. As mandated by the Invention, such processes are required to be tolerant to at least the fault types described above, amongst others. The general class of fully distributed voting algorithms fulfilling these requirements are called "Byzantine Fault Tolerant" (BFT) algorithms, in reference to the fundamental treating of the subject, the "Byzantine Generals Problem".

In preferred embodiments, Trust Ring Members Nodes sends votes containing their proposals to other such Nodes, using one or more messages whose list of destinations is calculated and appended to each such vote using a particular distributed BFT algorithm. Each Node then receiving any such vote, whether desiring to add its vote to said proposal, or denying its vote, then adds its answer to the message, and transmits it to a new list of destinations calculated by said distributed BFT algorithm using the inbound list of destinations. The distributed BGT algorithm thus defines the order upon which messages and votes are exchanged. Any Node receiving a voting message may analyse that consensus decision has been reached for said related proposal, before or after adding its own vote or refusal, using the distributed BFT algorithm. The vote count votes necessary for a decision to have achieved consensus is dependent on the particular distributed BFT algorithm which is chosen for a particular embodiment.

In preferred embodiments, the PBFT algorithm shall be used for all voting processes defined by the methods of the Invention, with a positive consensus decision threshold of ⅔ of voting Nodes. Those skilled in the art will recognize that a variety of other algorithms may be used, such as but not limited to Paxos, Q/U, JQ, RBFT, MinBFT, amongst a multitude of others. Additionally, to limit the possibility of vote tampering by potentially compromised Nodes or "man-in-the-middle" attacks during transmission across the ad-hoc network, each and every voting message, regardless of its type, is digitally signed, as is each vote contained therein, using the chosen digital signature algorithm. Said votes and messages are signed using the chose digital signature algorithm using the public key registered for each Commissioned Node in the Distributed Ledger. The set of all signed votes for any decision for consensus has been achieved is also recorded, as mandated by the methods of the Invention, in the Distributed Ledger. It is thus possible to audit and authenticate the entirety of the voting process and decision, and defend against tampering.

D.2) Secure Distributed Ledger

In preferred embodiments of this Invention, and as mandated by its methods, a variety of tamper-proof distributed records must be kept by Trust Ring Member Nodes. Such records shall include, for each Commissioned Node in a network, a distributed record of its identifiers, its public asymmetric cypher key, its unique numeric network address. Such records may also optionally include, for each Commissioned Node, diverse type of meta-data such but not limited to the hardware model of the Node, its capabilities, or the resources available to other Commissioned Nodes. Additionally, a tamper-proof distributed record of various events shall also be kept by Trust Ring Member Nodes, such as but not limited to the creation of a new ad-hoc network or ad-hoc network partition, the initialization of a new Distributed Ledger, and the transformation of a Commissioned Node into a Trust Ring Member. Secure Distributed Ledger may be used to keep a distributed tamper-proof mathematically verifiable record of all the parameters necessary for said ad-hoc network to function and for all already Commissioned Nodes to securely communicate between themselves, or such a record of all commissioning and address allocation operations, or such a record of each already commissioned node's role at any point in time, or such a record of the identifying characteristics, individual capabilities or security-related parameters for each individual Commissioned node.

In preferred embodiments, the data structure and the accompanying processing algorithms which fulfil the above indicated requirements are derived from the concept of a Distributed Ledger, as mandated by the methods of this Invention. Due to the diverse of tamper-proofing cryptographic features related to authentication of records, and the accompanying digitally signed voting processes, the particular variety of Distributed Ledger or may be qualified, as implemented in preferred embodiments of the Invention, as a private or "permissioned" Blockchain, and will hereafter called a "Secure Distributed Ledger" (SDL). In one embodiment, the SDL is a write-only distributed database containing a growing list of records grouped into blocks maintained by Trust Ring Members. Each block contains a timestamp and a link in the form of a hash of the preceding block recorded in the SDL.

Figure 8:
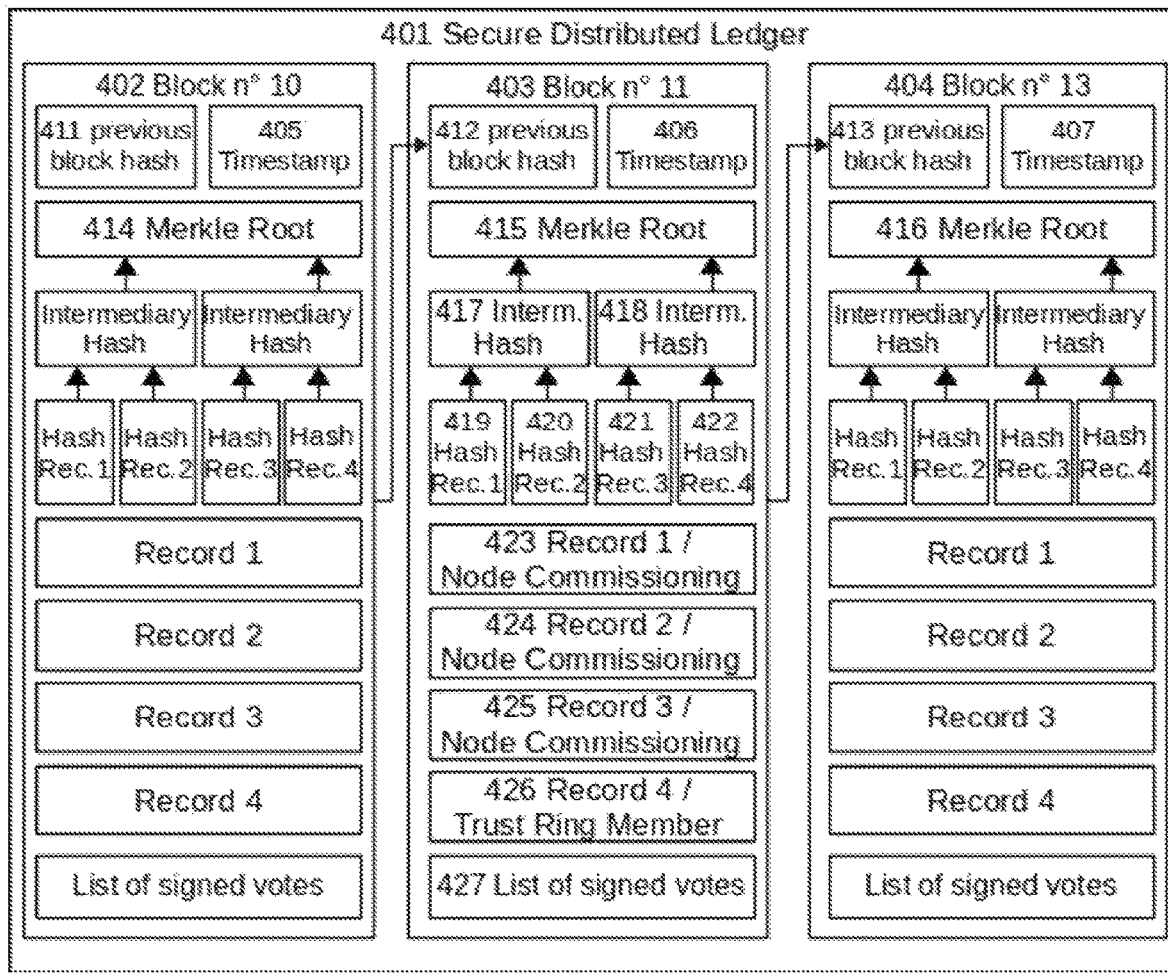
FIG. 8 shows a schema of a secure distributed ledger and its constitution components, as well as a subschema showing a detail concerning the constituting components of a block of the secure distributed ledger.

FIG. 8 shows a diagram of the elements which constitute the data structure of 401 a SDL copy as recorded in the volatile or non-volatile memory subsystems of one Trust Ring Member Node and, as well as the diagrams of 402, 403 and 404, which are respectively blocks 10, 11 and 12, three successive consecutive blocks of records of said 401 SDL copy. Each block is first constituted by its 408, 409 and 410 block ID number. Each block is then constituted, as for example in the three 402, 403 and 404 blocks as shown, by respectively a 405, 406 and 407 timestamp indicating the relevant date and time of their inscription in the SDL. Each of these blocks then contains a link to the block preceding it in the form of a hash value calculated by using the entirety of said preceding block, as shown by the hash values 411, 412 and 413. Then, each of these blocks is respectively constituted by the 414, 415 and 416 Merkle Root values of all the records contained in said block, followed for 403 block 11, for example, by intermediary hashes 417 and 418, and then the respective specific hashes 419, 420, 421 and 422 corresponding to each actual record constituting the block. Then, each block, such as 403 block 11 in the example shown here, is constituted by the records themselves, in the example shown three 423, 424 and 425 Node Commissioning and one of 426 a Trust Ring Member Registration. Finally, each block, in preferred embodiments, such as 403 block 11 in the example shown here, is constituted by 427 a list of all digital signatures of the block proposal votes which led to a consensus decision to be taken collaboratively to record said block. Preferably, the distributed ledger is a linked list (chain) of hashes. However, the distributed ledger can also be implemented in a directed acyclic graph of hashes (TANGLE). Any transaction in a TANGLE always validates two or more past transactions at random or according to a predetermined algorithm for transaction selection.

In embodiments, one must ensure that all copies of the SDL among the Trust Ring Members need to be the same and Nodes of the ad-hoc network need to trust that the version hasn't been tampered with. Each and every block, and record contained in the SDL can be very quickly authenticated by Nodes which can verify inexpensively that all the information recorded therein by recalculating all consecutive hashes and Merkle root values. Changing one bit in data for which a hash value has been calculated will result in another random (but unique) hash value. If any single bit is in any block changed, all the subsequent hash values in the chain of hash links will change all hashes right up until the most recent record, making any tampering obvious. Moreover, a simple comparison with other SDL copies on other Nodes also insures successfully tampering with records becoming prohibitively difficult. In embodiments, The SDL as used in the Invention has a couple of notable differences with the blockchain as used in cryptocurrencies and other such systems. The first difference is that there is no so-called "proof-of-work" value which need to be calculated. Indeed, such a value is only necessary for systems in which network peers maintaining the Distributed Ledger are not known in advance—any peer can take part in the process—nor can any such peer be trusted, which is why it is called a "permissionless" blockchain. This is why the inventor of the Blockchain created a complex web of computational incentives centred around the concept of "computationally mining" for random values which cancel out the hash to a value of "0" for a given block in the chain, and why miners exist. In embodiments of the Invention, any and all Trust Ring Members participating in the maintenance and management of the SDL are known or knowable by all Nodes, are explicitly authorized, and any message sent to and from each such Node can be verified and authenticated. This is why the SDL as used in embodiments of the Invention can be characterised as a "permissioned" or "private" blockchain. The use of BFT algorithm in the Invention makes the Trust Ring vulnerable to the same type of attacks aiming at taking control of $2/3$ of voting/mining peers. Using mining and proof-of-work has thus only disadvantages, mining being very computationally costly. Similarly, an important difference with other uses of distributed ledgers is that the SDL is not used as an authenticable communication medium, principally due to speed and efficiency concerns. Indeed, ad-hoc networks are very often resource constrained, particularly in Internet-of-Things applications, and it is typically not practical for a Node to wait to have the latest copy of the Blockchain. A Trust Ring Member is thus chosen as part of voting processes to perform any action required once the different type of votes have achieved a consensus decision, such as address allocation, SDL block and record inscriptions, or Trust Ring Member transformations.

Processes and Methods

As, in ad-hoc networks deployer with this Invention, each and every peer is equal, and the ad-hoc network is said to be homogeneous, each and every Node in the network must function using the exact same methods. In preferred embodiments, the invention is thus best implemented as a variant of a mathematical model of computation called a Finite State Machine (hereafter FSM). FSM are defined, as per Wikipedia, a model of computation "abstract machines that can be in exactly one of a finite number of states at any given time.

The FSM can change from one state to another in response to some external inputs; the change from one state to another is called a transition. A FSM is defined by a list of its states, its initial state, and the conditions for each transition.". The methods of the Invention as described here as described the states and transition in which the Nodes as embodied in Nodes can be in, and which actions—transitions—shall be performed. The methods themselves shall be embodied encoded as a list of instructions to be read from a computer readable medium and interpreted by the central processing unit or units of the Nodes.

FIG. 7.1 and FIG. 7.2 show a schematic sequential protocol diagram of messages exchanged between Nodes of an ad-hoc network deployed using this Invention at different points of the Commissioning process defined by the Invention. 601 is a Configurator Device, 602 can be any Non Commissioned Node, 603 can be any Commissioned Node Nodes in direct communications range of 602 a Non-Commissioned Node undergoing the commissioning process, 604 can be any Commissioned Node not in direct communications range of 602 a Non-Commissioned Node undergoing the commissioning process, 605 is the Trust Ring Member Node closest to a Non-Commissioned Node undergoing the commissioning process (in terms of hops between itself and the Trust Ring Member Node), 606 can be any other Trust Ring Member.

A. Node Startup and Advertisement

A.1) General Node Startup Procedure

Figure 10:
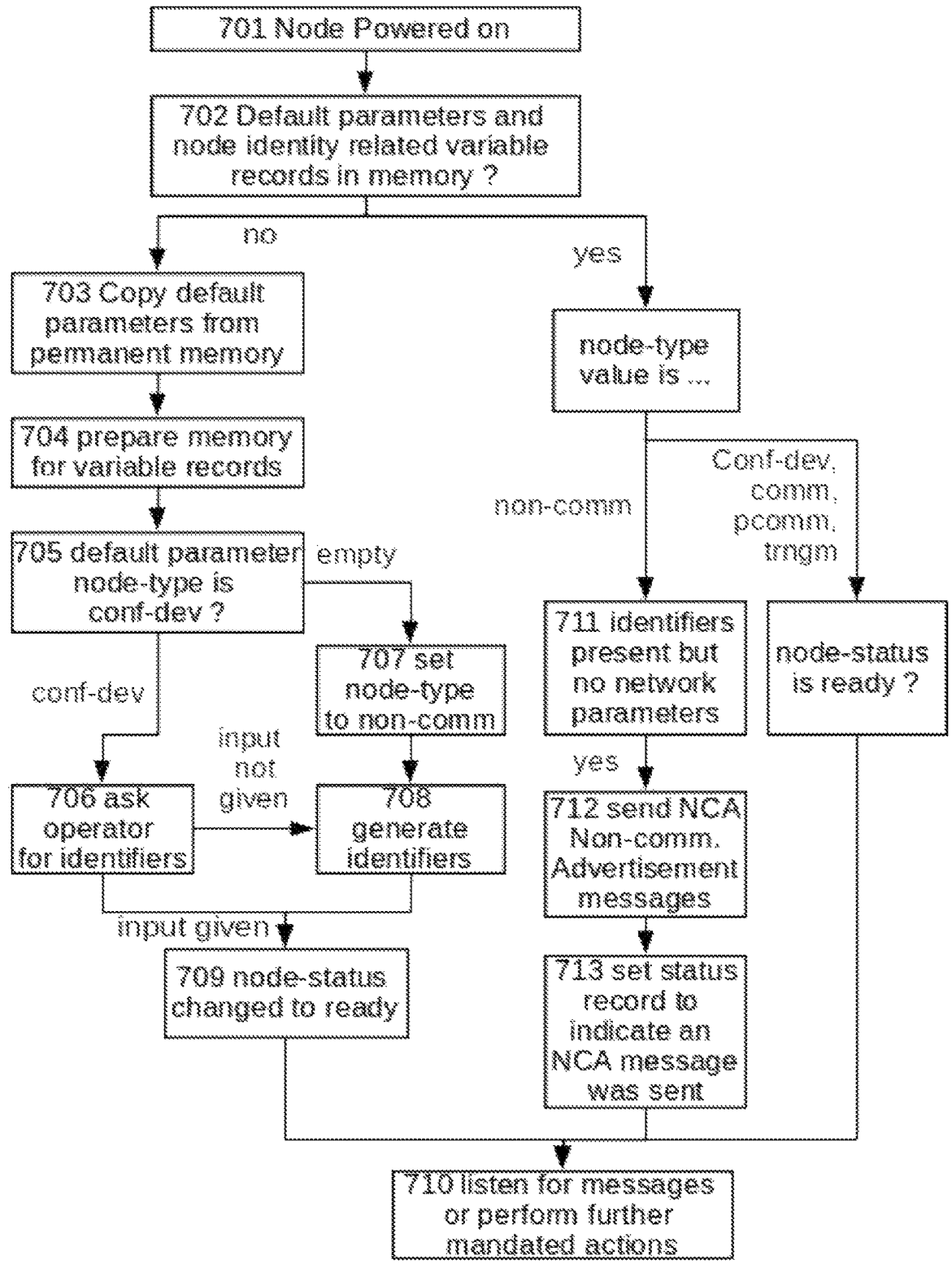

In preferred embodiments, all Nodes, Non-Commissioned or Configurator Devices, (FIG. 7.1, 610) when powered on (FIG. 10, 701) first checks its Flash-ROM or RAM (see FIGS. 6, 402 and 403) for a record indicating said Node's type", and eventually, if it exits, its starting functional status (hereafter it's "node status") (FIG. 10, 702); and then in such a check fails, attempt to copy from its Flash-ROM or RAM records describing the factory set functioning parameters for a given ad-hoc network type, such as but not limited the protocol signature, packet length, etc; then, attempt to copy, if they exist, records identifying a particular ad-hoc network, which allow it to be automatically admitted, registered and Commissioned by other already commissioned Nodes (FIG. 10, 703); and a. if its node type indicates it is a "Configurator Device" (FIG. 10, 705), but no record identifies a specific network (identified by a service set identifier, hereafter "network ssid"), its network-wide communication encryption key (hereafter "network key") and synchronized time reference (hereafter "network sync. time"), and an SDL ID, then said Configurator Device shall request on its connected display from its human operator the value of said records to be input (FIG. 10, 706); or b. if no node type record exists or it indicates the Node is "Non-Commissioned" or a "Configurator Device", and if no node status record exists, and if said Node has no unique set of identifiers in memory (FIG. 10, 707), then said Node shall prepares a unique set of identifiers for itself, which comprises:

i. Generating a random numeric identifier for the Node (hereafter called "Random ID" if the node is Non-Commissioned or "Config ID" if it is a configurator device), a random private asymmetric cipher key (hereafter respectively "non-comm. private key" and "config. private key"); and ii. Calculating a public key linked to the private key just generated (hereafter respectively "non-comm. public key" and "config. public key")—(FIG. 10, 708); and c. If said node is a configurator device then set its node status to indicate said Node is ready to receive messages and process information (hereafter "ready to receive and process")—(FIG. 10, 709); and d. Periodically check if any message has been received or any whether any other action or information processing shall be performed (FIG. 10, 710).

FIG. 9 shows four such Non-Commissioned Nodes 501, 502, 503 and 504, which have completed the procedure described above in the previous paragraph, and 505, a Configurator Device.

A.2) Automated Commissioning

In preferred embodiments, whereas a Non-Commissioned Node's status is ready to receive and process, and if all four of a network ssid, network key, network sync time, a Configurator Device's cryptographic signature (its own Config ID encrypted with its own conf. private key using the chosen asymmetric cipher as required by mandatory parameters, hereafter "configurator signature") records exist in RAM or Flash-Rom, then said Node shall send a Commissioning Request message (hereafter "CRQ message") encrypted with the relevant network key using the symmetric cipher as required by mandatory parameters, and containing said network SSID, network sync. time, a configurator sig. as well as its own Random ID and non.-comm. public key; and sets its node status record to indicate that a CRQ message was sent; and then Periodically check if any message has been received or any whether any other action or information processing shall be performed.

A.3) Semi-Automated Commissioning Initialization

In preferred embodiments, whereas a Non-Commissioned Node's status is ready to receive and process, and if any of a network ssid, network key or network sync record do not exist in its RAM or Flash-ROM (FIG. 10, 711), then said Node shall send a Non-Commissioned Advertisement message (hereafter "NCA message") indicating it's presence and Non-Commissioned status, as well as containing its Random ID, digital information tokens indicating its capabilities (hereafter "node metadata") and its non.-comm. public key to allow other node to securely communicate back with it (FIG. 7.1, 611; FIG. 10, 711; FIG. 11, 506); and sets its status record to indicate an NCA message was sent (FIG. 10, 713; FIG. 7.1, 611); and then periodically check if any message has been received or whether any other action or information processing shall be performed (FIG. 10, 710).

FIG. 11 shows the same above described five Nodes, as well as 506, an NCA message being sent across the shared communication medium and 507, the communications range for the emission of said message by Non-Commissioned Node 501.

B. Advertisement Processing and Automated Commissioning Initialization

B.1) Processing Non-Commissioned Advertisement Messages

Figure 14:
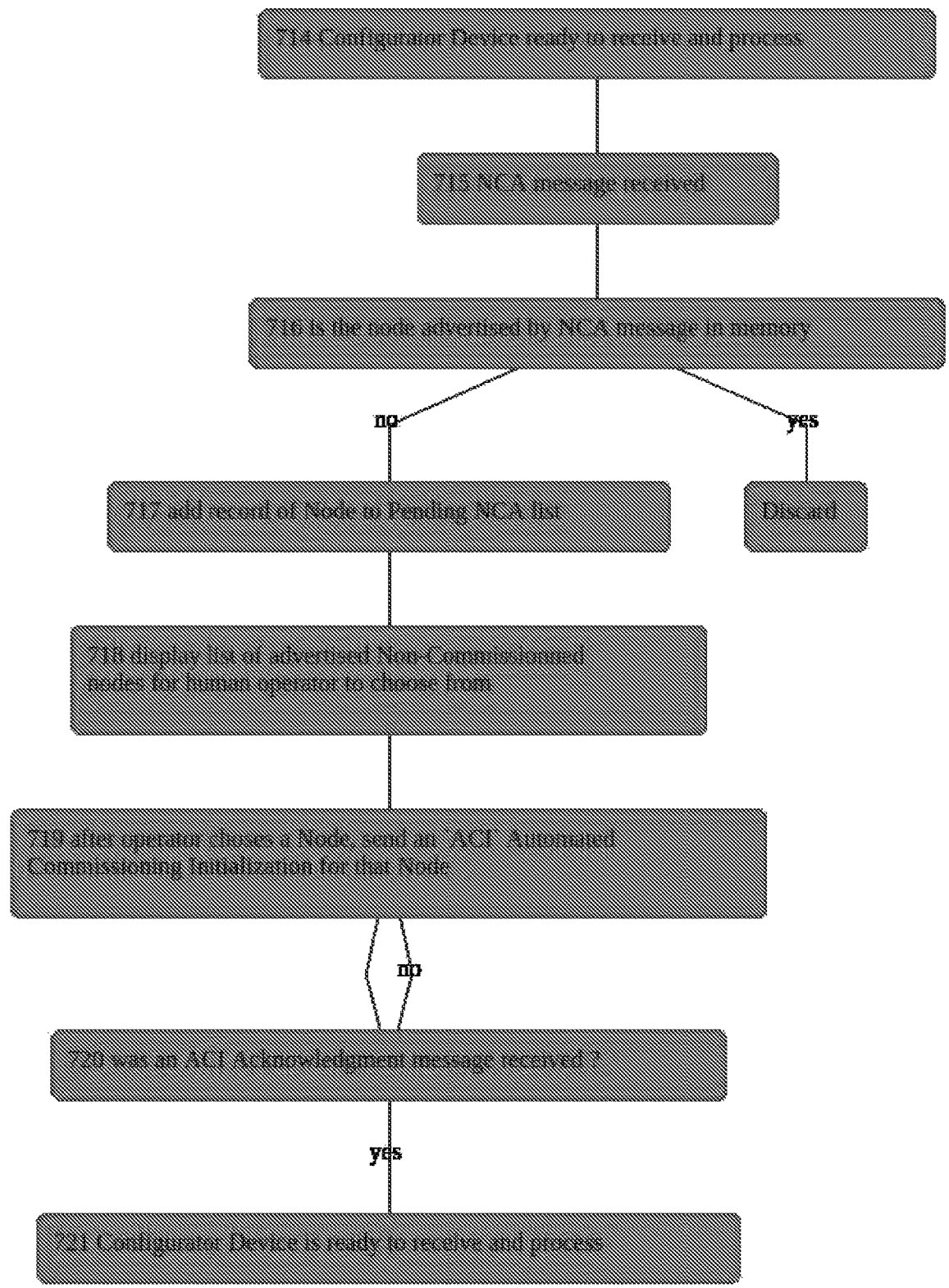
FIG. 14 shows a diagram of the method from the invention which Nodes follow when Processing Advertisement and Automated Commissioning Initialization message.

In preferred embodiments, whereas a Configurator Device's status is ready to receive and process (FIG. 14, 714), and if it receives an NCA message (FIG. 14, 716), then said Node shall (FIG. 14, 716), if it has no record of a Non-Commissioned Node with the Random ID so received, then create one using the received message's values in a list of pending Non-Commissioned advertisements (hereafter "pending NCA list") it maintains (FIG. 14, 717); and For all records in its pending NCA list which do not indicate an Automated Commissioning Initialization message (hereafter "ACI message") was sent display a list of such Nodes identified by their Random ID and Node metadata on its directly attached or on a remote display, for its human operator (FIG. 12, 718; FIG. 14, 718; FIG. 7, 612), and allow said operator to select a displayed node with the press of a button, which causes the Configurator Device to send an ACI message (FIG. 14, 719; FIG. 7, 613) encrypted with the Node's non-comm. public key as recorded in the pending NCA list using the chosen asymmetric cipher, and which contains the chosen Node's Random ID and its own configurator public key; and the following values encrypted with the network key using the chosen symmetric cipher: network sync. time, network ssid, its configurator signature, the chosen Node's Random ID and non-comm. public key; sending the ACI message cause it to originate the distributed and automated commissioning process of the chosen Non-Commissioned Node into the ad-hoc networking deployed using this Invention, and Periodically check if any message has been received or whether any other action or information processing shall be performed.

FIG. 13 shows the same above described five Nodes, as well as 508, an ACI message being sent across the shared communication medium and 509, the communications range for the emission of said message by Configurator Device 505.

B.2) Processing Automated Commissioning Initialization Acknowledgment Messages

In preferred embodiments, whereas a Configurator Device receives an Automated Commissioning Initialization Acknowledgment message (hereafter "ACIACK message") was received (FIG. 14, 720; FIG. 15, 565), then said Node shall Decrypt said message with its conf. pub.key using the chosen asymmetric cipher; and if at any moment an ACIACK message is received whose Random ID value is equal to the corresponding field in the Configurator Device's Pending NCA list, then set the corresponding field to a indicate said reception happened in said List, and set the Configurator Device's status to ready to receive and process (FIG. 14, 721); and then periodically check if any message has been received or any whether any other action or information processing shall be performed.

C. Commissioning Requests and Authorizations or Automated Trust Ring Formation

C.1) Processing Automated Commissioning Initialization Messages

Figure 17:
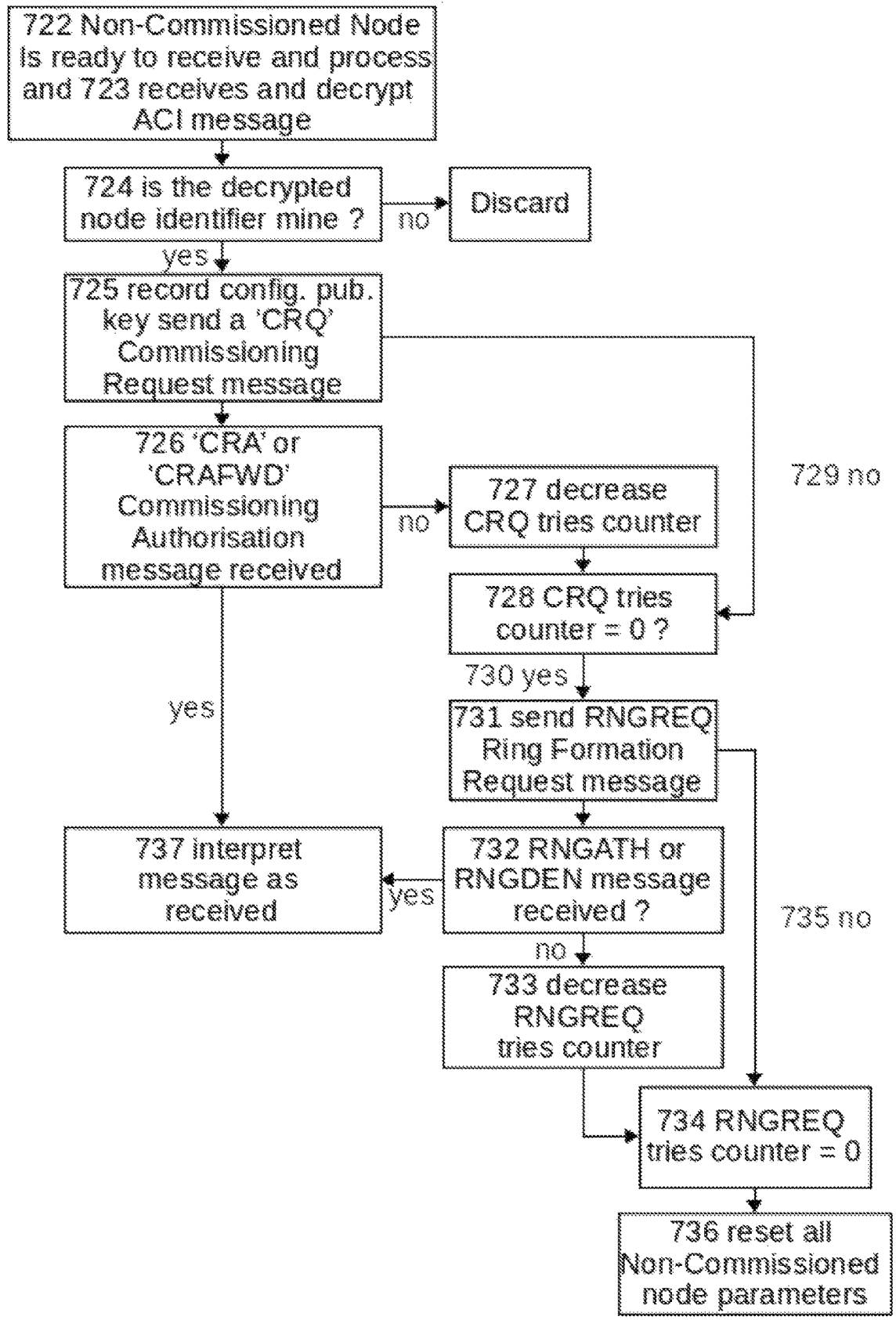
FIG. 17 shows a diagram of the method from the invention which Nodes follow when processing Commissioning Requests "CRQ" or Trust Ring Formation Request "RNGREQ" messages.

In preferred embodiments, whereas Non-Commissioned is ready to receive and process (FIG. 17, 722) and receives an ACI message (FIG. 14, 508; FIG. 17, 723), then said Node shall decrypt said message with its non-comm. private key using the chosen asymmetric cipher algorithm; and if the Random ID value contained in the clear text so obtained is equal to its own (FIG. 17, 724; FIG. 7.1, 614), then record the configurator public key so received in memory and send a "CRQ message", but using values from the received ACI message encrypted with the network key using the symmetric cipher instead (FIG. 16, 509; FIG. 17, 725; FIG. 7, 615); then set its node status to indicate that a CRQ message was sent and periodically check if any message has been received or any whether any other action or information processing shall be performed.

FIG. 16 shows the same above described five Nodes, as well as 509, a CRQ message being sent across the shared communication medium and 510, the communications range for the emission of said message by Non-Commissioned Node 501.

C.2) Detecting if Deployed Nodes or the Ad-Hoc Network are in Range

In preferred embodiments, whereas a Non-Commissioned Node's status indicates a CRQ message was sent, then said Node shall periodically check if either a Commissioning Authorization or a Commissioning Forwarded Authorization message (hereafter respectively "CRA message" or "CRAFWD message") were received (FIG. 17, 726; FIG. 7.1, 616); such check shall only be performed a limited number of times (FIGS. 17, 727, 728 and 729) until the threshold number of such checks as set forth in the network wide parameters has been reached (FIG. 17, 730). If such a threshold is reached, then end a Trust Ring Initialization Request message (hereafter "RNGREQ message") and which contains said Node's own Random ID encrypted using the configurator public key (FIG. 17, 731; FIG. 7.1, 617); and Set its node status record to indicate that a RNGREQ message was sent; and then periodically check if any message has been received or whether any other action or information processing shall be performed.

FIG. 18 shows the same five Nodes as above described as well as 509, an RNGREQ message being sent across the shared communication medium and 511, the communications range for the emission of said message by Non-Commissioned Node 512.

C.3) Requesting the Formation of a New Trust Ring

In preferred embodiments, whereas a Non-Commissioned Node's status indicates a RNGREQ message was sent, then said Node shall periodically check (FIG. 17, 733, 734, 735) if either a Trust Ring Initialisation Authorization message or a Trust Ring Initialization Denial message (hereafter respectively "RNGATH message" and "RNGDEN message") were received (FIG. 17, 732; FIG. 7.1, 619; FIG. 7, 620); such check shall be performed a limited number of times until the threshold number of such checks as set forth in ad-hoc network parameters. If such a threshold is reached, then set its node status record to indicate that the node is ready to receive and process (FIG. 17, 736) and periodically check if any message has been received or any whether any other action or information processing shall be performed.

C.4) Processing Trust Ring Formation Request Messages

Figure 20:
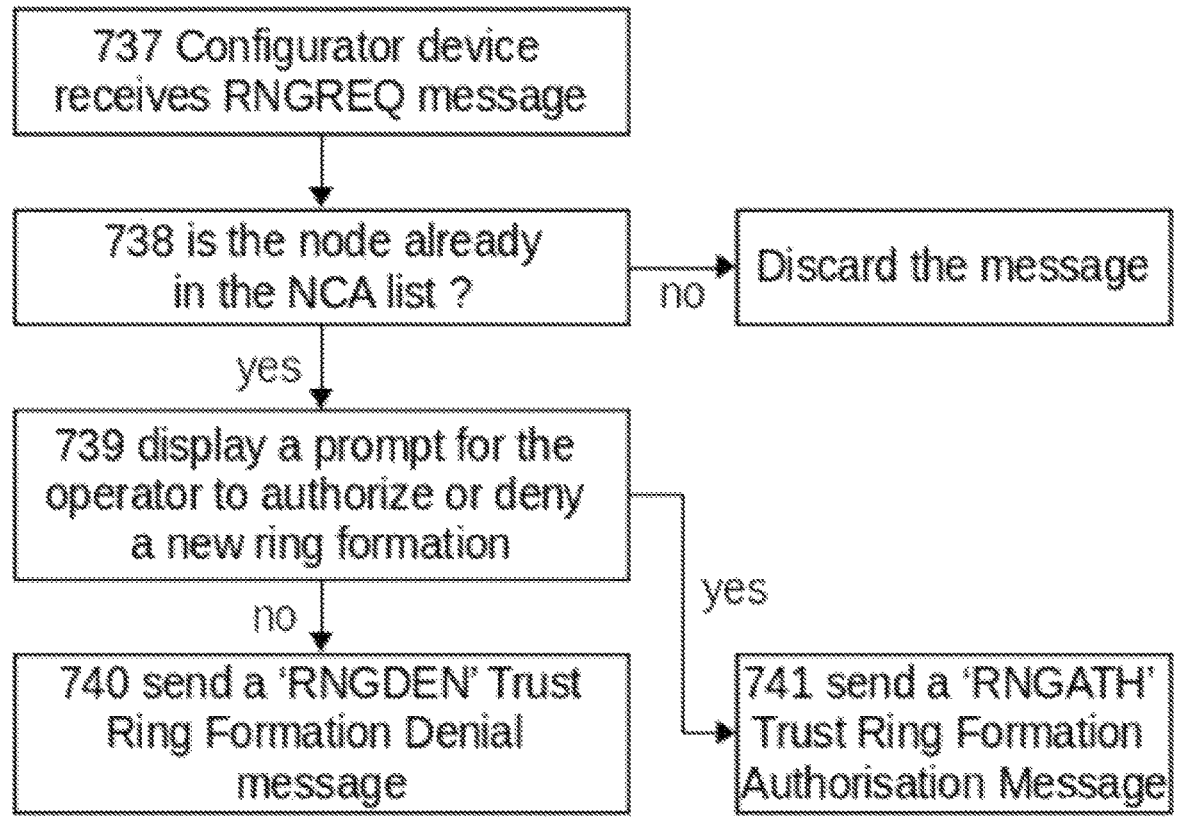
FIG. 20 shows a diagram of the method from the invention which Nodes follow when processing Trust Ring Formation Request "RNGREQ" messages.

In preferred embodiments, whereas a Configurator Device's status is ready to receive and process, and which receives an RNGREQ message (FIG. 20, 737), then said Node shall decrypt said message with its configurator private key using the chosen asymmetric cipher algorithm; and it shall then decrypt the message with its own conf. private key using the chosen asymmetric key cipher algorithm and if the Random ID value contained in the clear text so obtained is equal to its own, then said Configurator Device shall verify if there is a record in its Pending NCA list whose Random ID field equals the Random field contained in the resulting clear-text, if such is the case (FIG. 20, 738), then said Node shall request such authorization from a human operator on its connected display (FIG. 19, 742; FIG. 7.1, 618), which answer shall be given using for example a connected keypad (FIG. 19, 743; FIG. 20, 739); and if such authorisation is denied (FIG. 20, 740), send a RNGDEN message (FIG. 21, 513; FIG. 7, 619), but comprising at a minimum of the requesting Node's Random ID encrypted with the corresponding non-comm. public key recorded in the Pending NCA list using the chosen asymmetric key encryption algorithm; or if such authorisation is given (FIG. 20, 741), then if there is no records indicating the network identifier, network key, and network synchronised time, said Node absolutely must either request such the authorization to generate the network identifier and key using the pseudorandom random number generator and to use its own clock to set the ledger initialisation time, or request an external time reference; if an external reference is requested, the time differential with the synchronized network time shall be recorded; optionally, an identifier for the secure distributed ledger might be input by the operator; and send RNGATH message (FIG. 22, 515; FIG. 7.1, 621), encrypted with the NC pub key as recorded in the Pending NCA list using the chosen asymmetric key encryption algorithm, but comprising at a minimum the network identifier, the network communications encryption key, its own Config ID, its own configurator public key, the ledger initialization time, the network's time differential, the minimal preferred number of Trust Ring members; and Periodically check if any message has been received or any whether any other action or information processing shall be performed.

Figure 21:
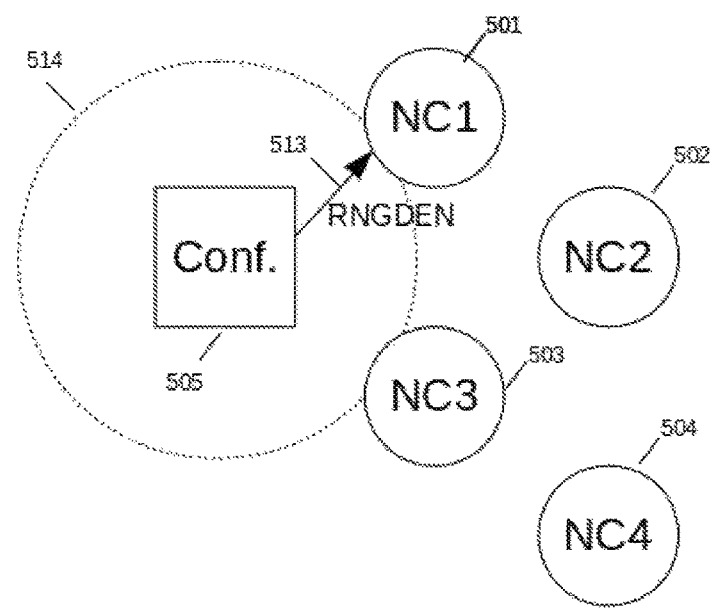
FIG. 21 shows a schema of a Configurator Device sending a Trust Ring Formation Denial "RNGDEN" message.

FIG. 21 shows the same above described five Nodes, as well as 513, an RNGDEN message being sent across the shared communication medium and 514, the communications range for the emission of said message by Configurator Device 505.

FIG. 22 shows the same above described five Nodes, as well as 515, an RNGATH message being sent across the shared communication medium and 516, the communications range for the emission of said message by Configurator Device 505.

E. Trust Ring Formation Authorization Processing and Trust Ring Initialization

E.1) Processing of Trust Ring Authorization Messages

Figure 23:
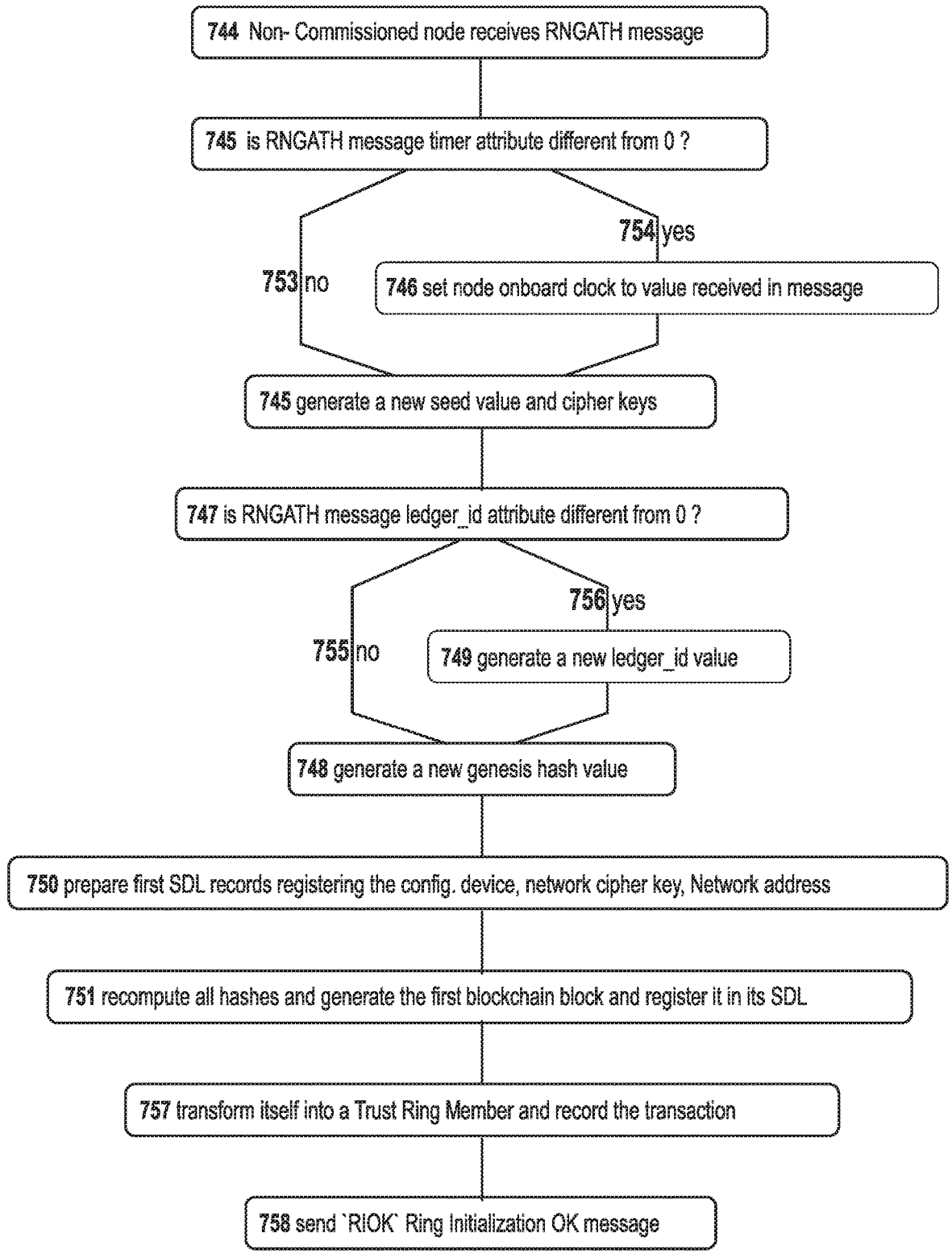
FIG. 23 shows a diagram of the methods from the invention which Nodes follow when processing Trust Ring Formation Authorization messages and the initialization of the Trust Ring itself.

In preferred embodiments, whereas a Non-Commissioned Node's status indicates a RNGREQ message was sent, and if said Node receives either a RNGDEN message or a RNGATH message, it shall decrypt the message with its own NC private key using the chosen asymmetric key cipher algorithm and if the Random ID value contained in the clear text so obtained is equal to its own, said Node shall (FIG. 7.1, 622):

If the message so received was a RNGDEN message (FIG. 7.1, 619), it shall set the node status to indicate said Node is ready to receive messages and process information to receive messages and process data to function; or If the message so received was a RNGATH message (FIG. 7.1, 620), message, then:

If the ledger initialization time so received is different from zero (FIG. 23, 745; FIG. 7.1, 623), then set the time to that value (FIG. 23, 746; FIG. 7.1, 623); and Generate a new seed value, private key and public key (hereafter ring member private key and ring member public key respectively)—(FIG. 23, 745; FIG. 7.1, 623);

if no value was received for the ledger identifier (FIG. 23, 747; FIG. 7.1, 623), generate a new one with the seed and the chosen pseudo-random number generator algorithm (FIG. 23, 749; FIG. 7.1, 623);

generate a new Genesis Hash value for the Secure Distributed Ledger (FIG. 22, 748; FIG. 7.1, 623), with the node's Random ID, the ledger identifier, the Node's meta-data and ring member private key as inputs for the chosen hash algorithm as required by the network's parameters; and Adding these four transactions in its list of pending secure distributed ledger transaction, hereafter "Pending Transactions list", and if there were no ledger initialisation time in the RNGATH message, set the time-stamp for all following transactions to zero (FIG. 23, 750; FIG. 7.1, 623):

a Secure Distributed Ledger Initialisation transaction, wherein the received configurator public key, conf. id, the network identifier, the ledger identifier, the minimal preferred number of Trust Ring members, the time differential with an external source if such a value was transmitted must be recorded at a minimum; and a Network Key Authorisation transaction, wherein the network identifier, said key and the ledger identifier must be recorded at a minimum; and a Node Registration transaction, for itself, wherein the ledger identifier, the configurator signature, the first available network address, its own Node Metadata, its ring member public key must be recorded at a minimum; and A Ring Member Registration transaction, wherein the ledger identifier, its own new network address, and its RM pub key must be recorded at a minimum; and Signing the record of each transaction with its own ring member private key using the chosen digital signature algorithm said Node shall then compute all the consecutive linked hash values and Merkle tree hash values for each transaction in the Pending Transactions list (FIG. 23, 751; FIG. 7.1, 623), in the order they are recorded in with the entire text of the record of the preceding transaction using the chosen hash algorithm, and recording said hash values in said list;

said Node creating a new, first Secure Distributed Ledger block, which comprises said Node using the genesis hash for the first link, computing a hash value, hereafter called a block's "meta-data", using the block's time-stamp, the Merkle Tree root value, the number of transactions in the set being registered in the block, a hash value for the entirety of the preceding block's record (here the genesis hash value), its own digital signature for the block computed with its ring member key and using the chosen digital signature algorithm;

deleting the transaction set thus recorded from the Pending Transactions list registering itself in the SDL as the first new Trust Ring Member for which it is the first member, which comprises computing the preceding block's hash value, and if there were no ledger initialisation time received in the RNGATH message the value zero for the block's creating time, or the current time indicated by its onboard clock if there was such a value in the RNGATH message, set its own Node type to indicate it is now a Trust Ring member (FIG. 23, 757; FIG. 25, 519; FIG. 7, 623); and if there were no ledger initialisation time in the RNGATH message, set the Node's clock to zero; and Send a Trust Ring Initialisation Advertisement message, hereafter "RIOK message" (FIG. 23, 758; FIG. 24, 517; FIG. 7.1, 624), but comprising at a minimum of the following values encrypted with configurator public key: the Random ID as received from the RNGATH message, its network address, its ring member private key, the ledger identifier and the time at which the Ring Member Registration transaction was recorded; and set the node status to indicate said Node is ready to receive messages and process information; and Periodically check if any message has been received or any whether any other action or information processing shall be performed.

FIG. 24 shows four of the same above described Nodes, except 501, which has now become 519 a Trust Ring Member, as well as 517, an RIOK message being sent across the shared communication medium and 518, the communications range for the emission of said message by the Trust Ring Member 519.

E.2 Processing of Trust Ring Advertisement Messages

In preferred embodiments, whereas a Configurator Device's status indicates it is ready to receive messages and process information, and if said Node receives an RIOK message (FIG. 24, 517; FIG. 7, 624), it shall decrypt the message with its own conf private key using the chosen asymmetric key cipher algorithm and if the Random ID value contained in the clear text so obtained is equal to its own, said Node shall add the information contained therein to its list of Network Partitions, and erase the record for the corresponding Random ID from its Pending NCA list.

F. Distributed Commissioning Process

F.1) Processing by Commissioned Nodes of Commissioning Request Messages

Figure 26:
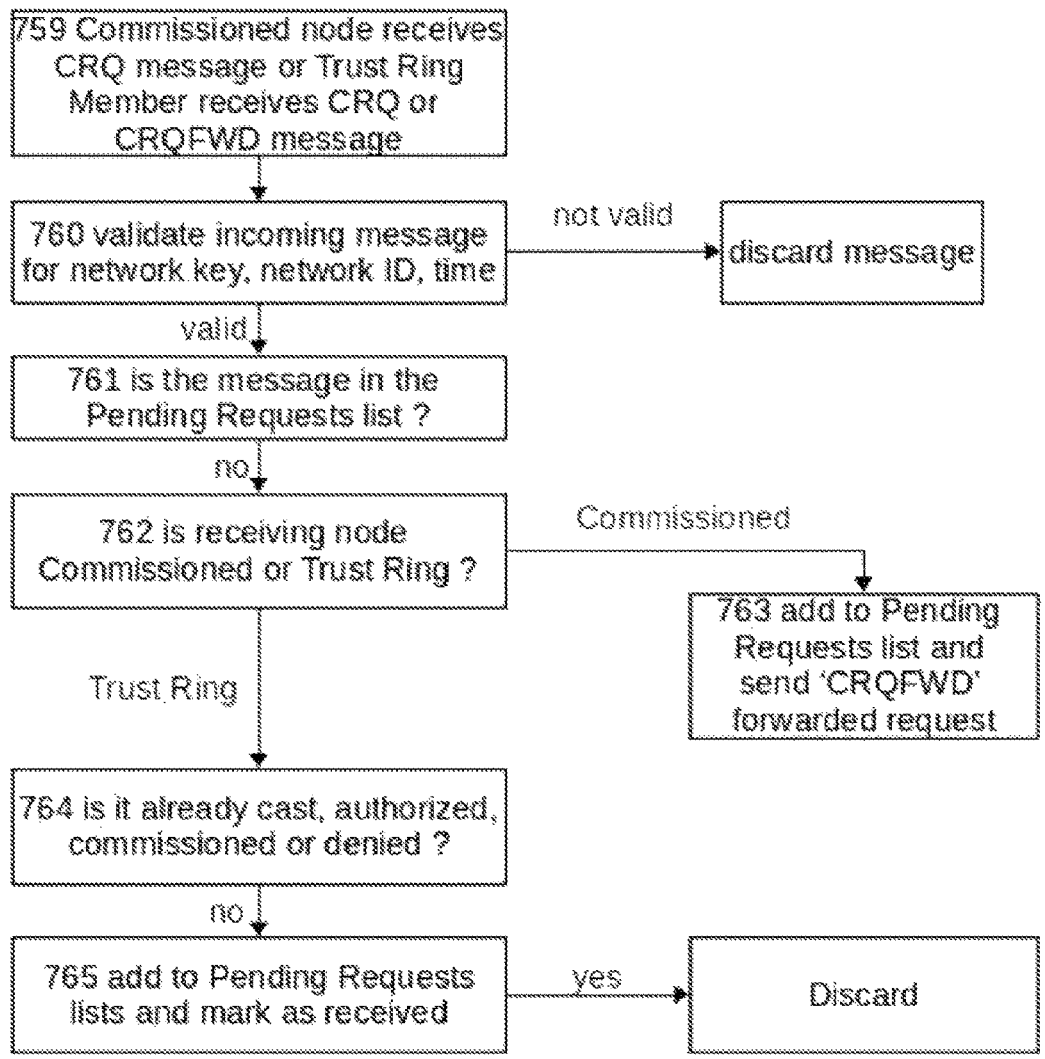
FIG. 26 shows a diagram of the method from the invention which Commissioned Nodes and Trust-Ring Member Nodes follow when processing Commissioning Request.

In preferred embodiments, whereas a Commissioned Node's status indicates is ready to receive messages and process information, and if said Node receives a CRQ message (FIG. 24, 517; FIG. 26, 759; FIG. 7, 625), it shall decrypt the message's encrypted part with the network key using the chosen symmetric bloc cipher algorithm and if both the network identifier so obtained is the same as its own, and the network time so obtained is within a tolerance margin set forth in the ad-hoc network parameters (FIG. 26, 760; FIG. 7.1, 626); and if its Pending Commission's Requests list, hereafter "Pending CRQ list" does not have a record with the same Random ID as the one received as part of the CRQ message or if such a record exists, it isn't marked as being denied, authorized or already commissioned; then add a new record with the message's information to said table and send a Commissioning Forward Request message (hereafter "CRQFWD message")—(FIG. 26, 763; FIG. 7.1, 626; FIG. 7.1, 627), but comprising at a minimum of the following values: all the information received in the CRQ message, and its own network address as an indicator of the message's origin; and * Periodically check if any message has been received or whether any other action or information processing shall be performed.

F.2) Processing by Trust Ring Member Nodes of Commissioning Request Messages

In preferred embodiments, whereas a Trust Ring Member Node's status indicates is ready to receive messages and process information, and if said Node receives a CRQ message (FIG. 24, 517; FIG. 26, 759; FIG. 7, 623), it shall decrypt the message's encrypted part with the network communications key using the chosen symmetric bloc cipher algorithm and if both the network identifier so obtained is the same as its own, and the network time so obtained is within a tolerance margin set forth in the network's parameters (FIG. 26, 760; FIGS. 7.1, 628 and 629) and if its Pending CRQ list does not have a record with the same Random ID as the one received as part of the CRQ message (FIG. 26, 761; FIG. 7, 628 and 629) or if such a record exists it isn't marked as being denied, authorized or already commissioned (FIG. 26, 764; FIGS. 7.1, 628 and 629), and if its own Pending Registration list doesn't contain a record with the same Random ID, then add a new record to the Pending CRQ list with the message's information (FIG. 26, 765; FIGS. 7.1, 628 and 629), and set said records status as received, its ring distance to zero and the recipients' address to its own network address; and Periodically check if any message has been received or any whether any other action or information processing shall be performed.

F.3) Processing by Trust Ring Member Nodes of Forwarded Commissioning Request Messages In preferred embodiments, whereas a Trust Ring Member Node's status indicates is ready to receive messages and process information, and if said Node receives a message marked as encrypted, it shall decrypt it and if the message identifier so obtained indicates it is a CRQFWD message (FIG. 24, 517; FIG. 26, 759; FIGS. 7.1, 628 and 629), then perform all the same actions described in the previous paragraph, except that the ring distance value for the record created in the Pending CRQ list shall indicate the distance the message has traveled as indicated by number of times the message was re-sent (the number of hops), and then periodically check if any message has been received or any whether any other action or information processing shall be performed.

F.4) Trust Ring Member Processes Pending Commissioning Requests

Figure 30:
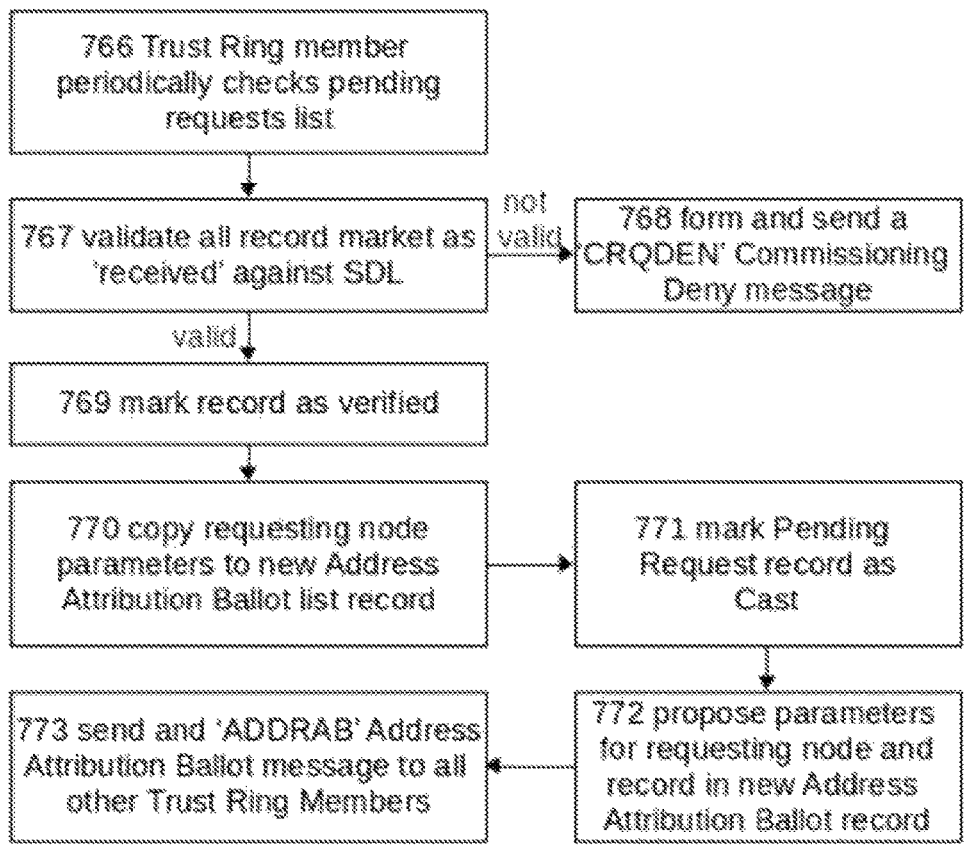
FIG. 30 shows a diagram of the method from the invention which Trust Ring members follow when processing the Pending Commissioning Requests lists which they maintain, and when initializing a new Trust Ring.

In preferred embodiments, whereas a Trust Ring Member Node's status indicates is ready to receive messages and process information, it shall periodically check its pending CRQ list for records which have not been verified (FIG. 30, 766; FIG. 7.1, 630), and for each such record, check if the configurator signature contained therein and the configurator signature as recorded in the first block of the Secure Distributed Ledger is the same (FIG. 30, 767; FIG. 7.1, 631); if the configurator signature cannot be found, mark the record as denied and a Commissioning Request Deny message (hereafter "CRQDEN message") (FIG. 30, 768; FIG. 7.1, 631); and If there is such a record then mark the record as verified (FIG. 30, 769) and copy its content in a new record in the Pending Address Ballots list it maintains; then setting the other values of said record as follows: it's "Proposed Address" value to the sequential non attributed address as indicated by the smallest of either the Secure Distributed Ledger Node Commissioning Transactions or said Node's own Pending Registration's list (FIG. 30, 772); and its closest ring member indicator to its own network address; and all other values as described by the network's parameters to the value zero (FIG. 30, 770); and If a new record was created in the Pending Address Ballots list as described in the previous paragraph, then send an Address Attribution Ballot message, hereafter "ADDRAB message" (FIG. 30, 773; FIGS. 7.1, 631 and 632), but comprising at a minimum of said record's contents, and any other parameters mandated by the chosen Byzantine Fault Tolerant Consensus algorithm, hereafter "BFTC algorithm", such as the list of destination Trust Ring members for said message; and mark the record corresponding to the ballot in the Pending CRQ list as cast (FIG. 30.1, 771); and then periodically check if any message has been received or any whether any other action or information processing shall be performed.

FIG. 43 shows the five Nodes, except as that 525 the Commissioned Node Pending Registration is 530 a Trust Ring Member Node as well as 531, an ADDRAB message being sent across the shared communication medium and 532, the communications range for the emission of said message by the Trust Ring Member 530. Similarly, FIG. 44 shows the same five nodes as above, except that 519 the first Trust Ring Member Node sends 533 a signed ADDRAB vote ballot back to 530 the second Trust Ring Member Node, and 534, the communications range for the emission of said message by the Trust Ring Member 519.

F.5) Trust Ring Member Processes Address Attribution Ballot Messages

Figure 32:
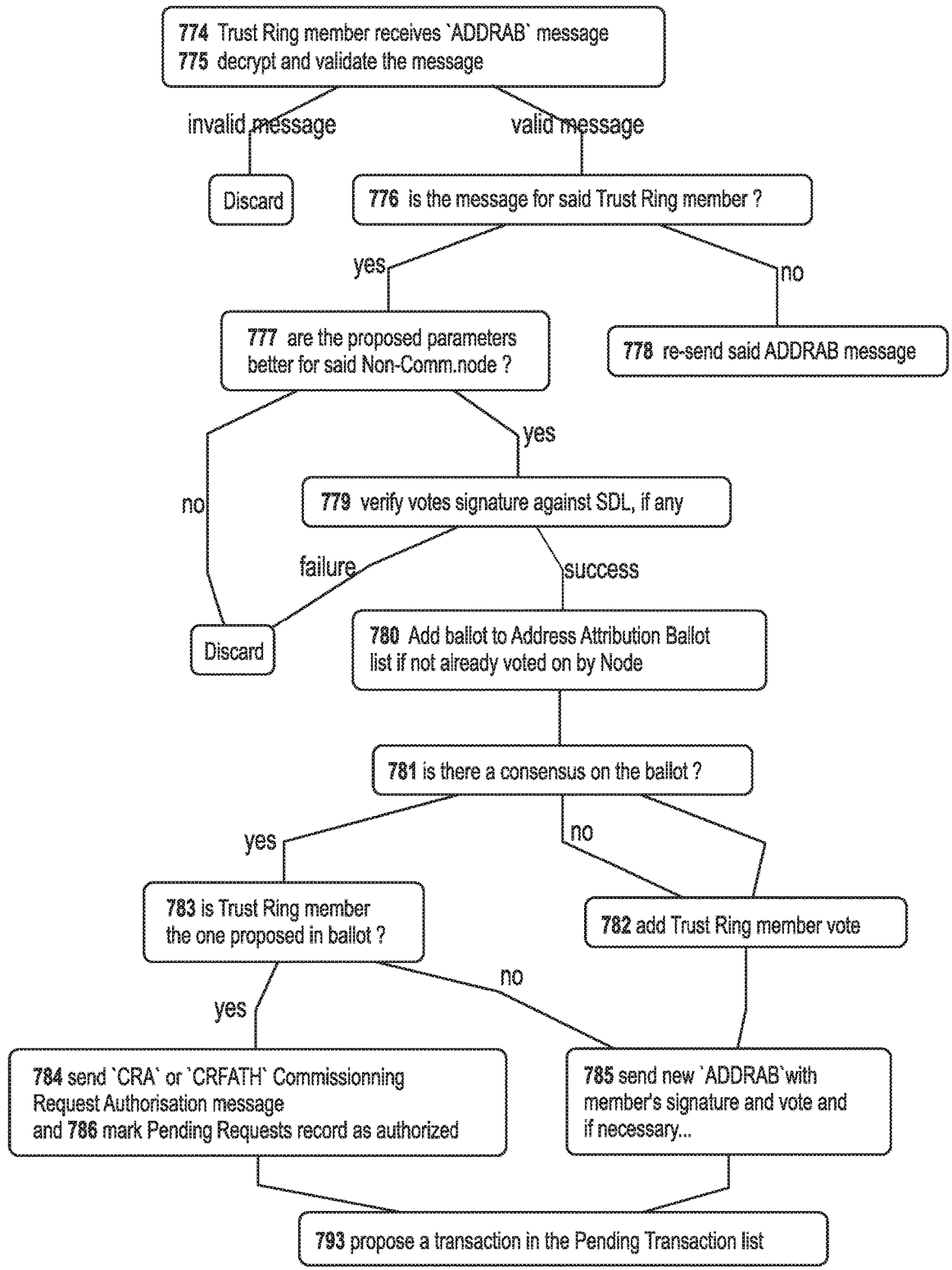
FIG. 32 shows a diagram of the method from the invention which Trust Ring member follow when processing Address Attribution Ballots.

In preferred embodiments, whereas a Trust Ring Member Node's status indicates is ready to receive messages and process information, and if said Node receives a message marked as encrypted, it shall decrypt the message with the network key; if the message identifier so obtained indicates it is a ADDRAB message (FIGS. 32, 774 and 775; FIGS. 7.1, 631, 632 and 633), and its own network address is in the list of destinations for said message (FIG. 32, 776), then it shall:

create a new record in its Pending Address Ballots list with the messages information; and e. if the message's proposed parameters are better than the corresponding field values of any record's in said list whose Random ID is the same as the message's (cardinality of numeric address number, ballot time-stamp and proposed ring member)—(FIG. 32, 777; FIGS. 7.1, 631, 632 and 633), then verify sequentially all the signatures contained in the incoming message field as by their destination addresses, using the chosen digital signature verification algorithm with and for each the corresponding ring member public keys as extracted from either the Trust Ring member list or its Secure Distributed Ledger it maintains; if any of the signatures does not verify, erase said message from the node's memory (FIG. 32, 779; FIG. 7.1, 631, 632 and 633); or f. if all signatures verify, then create a new Pending Address Ballots list record with the information from the message and update said record by adding its own signature to the Pending Address Ballot record using the chosen digital signature algorithm with all of the record's values and its ring member private key; then compute a new set of destination addresses and a new set of BFTC algorithm parameters using said algorithm; and send an ADDRAB message (FIGS. 32, 780 and 785; FIGS. 7.1, 631, 632 and 633) using the updated record's information; and g. if the newly created Pending Address Ballots list record consensus level (number of votes divided by number of Trust Ring Member Nodes) is greater than the BFTC algorithm consensus level required by the network's parameters (FIG. 32, 781; FIGS. 7.1, 631, 632 and 633), and if said record's proposed ring member address is its own, and if the Pending CRQ list record whose Random ID is the same as said Pending Address Ballots list record is marked as either received or verified, then:

h. If said new record's distance to ring member value is equal to zero, form a Commissioning Request Authorization message, hereafter "CRA message" (FIG. 32, 784; FIGS. 7.1, 631, 632 and 633), but comprised at a minimum by the following values from said record encrypted with the non. comm public key using the chosen asymmetric key cipher algorithm: the proposed address, the network identifier, the network communications encryption key, the configurator device signature, its own network address, the authorized node's random identifier, and a signature of all the preceding values of the message with its own ring member private key using the chosen digital signature algorithm; or if said new record's distance to ring member value is greater than zero, send a Commissioning Request Forwarded Authorization message, hereafter "CRFATH message", as required by the mandated parameters, but comprised at a minimum by the following values encrypted using the network key using the chosen symmetric block cipher algorithm: the same information as a CRA message above and the address of the original forwarder (FIG. 32, 784; FIGS. 7.1, 634 and 635); and mark the record corresponding to said Random ID in its Pending CRQ list to indicate it has been authorized (FIG. 32, 786; FIGS. 7.1, 634 and 635); and i. Erase from its Pending Address Ballots table all records whose Random ID field is the same as newly created record and whose consensus level is smaller than said record. if one or more record's consensus level values are equal then compare, in order the message's proposed address, proposed distance to a ring member, proposed ring member address, ant ballot time-stamp values with all such corresponding fields in the selected list's records; if at any point during the comparison process, the message's field value, including the consensus level is found to be smaller than all the corresponding field's values in said list's records, then and only keep the record for which those values are the smallest and erase the others; or and Continue to periodically check if any other message has been received or any whether any other action shall be performed.

FIG. 33 shows the five Nodes, as well as 523, a CRA message being sent across the shared communication medium and 524, the communications range for the emission of said message by the Trust Ring Member 519.

F.6) Commissioned Nodes Forward Commissioning Authorization Messages

Figure 34:
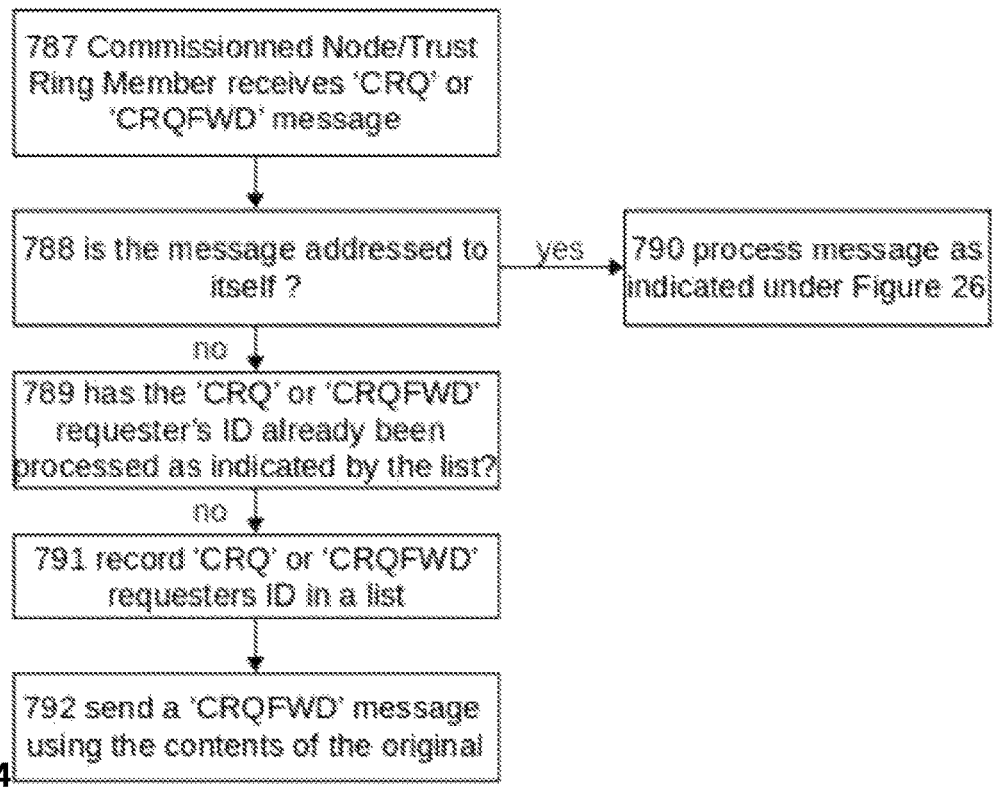
FIG. 34 shows a diagram of the method from the invention which Commissioned and Trust-Ring Member nodes follow when processing and forwarding Commissioning Requests.

In preferred embodiments, whereas a Commissioned Node's status indicates is ready to receive messages and process information, and if said Node receives a CRFATH message, it shall decrypt the message's encrypted part with the network key using the chosen symmetric bloc cipher algorithm and if the message identifier so obtained indicates it is a CRFATH message (FIG. 34, 787; FIGS. 7.1, 634 and 635), and its own network address is the destinations for said message (FIG. 34, 788), then it shall form a CRA message (FIG. 34, 790), with the information contained in the CRFATH message; and continue to periodically check if any other message has been received or whether any other action shall be performed.

F.7) Non-Commissioned Nodes Process Commissioning Authorization Messages

In preferred embodiments, whereas a Non-Commissioned Node's status indicates a CRQ message was sent, and if said Node receives a CRA message (FIG. 33, 523; FIG. 7.2, 637), it shall decrypt the message with its own NC private key using the chosen asymmetric key cipher algorithm and if the Random ID value contained in the clear text so obtained is equal to its own, said Node shall set the value of its own network address to the address provided in said message; and generate a new seed and a new private key (now a "commissioned private key") for itself as required by the network's parameters and using the chosen cryptographically secure pseudo-random number generator algorithm; and calculating a corresponding unique temporary public asymmetric key, hereafter "commissioned public key", which is cryptographically linked to the aforementioned private asymmetric key using the chosen asymmetric cipher key generation algorithm as required by the network's parameters; and send a Registration Advertisement message, hereafter "REGADV message" (FIG. 35, 526; FIG. 7.2, 638), but comprised at a minimum by the following values from the CRA message encrypted using network communications encryption key using the chosen symmetric block cipher algorithm: its new network address, the ring member address, ring member signature, configurator device signature, its new commissioned public key, its meta-data, its Random ID, and zero for the message's distance count; and set its node type to Commissioned and its node status to Commissioned Pending Registration; and continue to periodically check if any other message has been received or any whether any other action shall be performed.

FIG. 35 shows the five Nodes, except that 502 has now become 525 a Commissioned Node Pending Registration, and 526, a REGADV message is being sent across the shared communication medium and 527, the communications range for the emission of said message by the Node Pending Registration 525.

F.8 Trust Ring Members Processing Registration Advertisement Messages

Figure 36:
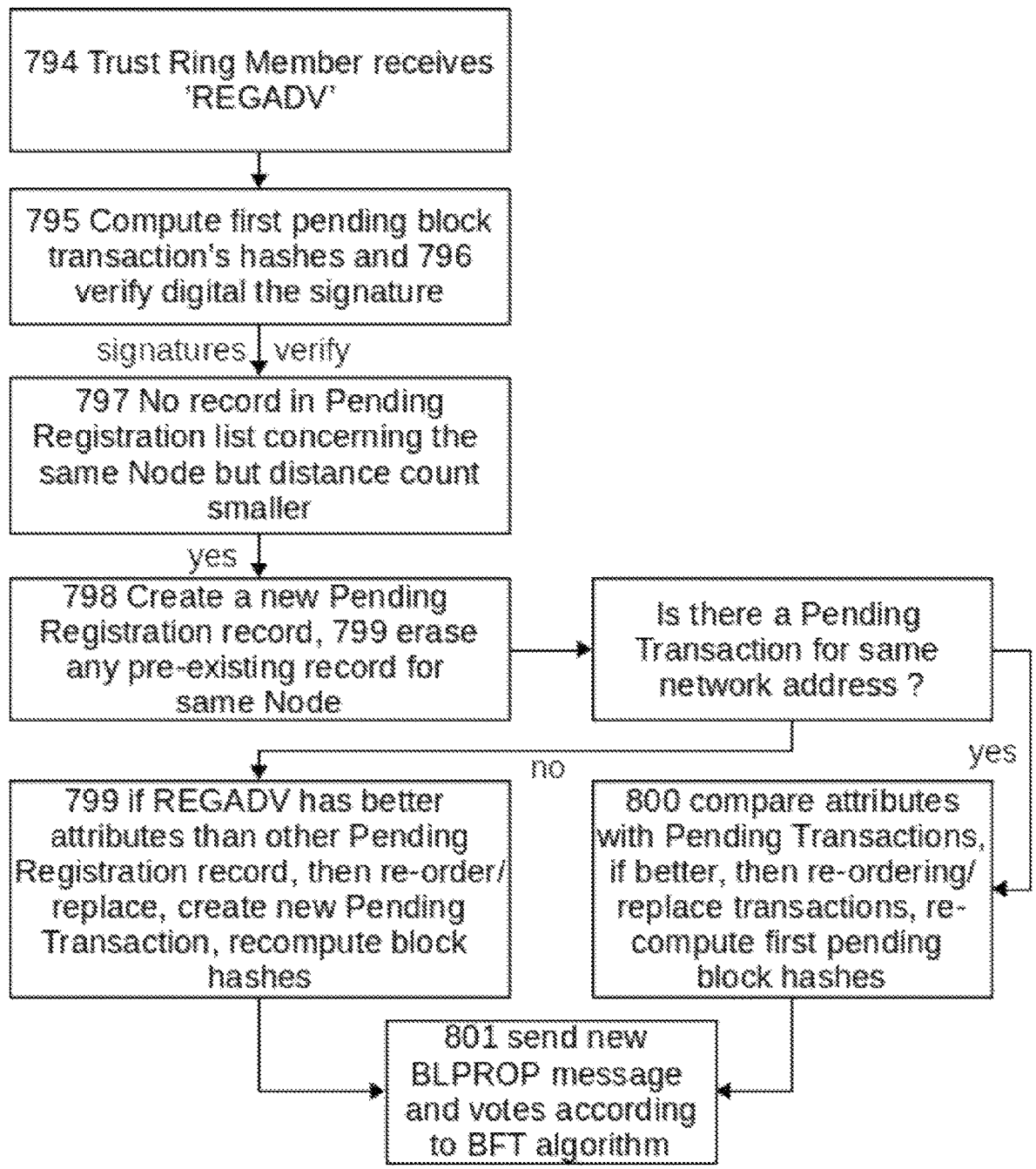
FIG. 36 shows a diagram of the method from the invention which Trust Ring members follow when processing the Registration Advertisement messages.

In preferred embodiments, whereas a Trust Ring Member Node's status indicates is ready to receive messages and process information, and if said Node receives a message marked as encrypted, it shall decrypt the message with the network key; if the message identifier so obtained indicates it is a REGADV message (FIG. 35, 526; FIG. 7.2, 639; FIG. 36, 794), then it shall:

Compute the hash tree root value from the transaction in the node's Pending Transactions's list (FIG. 36, 795), if any exist, sequentially ordered by the transaction order number, until the default number of transactions per bloc as required by the default parameters is reached; and verify the configuration device signature contained in the incoming message field as by their destination addresses (FIG. 36, 796), using the chosen digital signature verification algorithm with the configuration device public key as extracted from its Secure Distributed Ledger (FIG. 7.2, 640); then, if the signatures verify and if the message's Random ID field corresponds to one or more records in either the Node's Pending Address Ballots or Pending Registration lists, and if the ring member contained in the message can be verified using the values as received, and the corresponding ring member public key as extracted from its Trusted Ring member list or its Secure Distributed Ledger; if the signatures verify, then:

if the signatures verify (FIG. 7.2, 640) and if there are no records in its Pending Registration list whose Random ID (FIG. 36, 797), proposed address and commissioned public key are equal to the values in the message, or if such records exist, if there are no records whose distance count field is smaller than the corresponding value from the received REGADV message, then:

Create a new record in the Pending Registration list using the values received from the received message and its own network address for the records' ring member field, and the time measured at that moment by its on-board clock for the lists time-stamp field (FIG. 36, 798); and Erase any Pending Address Ballots records whose Random ID field value is the same as the received value from message, if such records exist, as well as any such record in the Pending registration list whose distance count value is greater than the corresponding field from the record just created; and If there are no Node Registration transactions in the Pending Transactions list with the same network address as the record created above (FIG. 36, 799), then if said record's proposed address value is greater or equal than the all of the corresponding field's values in other Pending Registration records whose network address and commissioned public key are the same as its own, then compare, in order, the last records's distance count, ring member address and times-tamp with the corresponding fields is other such Pending Registrations records; if at any point during the comparison process the last records's value, including the network address, is found to be smaller than all the corresponding field's values in said Pending registrations records, then add a new Node Registration transaction to the Pending Transactions list and sort the transactions recorded in that list by the ascending value of their times-tamp field, and then recalculate all the hash value for all transactions; or If there is a Node Registration transactions in the Pending Transactions list with the same network address as the record created above (FIG. 36, 800), then if the new transaction's proposed address value is greater or equal than the corresponding field's values in the pre-existing Pending Transaction list transaction whose network address and commissioned public key are the same as its own, then compare, in order, the last records's distance count, ring member address and time-stamp with the corresponding fields is other such Pending Transactions list records; if at any point during the comparison process the last transactions's value, including the network address, is found to be smaller than all the corresponding field's values in said pre-existing transaction, then erase that pre-existing transaction; and sort the transactions recorded in that list by the ascending value of their time-stamp field, and then recalculate all the hash value for all transactions; and Compute the hash tree root value for the transactions in the node's Pending Transactions's list, if any exist, as sequentially ordered by the transaction order number, until the default number of transactions per bloc as required by the network parameters is reached; if the value so computed is different that the value computed earlier and if the number of transactions in the Pending Transactions list is greater than the minimal number of transactions for a block required by the network's parameters, then create a new record in the Proposed Blocks list, except the last step, by which all recorded transactions are erased; and compute a new set of destination addresses and a new set of BFTC algorithm parameters using said algorithm, and update the new record with said results; and send a Block Proposal message, hereafter "PROPBL message" (FIG. 7.2, 640; FIG. 36, 801), with the record's information as required by the network's parameters, but at a minimum comprising of the number of destination addresses, the destination addresses themselves, the BFTC algorithm parameters and all the fields from said Proposed Blocks list record; and continue to periodically check if any other message has been received or any whether any other action shall be performed.

FIG. 49 shows the five Nodes above described as well as 535 a PROPBL message is being sent across the shared communication medium and 536, the communications range for the emission of said message by the second Trust Ring member 530.

FIG. 50 shows the five Nodes above described and 537, a second PROPBL message is being sent across the shared communication medium and 538, the communications range for the emission of said message by the first Trust Ring member 519.

F.9 Trust Ring Members Process Block Proposal Messages

In preferred embodiments, whereas a Trust Ring Member Node's status indicates is ready to receive messages and process information, and if said Node receives a message marked as encrypted, it shall decrypt the message with the network communications key; if the message identifier so obtained indicates it is a PROPBL message (FIG. 7.2, 640; FIG. 39.1, 802), and its own network address is in the list of destinations for said message, then:

Verify all the signatures contained in the proposed PROPBL message field as by their destination addresses (FIG. 7.2, 640), using the the chosen digital signature verification algorithm with and for each the corresponding ring member public keys as extracted from either its Trust Ring member list or its Secure Distributed Ledger; and if all signatures are verified; then the node shall create a new record in its Proposed Blocks list with the message's information;

The Trust Ring Member shall then calculate a consensus value for the new proposed block by dividing the number of signatures for said record with the number of records in its Trust Ring members list or the number of Trust Ring members as indicated by its Secure Distributed Ledger; and then If the consensus value so computed is smaller than the consensus level required by the network's parameters (FIG. 7.2, 640; FIG. 39.1, 803), then, said Node shall compare the incoming new Proposed Blocks with all the records of its Block Proposals list it maintains for number of votes (all other things being equal), and the contents of the proposed transactions; if its contents are equal to first proposed Block in the aforementioned list (FIG. 39.1, 805), it may either add its vote (FIG. 39.1, 805-806), compute a new set of destinations for the BFTC algorithm parameters send a PROPBL message with said incoming block's information (FIG. 39.1, 810); or if not, compare each transactions from the new block individually with records of the Pending Transactions list (FIG. 39.1, 807), and if the incoming Blocks transactions supersede any transaction of said list constituting a better proposed solution (smaller numeric address, distance count, ring member address and timestamp with the corresponding)—(FIG. 39.1, 811), then in both cases replace and reorder all transactions accordingly (FIGS. 39.1, 808 and 812), recompute all hashes (FIG. 39.1, 809); if consensus is achieved then record the new block in the SDL (FIG. 39.1, 814), and if necessary send a new PROPBL message (FIG. 39.1, 810).

If the consensus value so computed is equal or larger than the consensus level required by the network's parameters (FIG. 7.2, 640; FIG. 39.2, 815), and if the Proposed Block is the same as a Block already recorded in its SDL (FIG. 39.2, 816), then if there are new votes, add them to said Block (FIG. 39.2, 817) and if necessary update the Pending Block and Pending Transactions list accordingly to eliminate double registration of transactions (FIG. 39.2, 818) and if necessary reorder all transactions, recompute all hashes and send a new PROPBL message (FIG. 39.2, 819)

If the consensus value so computed is equal or larger than the consensus level required by the network's parameters (FIG. 7.2, 640; FIG. 39.2, 815), and if the Proposed Block not equal to any Block already recorded in its SDL (FIG. 39.2, 820), nor is it linked to any such block (FIG. 39.2, 824), store the Proposed Block in the unlinked list, or if it is already there, update its vote count (FIG. 39.2, 825); or if it is linked to an SDL block, record it in said SDL, and resolve any conflict or fork (FIG. 39.2, 827) and if necessary reorder all transactions, recompute all hashes and send a new PROPBL message (FIG. 39.2, 819)

If the consensus value so computed is smaller than the consensus level required by the network's parameters (FIG. 7.2, 640), and one or more transaction in the incoming PROPBL message are Node Registration transaction, and said Trust Ring Member is the chosen Trust Ring Member to communicate with the Node Pending Commissioning, said node shall send a Registration Acknowledgment message, hereafter "REGACK" message (FIG. 37, 527; FIG. 7.2, 646), formed with the transaction's encrypted with the network communications encryption key using the chosen symmetric bloc cipher algorithm, but at a minimum comprising of the registered Node's destination addresses, and its own network address, as well as a distance counter set to zero; and If one of the transactions so recorded in the Secure Distributed Ledger is a Ring Member Registration transaction whose ring member field equals the Node's own network address (FIG. 7.2, 640), then said node shall send a Trust Ring Member Registration message, hereafter "TRMREG" message (FIG. 7.2, 650), formed with the record's information and encrypted with the network key using the chosen symmetric bloc cipher algorithm, but at a minimum comprising of the registered Node's destination addresses, and its own network address, as well as a distance counter set to zero; and If the block so received is already in the Secure Distributed Ledger (FIG. 7.2, 640), then when comparing the list of ring member signatures, if there is no new signatures in new proposed block, the erase the new block so created from the Proposed Blocks list; or if there are new signatures in the new proposed block then add those signatures to the equivalent block in the Secure Distributed Ledger; and erase the new block so created from the Proposed Blocks list; and compute a new set of destinations and BFTC algorithm parameters for the Secure Distributed Ledger block; and send a PROPBL message with the block's information; and If the block so received is not already in the Secure Distributed Ledger and if said block's hash link value is equivalent to the last block's hash in the SDL (FIG. 7.2, 640) then create a new record in said Ledger with the information of the new block; and erase the new block so created from the Proposed Blocks list; and for each transaction in the new block so registered in the Secure Distributed Ledger, erase any transaction from the Proposed Transactions list concerning the same network addresses.

Continue to periodically check if any other message has been received or any whether any other action shall be performed.

FIG. 37 shows the above described five Nodes, and 528, a REGACK message is being sent across the shared communication medium and 529, the communications range for the emission of said message by the first Trust Ring member 519.

FIG. 38 shows the above described five Nodes, and 539, a TRMREG message is being sent across the shared communication medium and 540, the communications range for the emission of said message by the first Trust Ring member 519.

F.10 Automatically Proposing New Trust Ring Members

In preferred embodiments, whereas a Trust Ring Member Node's status indicates it is ready to receive messages and process information, said Node shall periodically count the number of records in its SDL an Trusted Ring members list. If the number of records is smaller than the minimal number of Trust Ring members as required by the network's parameters (FIG. 7.2, 647), then said node shall identify the first Commissioned Node whose characteristics as recorded in its SDL are sufficient for said chosen Commissioned Node to become a Trust Ring member. If the network parameters do not mandate any special characteristic, the first Commissioned Node which is not a Trust Ring Member, by order of cardinality of its numeric network address, is to be chosen. Said node shall then create a new Trust Ring Registration transaction; then, it shall re-sort its transactions, by the ascending value of their time-stamp field, and recalculate all the hash value for all transactions create a new record in the Proposed Blocks list as set forth, except the last step, by which all recorded transactions are erased, and then recompute a new set of destination addresses and a new set of BFTC algorithm parameters using said algorithm, and send a new Block Proposal message, hereafter "PROPBL message" accordingly (FIG. 7.2, 648); and continue to periodically check if any other message has been received or any whether any other action shall be performed.

F.11 Commissioned Nodes Pending Registration Process Registration Acknowledgment Messages In preferred embodiments, whereas a Commissioned Node's status indicates it is Pending Registration commissioned, and if said Node receives a REGACK message (FIG. 7.2, 647), it shall decrypt the message's encrypted part with the network key using the chosen symmetric bloc cipher algorithm and if the destination equals its own network address, it shall record the ring member address contained therein as its closest ring member, and change its node status to indicate it is ready to receive messages and process information; and continue to periodically check if any other message has been received or any whether any other action shall be performed.

F.12 Commissioned Nodes Process Trust Ring Registration Messages

In preferred embodiments, whereas a Commissioned Node's status indicates it is ready to receive messages and process information, and if said Node receives a TRMREG message (FIG. 38, 539; FIG. 7.2, 650), it shall decrypt the message's encrypted part with the network key using the chosen symmetric bloc cipher algorithm and if the destination equals its own network address, it shall change its node type to Trust Ring member; it shall then request from the Trust Ring Member which sent the TRMREG message a copy of the SDL by sending a SDLGET message (FIG. 40, 541; FIGS. 7.2, 651 and 652), and continue to periodically check if any other message has been received or any whether any other action shall be performed.

FIG. 40 shows the five Nodes described and 541, a SDLGET message being sent across the shared communication medium and 542, the communications range for the emission of said message by the second Trust Ring member 530.

F.13 Trust Ring Members Processing SDL Copy Requests

In preferred embodiments, whereas a Trust Ring Member Node's status indicates it is ready to receive messages and process information, and if said Node receives a SDLGET message (FIG. 40, 541; FIGS. 7.2, 651 and 652), it shall send a copy of its SDL to the Node which sent the SDLGET message using as many SDLPUT messages as necessary (FIG. 41, 543; FIGS. 7.2, 651 and 652) to send all the SDL Blocks, one per SDLPUT message, and then continue to periodically check if any other message has been received or any whether any other action shall be performed.

FIG. 41 shows the five Nodes above described, and 543, a SDLPUT message is being sent across the shared communication medium and 544, the communications range for the emission of said message by the first Trust Ring member 519.

F.14 Trust Ring Members Processing SDL Copy Answers

Figure 53:
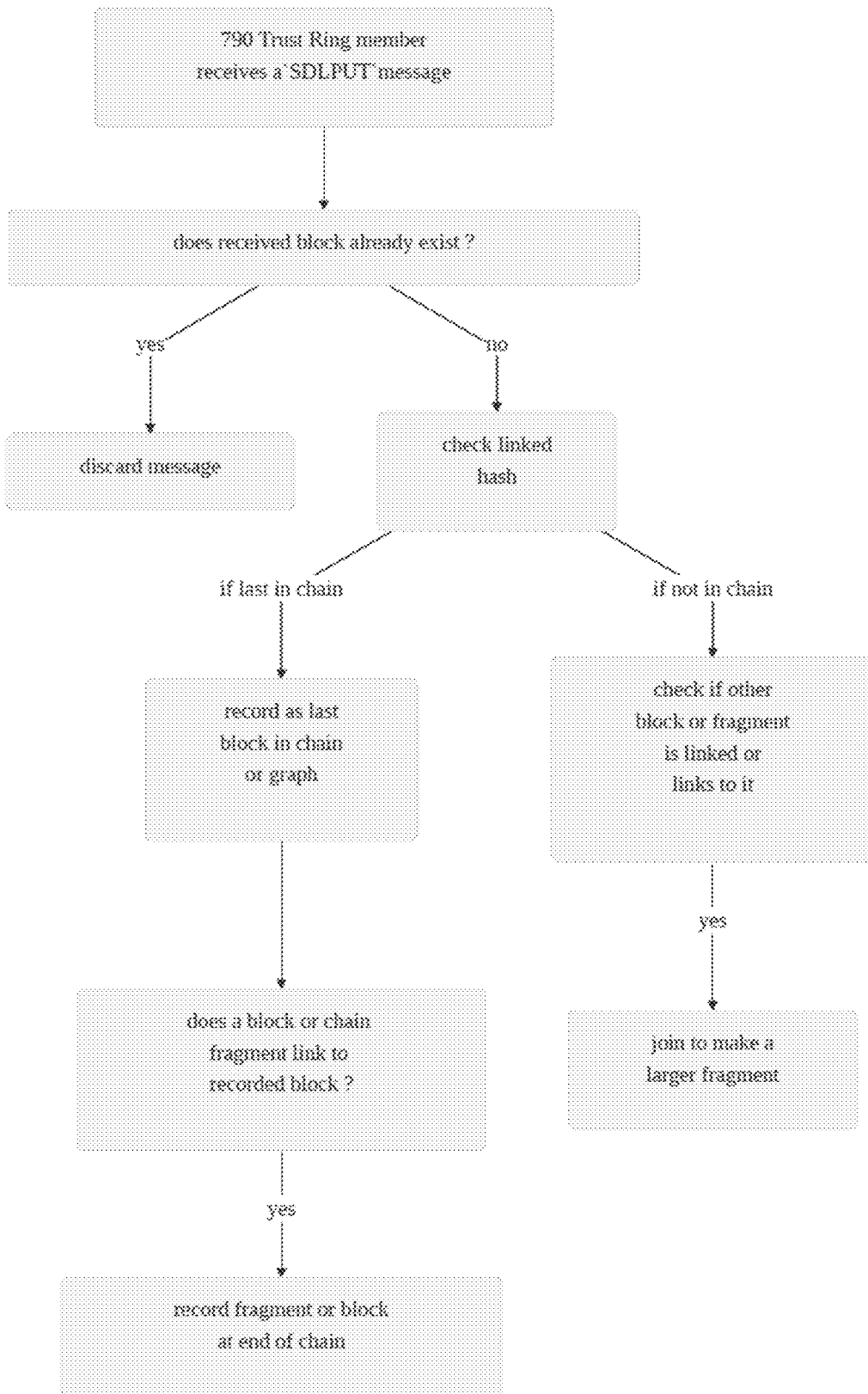
FIG. 53 shows a diagram of the method from the invention which Trust-Ring members follow when synchronizing their SDL using SDLGET and SDLPUT messages.

In preferred embodiments, whereas a Trust Ring Member Node's receive messages and process information, and if said Node receives a SDLPUT message (FIG. 53, 790; FIGS. 7, 651 and 652), it shall compare the Blocks thus received with blocks it may already have, verify all sequential hashes, and record any new Block it didn't have, ordered sequentially using the hash links, and then continue to periodically check if any other message has been received or any whether any other action shall be performed.

G. Routing of Messages by Commissioned Nodes and Trust Ring Members

Figure 48:
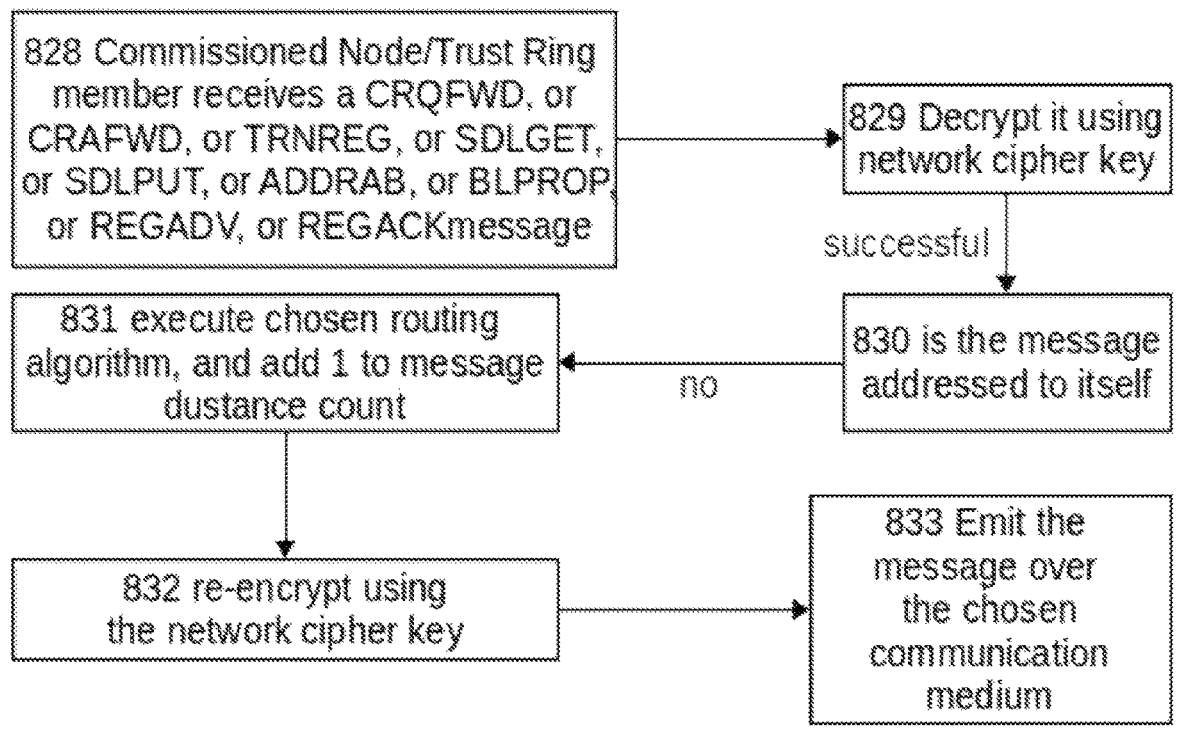
FIG. 48 shows a diagram of the method from the invention which a Node which is Commissioned or a Trust Ring Member follow when forwarding packets.

In preferred embodiments, whereas any Commissioned and any Trust Ring Member Node receives either a Block Proposal message, or a Forwarded Commissioning Request message, or a Forwarded, or a Commissioning Authorization Request message, or a Trust Ring Member Registration message, or an SDL Put message, or an SDL Get message, or an Address Attribution Ballot message (FIGS. 48, 828 and 829), which is not destined to itself (FIG. 48, 830), it shall process said message using the chosen routing algorithm, here AODV, add 1 to the distance counter (FIGS. 48, 831 and 832), and re-emit the modified message decrypting it using the network cipher key over the chosen shared communication medium (FIG. 48, 833)

Data Structures

In preferred embodiments of the Invention, a variety of common data structures may be maintained by Nodes in their volatile and non-volatile memory subsystems and which are used and modified by the processes and methods of the Invention. Those skilled in the art will recognize that the structures proposed here are examples, and may be implemented in as variety of other data structures of different format, ordering and encoding.

A. Network Parameters

Nodes may keep a set of non-variable records which define the common parameters which shall be equal in all Nodes embodying this Invention use to communicate in a particular ad-hoc network.

A.1) Communications

In preferred embodiments, the network parameters may contain one or more of the following non-variable records related to communications: Protocol signature: length in number of bits, and the signature itself; a List of Message types: length in number of bits; A Network Service Set Identifier: length in number of bits; Network address length in number of characters; Length of the synchronized network time variable used for purposes of identification and cryptography: length in number of bit; Threshold number of CRQ message a node shall send before a procedure for creating of the trust ring is launched; Threshold number of RNGREQ messages a node shall send before resetting the node commissioning procedure; Secure Distributed Ledger Identifier: length in bits; Timing tolerance: number in seconds; Starting number for network addresses.

A.2) Cryptography and Security

In preferred embodiments, the network parameters may contain one or more of the following non-variable records related to cryptograph and security: Chosen cryptographically secure pseudorandom number generator algorithm; Chosen one-way compression algorithm; Chosen Merkle Tree root hash computation algorithm; Chosen symmetric block cypher algorithm; Chosen asymmetric key cryptosystem and cypher algorithm; Chosen digital signature and digital signature and verification algorithm; Random seed: length of the number in bits; Chosen network symmetric bloc cypher key: length in bits; Unique asymmetric cypher system private keys: private key length in bits; Unique asymmetric cypher system public key: public key length in bits; Length of Commissioning Signatures: length in bits.

A.3) Node Type and Identity

In preferred embodiments, the network parameters may contain one or more the following non-variable records related to the identity of Nodes: Random unique identifier for a node or a configurator device: length of the identifier in bits; Node characteristics metadata: length in bits.

A.4) Secure Distributed Ledger

In preferred embodiments, the network parameters may contain one or more of the following non-variable records related to the SDL: Chosen byzantine fault tolerant consensus; The length of the hashes used to identify blocs within a networks' secure distributed ledger: length in bits; The length of the hash tree hashes used to verify all the linked transaction within a secure distributed ledger bloc; The length of the hash used to identify the sum of a bloc's metadata: length in bits; The length of the hashes used to sign linked transactions within a networks' secure distributed ledger: length in bits; The length of the cryptographic signature by which each transaction is signed: length in bits; The length of the cryptographic signature with which each block is signed: length in bits; A list of types of transactions which can be recorded in the secure distributed ledger; Default number of transactions contained in a bloc registered in a secure distributed ledger; The length of a single signature for a single address allocution ballot: length in bits; Byzantine Fault Tolerant Consensus algorithm parameters field: length in bits.

A.5) Trust Ring

In preferred embodiments, the network parameters may contain one or more of the following variable records in volatile or non-volatile related to the Trust Ring: Minimal number of trust ring members for a particular secure distributed ledger; Proportion of agreeing Ring Members necessary to form a Byzantine Fault Tolerant Consensus;

B. Automated Commissioning Parameters

Each Node may have recorded on any of its attached computer readable media by the operator, preliminary to the deployment of an ad-hoc network, a set of parameters related to a particular ad-hoc network which make it possible to automatically commission said Node in a particular ad-hoc network once powered on, with absolutely no human intervention, as follows: the unique signature by which an installation or ad-hoc network in which the ring will be initialized is identified, commonly called a Network Service Set Identifier (NetSSID) for a particular installation or network; The network-wide symmetric bloc cypher key used by all nodes commissioned into the a particular network identified by its NetSSID to encrypt their communications; Current time relative to an ad-hoc network or installation as identified NetSSID, measured and updated periodically the node's computing unit; The starting value at which the requesting node's onboard clock shall be reset at during the trust ring initialization process; The identifier for a secure distributed ledger specific to a particular installation within a particular ad-hoc network: length in bits and the identifier itself; The time difference between a Configurator Devices' own clock and a particular network's synchronized time.

C. Variable Records

In preferred embodiments, Nodes maintain the following variable records in memory, to make possible the execution of the methods of the Invention in general: node type; node status, unique random identifier for non-commissioned and configurator device nodes; unique network address, closest Trust Ring member address, current Address Allocation Ballot's consensus level, CRQ Tries as a number indicating the of times a crq message has been sent by a node.

In preferred embodiments, Nodes maintain the following temporary variable records in memory, to make possible the execution of the methods of the Invention related to the SDL in particular: genesis hash for a specific secure distributed ledger, hash tree root values of all Pending Transactions, total number of transactions in the secure distributed ledger, current proposed block's transaction count, BFT Consensus algorithm parameters for next ADDRAB or BLPROP message to be sent, corresponding Ring Members list for the next BFT Ballot message decision to be sent, and number of destination D. Lists In preferred embodiments, Nodes maintain the following one or more of the following lists of records: a List of Network Partitions and SDL's, a List of Time references, a List of Trust Ring Members in current ad-hoc network, a List of Pending Non-Commissioned Advertisements, a List of Pending Commissioning Requests, a List of Pending Address Attribution Ballots, a List of Pending Address Registrations, a List of Pending Secure Distributed Ledger Transactions, a List of Proposed Secure Distributed Ledger Blocks, a Secure Distributed Ledger.

Ad-Hoc Network Deployed Using an SDL in Functioning

General Description

A new fully Commissioned Node having just received the Registration Acknowledgment message must then very precisely synchronise its internal clock to the network's. Then, for nodes to avoid interfering with each other while communicating over the shared communication medium when sending and receiving messages, each Node must coordinate with other Commissioned Nodes, also using completely distributed mechanisms. Only when such coordination is finished can any Node optimally perform routing of messages from any single point to any other point in the network, without congestion due to interference over the shared communication medium.

To coordinate, Commissioned Nodes organises themselves around clusters which each have a synchronizing Node called "Cluster Master Node", while all other Nodes in said cluster are called "Slave Nodes". All Slave nodes are within physical range of the Cluster Master.

Each Cluster Master calculates and attributes a schedule for transmission and reception of to each Node. Cluster Masters are also the only Nodes performing route calculation, and decide how data is routed to and from neighbouring clusters using their own Slave Nodes as forwarders, as well as how data is routed to and from and between their Slave Nodes.

A Commissioned Node may be part of one cluster at most, while being in physical reception and transmission range of one or more Cluster Masters. Two Cluster Master must always be at least two hops away from each other, and never more than three hops away.

Once the Commissioning process described above is concluded, the node is now validly accepted to within the fully distributed ad-hoc network supported by the Trust Ring and its shared Secure Distributed Ledger.

In such a network, commissioned nodes form dynamic transient local resources coordination clusters. Each such cluster has a leader, which has all its nodes within direct communication range, although non-leader nodes must not necessarily be within such range of each other. The roles of cluster leaders is to synchronize time across the network, schedule communication resources allocation, route packets, coordinate with neighbouring clusters, as well as of course mediate network security and access for its cluster members nodes in collaboration with the Trust Ring using said network's Secure Distributed Ledger.

Clusters in such distributed homogeneous ad-hoc networks are said to be transient and dynamic in the sense that if a cluster leader becomes unreachable relative to one or more of the cluster's nodes, either another leader is elected by said nodes and a new cluster is formed, or each node attaches itself to another cluster whose master is within direct reach. Similarly, if a cluster's locally available communication resource limits are reached, said cluster will split to adapt. Cluster leaders also form the backbone for communication as they participate in packet forwarding, and participate in a route discovery mechanism which is a variation on classical IETF 3561 Ad-hoc On-demand Distance Vector Routing (see [0153] A.6 Route Discovery and Packet Forwarding), here mediated by cluster-leaders.

As such, right after its commissioning finishes, or after a node's cluster leader becomes unreachable, said will listen on the shared communication medium for other cluster leaders in direct range, choose one according to optimal communication parameters, and contact it to be included in its cluster. The cluster leader so contacted will check the node's credentials with the Trust Ring, and if acceptable, will include said node in its cluster and coordinate with it. Said commissioned node is now not only validly accepted in the ad-hoc network but also fully able to function and communicate within said network. It then receives all relevant information from the cluster leader immediately (timing, communication resources schedule, etc). If no cluster leader is within range, it will propose itself for inclusion.

Media Access Control and Transmission Scheduling

Transmissions are done in time segments of fixed length defined as fractions of a cycle of time. In networks deployed using a Secure Distributed Ledger, a cycle of time is defined by default as one International System second. A cycle is divided in N signal transmission/reception segments, for each Commissioned Node in said network. One or more Node can be defined be recorded in the SDL to be Time references, in order of correctness. All Node shall have their distance to said time references Nodes calculated as described further below, which indicates the quality of their own clock in relation to the network time. A transmission/reception scheduling segment (hereafter "slot" or "slots") can be one of 5 types:

- one or more "exclusive transmission slot" are exclusively assigned by a Cluster Master to Commissioned Nodes, during which the Node is guaranteed is guaranteed not to have interfering signals emitted by either said Cluster Master or other Nodes which are Slaves to said Master, or even by neighbouring Clusters. The Cluster Master will exclusively listen to messages during such a slot. Other Nodes within or outside a given cluster may choose to listen to messages during such a slot.
- one or more "exclusive reception slot" are assigned during each cycle by the Cluster Master to a specific Commissioned Node, during which it must listen for messages which will be attributed to it.
- one or more "excluding reception slots" are assigned during each cycle by the Cluster Master to a specific Commissioned Node, during which said Node does not have to listen to the medium, and can power off its antenna and transceiver, as during such a slot no message shall be transmitted and addressed to it.
- one or more "stochastic transmit/receive" are assigned during each cycle by the Cluster Master to all its Nodes, during which any Node from the cluster can emit a message, and any Node may choose to listen to the shared medium, or not.
- one "master advertisement slot" is reserved to the Cluster Master each cycle during which it is the only Node within its own cluster allowed to emit. The slot is used to emit the latest schedule to all Nodes within the cluster. The Master Advertisement slot is also the slot during which fine clock synchronisation information is transmitted.

A Commissioned Node, right after receiving the Registration Advertisement message from the Trust Ring thus starts a random reverse timer. If before 0 is reached by the timer no Slot Advertisement messages from a Cluster Master is detected over the shared medium, nor is a Slot Request message received from another Commissioned Node without a Cluster Master, nor any other Node, said Node elects itself to become its own Cluster Master, and awaits to receive Slot Request or other network maintenance messages; if however a message from another Node already within its range is received (signifying that maybe the cluster master message's might have been interfered with), it shall wait a moment to send its own Slot Forwarded Request Message to that Node, which shall forward it to its master, If it receives either a Slot Request Message from another Node, or a Slot Advertisement message from a Cluster Master, it shall wait a moment to send its own Slot Request Message.

Any Cluster Master receiving a Slot Request message, or a Cluster Join Request message shall first check against its own copy of the SDL if said Node emitting a Slot Request message is actually registered. If not, it may request said information from the closest Trust Ring Node. If said Node is actually authorised, it may then calculate a new slot schedule, attributing the relevant slots using the five aforementioned slot types, as described in the relevant Ad-hoc networks' parameters, which it will then emit during its next master advertisement slot using a Slot Advertisement message, which shall also contain an association parameter for said Node. Slot Request message shall also contain a list of all Nodes for which said newly Commissioned Node has detected transmissions from, called a "Neighbourhood List".

If a Node detects two or more Slot Advertisement messages from two or more Cluster Masters, with which it shall chose the older one if said Master has free slots as defined by its Slot Advertisement messages, to which it wishes to be associated by then sending a Cluster Join Request message.

A Node already joined into a cluster receiving a message addressed to another Cluster Master than its own or from directly another Cluster shall send an Unknown Cluster Message to its own Cluster Master, which shall then begin a negotiation using Cluster Negotiation messages with the other Cluster Master forwarded through said Node or Nodes. Both Cluster Masters shall check each others' identities using their copy of the SDL or by requesting said information from the Trust Ring. Both Cluster Master must exchange such messages, also containing all relevant Neighbourhood lists until the transmission schedules are set as such that no Nodes within each Cluster shall interfere with each other when transmitting messages. Said message shall also contain each Nodes' distance to the Time Reference Node or Nodes. The Cluster Master which is further away shall reset its own clock according to the closer Node's or Cluster Master's clock, in order of distance to the Time Reference, here called its "Time Quality" metric. By using said Cluster Negotiation Messages, both Cluster Masters shall decide which Commissioned Node or which two Commissioned Nodes shall be used to forward messages between the two clusters, hereafter "Connector Nodes".

Any Node receiving a Slot Advertisement message shall change its transmission, reception schedule accordingly, as well as its the schedule related when its antenna and transceiver shall be switched on. It shall also reset its own clock to the time indicated in the Slot Advertisement message modified by its own device-specific jitter, as recorded in its Node Metadata.

Routing

Routing in such ad-hoc networks deployed using the SDL is performed using "ClusterCast", a fully distributed unicast and multi cast routing algorithm belonging to the class of On-Demand Distance Vector Routing algorithms.

Cluster Cast route construction functions in that Route Request messages from a source Node is multicast across the network, being forwarded using both Connector Nodes and Cluster Masters along the way. Each Cluster Master receiving a Cluster Cast Route Request message checks whether said destination is within its cluster. If not, it forwards said message to the next neighbouring clusters. Each Node forwarding the message shall add 1 to said message's hop count from its source. If the destination is indeed within its Cluster, it shall respond by a Route Response message, which through back propagation towards the source will define which route is the shortest between the source and the destination: the shortest route will have the smallest hop count.

The chosen route shall send a Route Response Acknowledgment message. Route Response Alternate Acknowledgment messages may also be sent for other longer routes, which are fail-over routes in case the original route doesn't respond.

If a Node for which a route was so built becomes durably unreachable by its Cluster Master, said Cluster Master shall send a Route Error message to any source Node which requested a route to said now unreachable Node.

Automation, Strong Security, High Reliability

In conclusion, the invention thus provides a "plug-and-play" capability for all types of ad-hoc networks: power any device on, at most push a button on the Configurator, and be set, as all the rest is automated; even the deployment of the security and confidentiality infrastructure for said ad-hoc network, the Trust Ring, follows the same principle.

The Invention distribute all its processes and computations across any number of peers in the network, and automatically replicate any information which allows the network to function. As such, no single peer at any moment ever acts as the sole coordinating entity or deciding authority for any process or network resource, or as sole repository for any data relevant to the network as a whole; several such processes can be executed in parallel and asynchronously by several ad-hoc collaborating network peers—for example several peer commissioning processes can be happening concurrently at any point in time. There is thus no single point of failure for any function provided by the Invention. The invention provides a fully distributed and contention free mechanism for numeric network address allocation, regardless of network size, and which does not depend on factory-set MAC addresses.

The Invention incorporates as part of its fundamental design an extremely strong security model; its mechanisms construct an unbroken "cryptographic chain" of message exchanges, and which can be fully mathematically audited, verified and authenticated. Similarly, no knowledge is exchanged between any two peers, already accepted in the network or not, unless absolutely necessary, and if such exchange happens it is done through digitally signed messages encrypted using strong peer-to-peer asymmetric ciphers.

We believe the Invention and its methods ensure that the only realistically possible manner in which an hostile third party may effect effect an unauthorized penetration of said ad-hoc network, or the hijack one or more Nodes, or tamper or falsify of any information recorded on a Node, or the tamper or falsify any information during message transmission between Nodes (so-called "man-in-the-middle" attacks) is by directly physically accessing the circuits of a Node. As described here, the Invention creates an unbroken cryptographic and mathematically verifiable chain of messages, votes, and SDL records can verified mathematically, from the moment of a Non-Commissioned Node is powered up until it is validly accepted to function in said Network.

We also believe that even in the event of a successful takeover of a Node will not compromise the functioning of said ad-hoc network or allow further attack of any other Nodes in the same ad-hoc network, nor does it allow a successful interception and decryption of any message from and to two other Nodes which said vulnerable Node may forward. We believe that if and only if two-third of the Trust Ring members are physically taken over, is there a danger of hijacking the networks' function. We finally believe that our particular use and design of a Distributed Ledger ensures that even by successfully directly tampering with one Node and its SDL and any attacker is precluded from compromising the secure, verifiable, and authenticated function of the Invention for the rest of the ad-hoc network.

Alternative Embodiment

Ad-hoc network comprising a plurality of nodes, wherein each node is an electronic device, wherein each node is connected by a communication connection with at least one of the other nodes, wherein the information about the nodes are stored in a (preferably secure) distributed ledger stored in each node of at least a sub-group of the plurality of nodes. Preferably, the plurality of nodes comprises trust ring member nodes and commissioned nodes, wherein the distributed ledger is stored in each trust ring member node. Preferably, the distributed ledger is a data structure comprising a plurality of blocks, each block corresponding to a (commissioned or trust ring member) node, each block (except for the first block) comprises a link to a previous block, a hash of the previous block and records about the respective node. Preferably, the distributed ledger is not stored in the commissioned nodes.

The invention claimed is:

1. An ad-hoc network comprising a configurator device and a plurality of nodes, wherein each node is an electronic device, wherein each node is connected by a communication connection with at least one of the other nodes and/or with the configurator device, wherein each node can be in different states comprising at least a non-commissioned state, a commissioned state and a trust ring member state, wherein a node in a commissioned state and a node in the trust ring member state is registered as part of the ad-hoc network and is able to securely communicate within said ad-hoc network,
- wherein a first node of the plurality of nodes being in the non-commissioned state is configured to send a non-commissioned advertisement message to the configurator device comprising an identifier of the first node,
- wherein the configurator device is configured to send an automated commissioning initialization message to the first node containing a token, wherein the token is encrypted by a symmetric network key of the ad-hoc network,
- wherein the first node is configured to send out a commissioning request message containing the received encrypted token to at least one node of the ad-hoc network being in the commissioned state or in the trust ring member state,
- wherein the first node is configured to change its state, when it receives an authorization message from another node of the ad-hoc network in the commissioned state or in the trust ring member state,
- wherein a second node being in the trust ring member state is configured
  - to receive a message containing the encrypted token sent by the first node, and
  - to decrypt the token with the symmetric network key,
- wherein a group of nodes of the plurality of nodes being in a trust ring member state is configured to perform an automatic vote process to agree on a network address of the first node,
- wherein a node of the plurality of nodes is configured to send a message to the first node containing the agreed network address, wherein the message is preferably encrypted by the public key of the first node.

2. The ad-hoc network of claim 1, wherein the automatic vote process is based on a byzantine fault tolerant algorithm, wherein the automatic vote process is used to agree on a network address of the first node, to agree on the acceptance of the first node to change its state and/or to agree on a new block of a distributed ledger.

3. The ad-hoc network of claim 1, wherein each node being in a trust ring member state stores a data structure comprising a plurality of blocks, each block corresponding to a node being either in a trust ring member state or in a commissioned state, each block except for the first block comprises a link to a previous block, a hash of the previous block and records about the node corresponding to the block.

4. The ad-hoc network of claim 3, wherein the data structure is a distributed ledger, preferably a secure distributed ledger.

5. The ad-hoc network of claim 3, wherein the records about the node comprise one or more of the following:
- public key of the node,
- network address of the node,
- identifier of the node,
- list of signed votes for voting about address of the node,
- state of the node.

6. The ad-hoc network of claim 1, wherein
the non-commissioned advertisement message contains a public key of the first node, and a message from the first node to the configurator sent after the non-commissioned advertisement message, in particular the automated commissioning initialization message, is encrypted by the public key of the first node; and/or wherein the token includes the public key of the first node; and/or wherein the automated commissioning initialization message contains the public key outside of the token and optionally a message from the first node to the configurator sent after the automated commissioning initialization message is encrypted by the public key of the configurator.

7. The ad-hoc network of claim 1, wherein the token contains one or more of a network identifier, a current network time and/or a signature of the configurator device.

8. The ad-hoc network of claim 1, wherein the communication connections between the nodes and/or the communication connections between the configurator and the nodes are wireless communication connections.

9. The ad-hoc network of claim 1, wherein the configurator device is a mobile device with a display and a user input mechanism.

10. An ad-hoc network comprising a configurator device and a plurality of nodes, wherein each node is an electronic device, wherein each node is connected by a communication connection with at least one of the other nodes and/or with the configurator device, wherein each node can be in different states comprising at least a non-commissioned state, a commissioned state and a trust ring member state, wherein a node in a commissioned state and a node in the trust ring member state is registered as part of the ad-hoc network and is able to securely communicate within said ad-hoc network,
- wherein a first node of the plurality of nodes being in the non-commissioned state is configured to send a non-commissioned advertisement message to the configurator device comprising an identifier of the first node,
- wherein the configurator device is configured to send an automated commissioning initialization message to the first node containing a token, wherein the token is encrypted by a symmetric network key of the ad-hoc network,
- wherein the first node is configured to send out a commissioning request message containing the received encrypted token to at least one node of the ad-hoc network being in the commissioned state or in the trust ring member state,
- wherein the first node is configured to change its state, when it receives an authorization message from another node of the ad-hoc network in the commissioned state or in the trust ring member state,
- wherein the first node is configured
  - to send a trust ring formation request message to the configurator device, if a maximum number of commissioning request messages were sent from the first node,
  - to receive a message containing at least the symmetric network key from the configurator device, and
  - to change the state of the first node to the trust ring member state.

11. The ad-hoc network of claim 10,
wherein a second node being in the trust ring member state is configured
- to receive a message containing the encrypted token sent by the first node, and
- to decrypt the token with the symmetric network key, wherein a group of nodes of the plurality of nodes being in a trust ring member state is configured to perform an automatic vote process to agree on a network address of the first node, wherein a node of the plurality of nodes is configured to send a message to the first node containing the agreed network address, wherein the message is preferably encrypted by the public key of the first node.

12. The ad-hoc network of claim 11, wherein the message containing the agreed network address contains further the symmetric network key.

13. The ad-hoc network of claim 11,
wherein each node being in a trust ring member state stores a data structure comprising a plurality of blocks, each block corresponding to a node being either in a trust ring member state or in a commissioned state, each block except for the first block comprises a link to a previous block, a hash of the previous block and records about the node corresponding to the block,
wherein the first node is configured to send out a registration advertisement message,
wherein a group of nodes of the plurality of nodes being in the trust ring member state is configured to perform an automatic vote process to agree on a new block of the data structure corresponding to the first node,
wherein a node of the plurality of nodes is configured to send an authorization message to the first node, preferably encrypted by the symmetric network key and/or addressed to the network address of the first node, such that the first node can change its state to a commissioned state.

14. A method for an electronic device being a node in an ad-hoc network, wherein the nodes are connected via communication connections, wherein the node has different states comprising a non-commissioned state, a commissioned state and a trust ring member state, wherein a node in a commissioned state and a node in the trust ring member state is registered as part of the ad-hoc network and is able to securely communicate within said ad-hoc network, wherein the method is configured to perform the following steps, when the electronic device is in the non-commissioned state:
sending out a non-commissioned advertisement message;
receiving from a configurator device an automated commissioning initialization message containing a token, wherein the token is encrypted by a symmetric network key;
sending out in the ad-hoc network a commissioning request message containing the received encrypted token;
after sending out the commissioning request, receiving, from a node of the ad-hoc network in the commissioned state or in the trust ring member state, information to be able to securely communicate within the ad-hoc network including a network address of the node and the symmetric network key;
receiving, from a node of the ad-hoc network in the commissioned state or in the trust ring member state, an authorization message; and
changing the state of the node in the commissioned state,
wherein the method is configured to perform one or more of the following alternatives, when the electronic device is in a trust ring member state:
first alternative:
receiving a commissioning request message or a forwarded commissioning request message,
decrypting the commissioning request message and identifying the node having sent the commissioning request message, and
performing an automatic vote process together with other nodes in the trust ring member state to agree on a network address for the identified node;
second alternative:
receiving an address attribution ballot message, preferably signed by the sender of the address attribution ballot message,
voting on the proposed address contained in the address attribution ballot message, and
creating a new address attribution ballot message with the received address attribution ballot message and the vote on the proposed address, preferably signed by the present node;
third alternative:
receiving a registration advertisement message or a forwarded registration advertisement message,
identifying the node which sent the registration advertisement message based on the content of the received registration advertisement message or a forwarded registration advertisement message, and
performing an automatic vote process together with other nodes in the trust ring member state to agree on a new block of the distributed data structure corresponding to the identified node.

15. The method of claim 14, wherein the method is configured to perform one or more of the following alternatives, when the electronic device is in the non-commissioned state:
first alternative:
receiving a message with a network address for the electronic device and a network key;
sending out a registration advertisement message,
receiving an authorization message, preferably encrypted by the symmetric network key and/or addressed to the network address of the node;
second alternative:
if a maximum number of commissioning request messages was sent from the node, sending a trust ring formation request message to the configurator device,
receiving the message containing at least the symmetric network key from the configurator device, and
changing the state of the node to the trust ring member state.

16. The method of claim 14, wherein the method is configured to perform one or more of the following alternatives, when the electronic device is in a commissioned state:
first alternative:
receiving a commissioning request message from a node being in a non-commissioned state,
encrypting a token of the received commissioning request message with the symmetric network key, and
if the content of the token fulfils a forwarding condition, forward the encrypted token to a trust ring member;
second alternative:
receiving a message for a node in a non-commissioned state from a trust ring member, and
forwarding the message to the node in a non-commissioned state;
third alternative:
receiving a registration acknowledgement message, and
changing state to a trust ring member state.

17. The method of claim 14, wherein the different states also comprise a configurator state, wherein the method is configured to perform the following steps, when the electronic device is in a configurator state:

receiving a non-commissioned advertisement message from a node being in the non-commissioned state;

sending out an automated commissioning initialization message to the node having sent the non-commissioned advertisement message containing a token, wherein the token is encrypted by a symmetric network key.

18. Electronic device configured to be a node in an ad-hoc network, wherein the electronic device can be in a non-commissioned state, a commissioned state and a trust ring member state, wherein a node in a commissioned state and a node in the trust ring member state is registered as part of the ad-hoc network and is able to securely communicate within said ad-hoc network, wherein the electronic device is configured to perform the following steps, when the electronic device is in the non-commissioned state:

sending out a non-commissioned advertisement message;

receiving from a configurator device an automated commissioning initialization message containing a token, wherein the token is encrypted by a symmetric network key;

sending out a commissioning request message containing the received encrypted token;

receiving, from a node of the ad-hoc network in the commissioned state or in the trust ring member state, information to be able to securely communicate within the ad-hoc network including a network address of the node and the symmetric network key;

receiving, from a node of the ad-hoc network in the commissioned state or in the trust ring member state, an authorization message; and changing the state of the node in the commissioned state;

wherein the electronic device is configured to perform the following steps, when the electronic device is in the trust-ring member state:

performing an automatic vote process with nodes of the ad-hoc network being in a trust-ring member state, wherein the automatic vote process is based on a byzantine fault tolerant algorithm, wherein the automatic vote process is used to agree on at least one of a network address of a non-commissioned node, the acceptance of a non-commissioned node to change its state and a new block of a distributed ledger.

19. Non-transitory computer program for a node of an ad-hoc network configured to perform the following steps, if executed on a processor of an electronic device as the node of the ad-hoc network:

performing the following steps when the node is in a non-commissioned state:

sending out a non-commissioned advertisement message;

receiving from a configurator device an automated commissioning initialization message containing a token, wherein the token is encrypted by a symmetric network key;

sending out a commissioning request message containing the received encrypted token;

receiving, from a node of the ad-hoc network in the commissioned state or in the trust ring member state, information to be able to securely communicate within the ad-hoc network including a network address of the node and the symmetric network key;

receiving, from a node of the ad-hoc network in the commissioned state or in the trust ring member state, an authorization message; and changing the state of the node in the commissioned state, wherein node in the commissioned state is registered as part of the ad-hoc network and is able to securely communicate within said ad-hoc network;

when the node is in a trust ring member state, performing the following step:

storing a data structure comprising a plurality of blocks, each block corresponding to a node being either in a trust ring member state or in a commissioned state, each block except for the first block comprises a link to a previous block, a hash of the previous block and records about the node corresponding to the block.

* * * * *